US008028292B2

(12) United States Patent
Inoue et al.

(10) Patent No.: US 8,028,292 B2
(45) Date of Patent: Sep. 27, 2011

(54) PROCESSOR TASK MIGRATION OVER A NETWORK IN A MULTI-PROCESSOR SYSTEM

(75) Inventors: Keisuke Inoue, Kanagawa (JP); Masahiro Yasue, Kanagawa (JP)

(73) Assignee: Sony Computer Entertainment Inc. (JP)

( * ) Notice: Subject to any disclaimer, the term of this patent is extended or adjusted under 35 U.S.C. 154(b) by 1609 days.

(21) Appl. No.: 11/346,668

(22) Filed: Feb. 3, 2006

(65) Prior Publication Data
US 2006/0190942 A1  Aug. 24, 2006

Related U.S. Application Data

(63) Continuation-in-part of application No. 10/783,246, filed on Feb. 20, 2004, now Pat. No. 7,614,053, and a continuation-in-part of application No. 10/783,238, filed on Feb. 20, 2004, now Pat. No. 7,565,653.

(60) Provisional application No. 60/650,153, filed on Feb. 4, 2005.

(51) Int. Cl.
*G06F 9/46* (2006.01)
*G06F 15/16* (2006.01)
(52) U.S. Cl. ........................................ 718/105; 709/201
(58) Field of Classification Search .................. 718/105; 709/201
See application file for complete search history.

(56) References Cited

U.S. PATENT DOCUMENTS

| 4,394,727 | A | 7/1983 | Hoffman et al. |
| 4,394,730 | A | 7/1983 | Suzuki et al. |
| 4,837,688 | A | 6/1989 | Cronauer et al. |
| 5,349,656 | A | 9/1994 | Kaneko et al. |
| 5,379,428 | A | 1/1995 | Belo |
| 5,452,452 | A | 9/1995 | Gaetner et al. |
| 5,469,571 | A | 11/1995 | Bunnell |
| 5,539,883 | A * | 7/1996 | Allon et al. ............. 718/105 |
| 5,592,671 | A | 1/1997 | Hirayama |
| 5,630,128 | A | 5/1997 | Farrell et al. |
| 5,826,081 | A | 10/1998 | Zolnowsky |
| 6,243,735 | B1 | 6/2001 | Imanishi et al. |
| 6,321,308 | B1 | 11/2001 | Arnon et al. |
| 6,904,483 | B2 | 6/2005 | Koning et al. |

(Continued)

FOREIGN PATENT DOCUMENTS

EP  0 750 255 A  12/1996

(Continued)

OTHER PUBLICATIONS

Suen, et al. "Efficient Task Migration Algorithm for Distributed Systems", IEEE Transactions on Parallel and Distributed Systems, vol. 3, No. 4, pp. 488-499, Jul. 1992.*
Office Action from Corresponding Japanese Application No. 2005-044874, dated Nov. 4, 2009.
Office Action from Corresponding Japanese Application No. 2005-044874, dated Feb. 2, 2010.
PCT/ISA/210 International Search Report dated Nov. 14, 2005.

(Continued)

*Primary Examiner* — Meng An
*Assistant Examiner* — Brian Chew
(74) *Attorney, Agent, or Firm* — Lerner, David, Littenberg, Krumholz & Mentlik, LLP

(57) ABSTRACT

Methods and apparatus for migrating and distributing processor tasks on a plurality of multi-processing systems distributed over a network. The multi-processing system includes at least one broadband entity, each broadband entity including a plurality of processing units and synergistic processing units, as well as a shared memory. Tasks from one broadband entity are bundled, migrated and processed remotely on other broadband entities to efficiently use processing resources, and then returned to the migrating broadband entity for completion or continued processing.

38 Claims, 40 Drawing Sheets

U.S. PATENT DOCUMENTS

| | | | |
|---|---|---|---|
| 6,912,533 B1* | 6/2005 | Hornick | 707/700 |
| 7,062,766 B2 | 6/2006 | Ronkka et al. | |
| 7,080,215 B2 | 7/2006 | Ueno et al. | |
| 7,178,145 B2 | 2/2007 | Bono | |
| 7,389,508 B2 | 6/2008 | Aguilar, Jr. et al. | |
| 7,516,456 B2 | 4/2009 | Aguilar, Jr. et al. | |
| 2002/0002578 A1 | 1/2002 | Yamashita | |
| 2002/0016811 A1* | 2/2002 | Gall et al. | 709/102 |
| 2005/0081201 A1 | 4/2005 | Aguilar et al. | |

FOREIGN PATENT DOCUMENTS

| | | |
|---|---|---|
| EP | 0 459 931 A | 12/2001 |
| JP | 3-157733 A | 7/1991 |
| JP | 6-259386 A | 9/1994 |
| JP | 8-241212 A | 9/1996 |
| JP | 9237256 | 9/1997 |
| JP | 10-283200 A | 10/1998 |
| JP | 2000-259429 A | 9/2000 |
| JP | 2002091843 | 3/2002 |
| JP | 2002366533 | 12/2002 |
| JP | 2003-303134 A | 10/2003 |
| KR | 2003-84553 | 11/2003 |
| TW | 225990 B | 1/2005 |

OTHER PUBLICATIONS

Tanenbaum, Andrew S: "Modeme Betriebssystems, 2. Auflage (part)" NN, vol. 2, 2002, pp. 92-96, 160-163, 542, 543, 550-553, 558-561.

Black D L, "Scheduling Support for Concurrency and Parallelism in the Mach Operating System", Computer IEEE Service Center, Los Alamitos, CA., vol. 23, No. 5, May 1, 1990, pp. 35-43.

Huedo, Edwardo, et al.: "Experiences on Grid Resource Selection Considering Resource Proximity," Grid Computing. First European Across Grids Conference, Feb. 14, 2003, pp. 1-8.

Krauter, Klaus, et al.: "A taxonomy and survey of grid resource systems for distributed computing," Software—Practice and Experience, 2002, pp. 135-164, XP-001091827, vol. 32, No. 2, Feb. 2002.

Liu, Chuang, et al.: "Design and Evaluation of a Resource Selection Framework for Grid Applications," Proceedings of the 11th IEEE International Symposium on High Performance Distributed Computing, 2002, pp. 63-72, Jul. 2002.

Curran et al., "A comparison of basic CPU schedulign algorithms for multiprocessor Unix", Computer systems, 1990, pp. 1-15.

Office Action from corresponding Taiwanese Application No. 095103850, dated Aug. 30, 2010.

* cited by examiner

FIG. 5

TASK TABLE

280

| T1 | | T2 | | T3 | | T4 | |
|---|---|---|---|---|---|---|---|
| PREV T9 | NEXT T8 | PREV T4 | NEXT T10 | PREV T5 | NEXT T7 | PREV T10 | NEXT T2 |
| STAT ready | PRI 1 | STAT ready | PRI 2 | STAT ready | PRI 3 | STAT ready | PRI 2 |
| T5 | | T6 | | T7 | | T8 | |
| PREV T7 | NEXT T3 | PREV T8 | NEXT T9 | PREV T3 | NEXT T5 | PREV T1 | NEXT T6 |
| STAT ready | PRI 3 | STAT ready | PRI 1 | STAT ready | PRI 3 | STAT ready | PRI 1 |
| T9 | | T10 | | | | | |
| PREV T6 | NEXT T1 | PREV T2 | NEXT T4 | | | | |
| STAT ready | PRI 1 | STAT ready | PRI 2 | | | | |

FIG. 7

TASK QUEUE          282

| PRIORITY | HEAD | TAIL |
|---|---|---|
| 1 | T1 | T9 |
| 2 | T10 | T2 |
| 3 | T7 | T3 |
| 4 | -- | -- |
| 5 | -- | -- |
| 6 | -- | -- |
| 7 | -- | -- |
| 8 | -- | -- |
| ⋮ | ⋮ | ⋮ |
| n | -- | -- |

FIG. 20
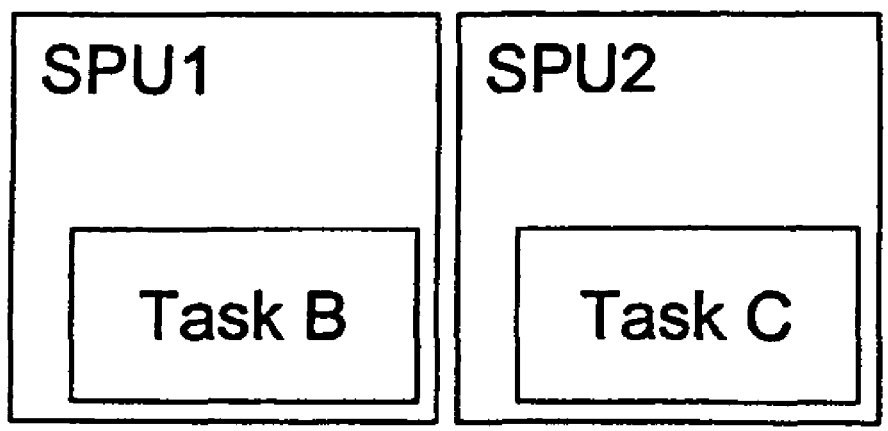
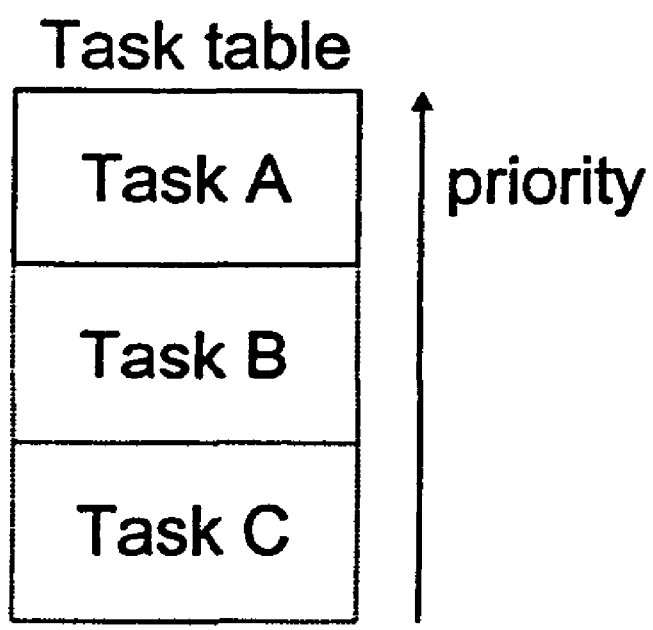

FIG. 23
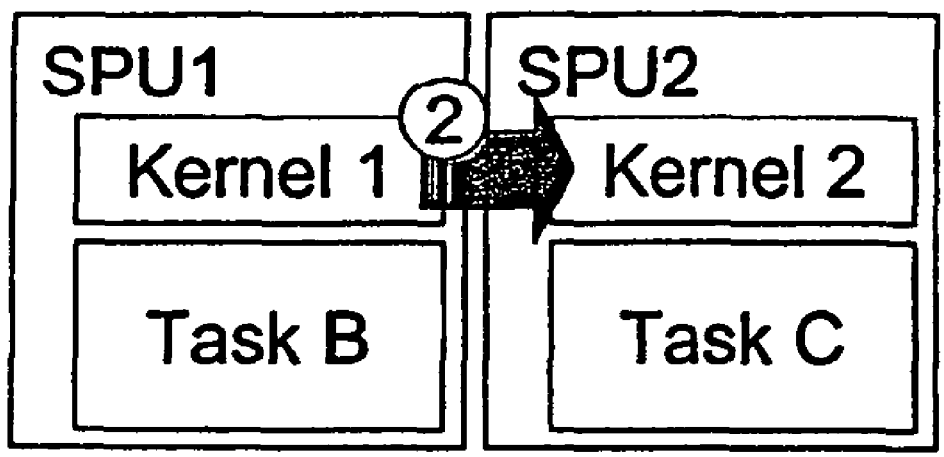
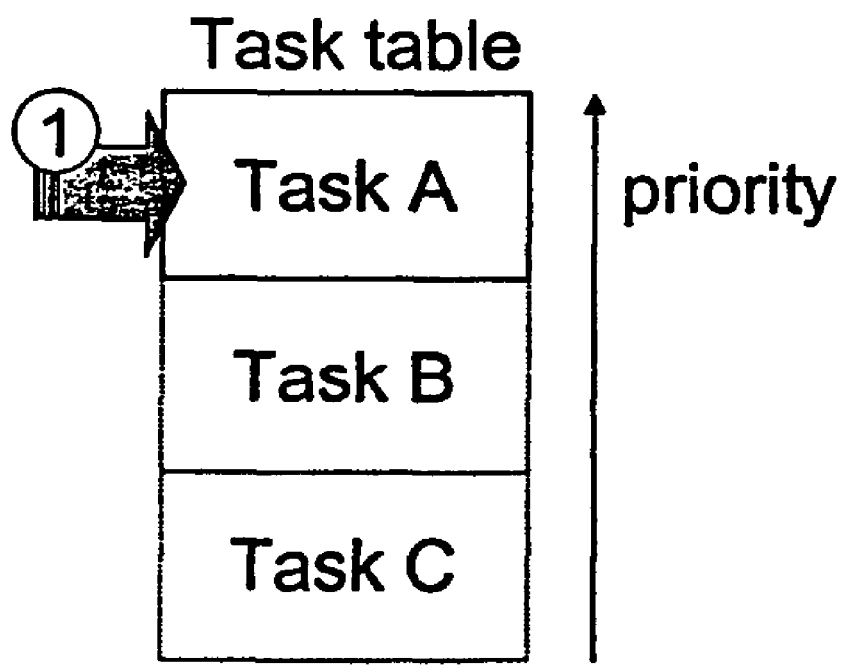

FIG. 25
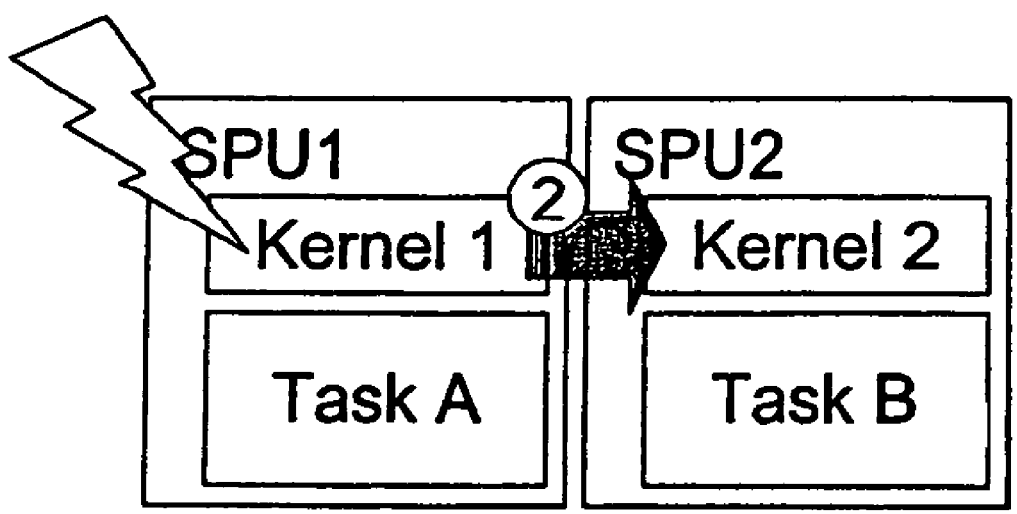
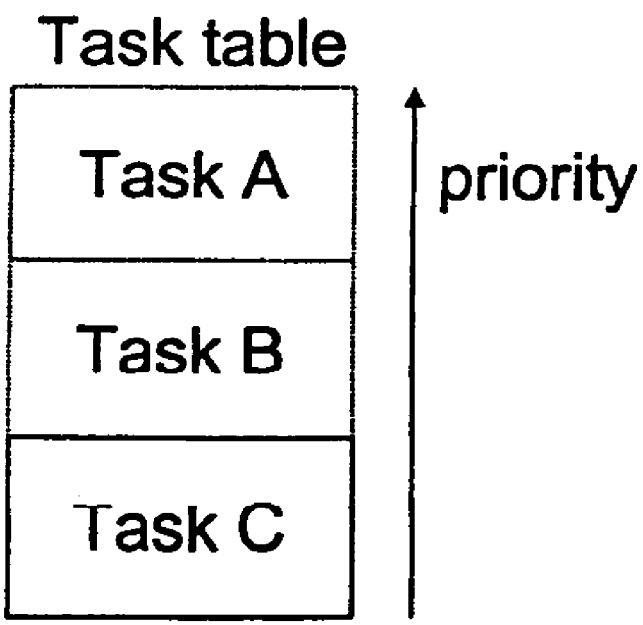

FIG. 26
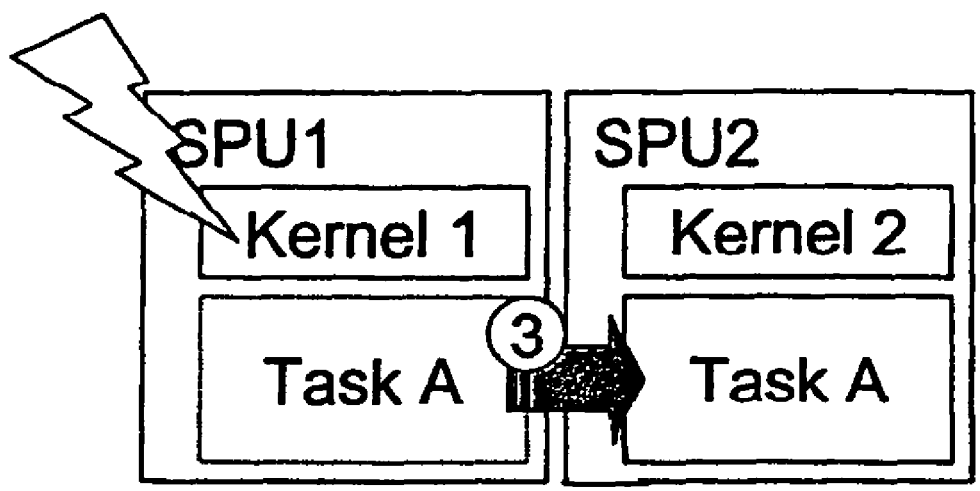
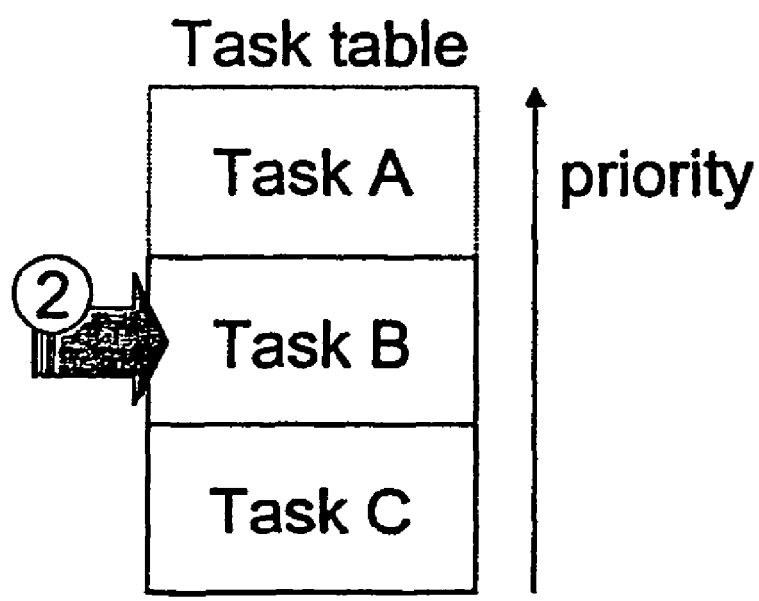

PROCESSOR TASK MIGRATION OVER A NETWORK IN A MULTI-PROCESSOR SYSTEM

CROSS-REFERENCE TO RELATED APPLICATIONS

The present application is a continuation-in-part of U.S. patent application Ser. Nos. 10/783,246 and 10/783,238, both filed Feb. 20, 2004, and claims the benefit of U.S. Provisional Application No. 60/650,153, filed Feb. 4, 2005. The disclosures of each of the foregoing applications are hereby incorporated herein by reference.

BACKGROUND OF THE INVENTION

The present invention relates to methods and apparatus for managing processor tasks in a multi-processing system distributed over a network and, in particular, for scheduling and executing the processor tasks over a network among the sub-processing units of the multi-processing systems on a substantially self-governing basis.

Real-time, multimedia applications are becoming increasingly important. These applications require extremely fast processing speeds, such as many thousands of megabits of data per second. While single processing units are capable of fast processing speeds, they cannot generally match the processing speeds of multi-processor architectures. Indeed, in multi-processor systems, a plurality of sub-processors can operate in parallel (or at least in concert) to achieve desired processing results.

Moreover, multi-processor architectures are of valuable but limited scalability. Larger scales of efficiency can be achieved by grouping multiple multi-processor systems together over a network for distributed processing at speeds exceeding those of each multi-processor system running alone.

The types of computers and computing devices that may employ multi-processing techniques are extensive. In addition to personal computers (PCs) and servers, these computing devices include cellular, telephones, mobile computers, personal digital assistants (PDAs), set top boxes, digital televisions and many others.

Real-time, multimedia software applications are constructed of processing code, such as processing instructions and data. A collection of at least some of the processing instructions and/or the processing data may be referred to as a processor task. While the program statements within a processor task may be executed sequentially, different processor tasks may be executed in parallel on different processors in a multi-processor system, or may be distributed among different multi-processor systems on a network. Thus, the software applications may be considered to contain processor tasks to be executed by the multi-processing system.

A design concern in a multi-processing system is how to manage which sub-processing units of the system execute which processor tasks, and how to manage distribution of processor tasks among multi-processor systems on a network. In some multi-processing systems, the processor tasks specify which of the sub-processing units are to perform the execution. A drawback to this approach is that the programmer may not have optimized the allocation of processor tasks among the sub-processing units. For example, one or more processor tasks may specify the same sub-processing unit at the same time. This dictates that some of the processor tasks be put on hold until the specified sub-processing unit becomes available, thereby delaying their execution. Unfortunately, this also results in an unpredictable latency as to the execution of the processor tasks.

Other systems contemplate that a managing element communicates with the sub-processing units and schedules the processor tasks among them. A communication protocol must therefore be in place to facilitate such communication. Unfortunately, communication protocols often result in message delays between the managing element and the sub-processing units. Indeed, such protocols may require the use of a memory mapped I/O space (using memory mapped registers), which are generally slow. Further, the managing elements (which may themselves be processors of the system) may employ multiple partition domains, which may require significant time to change (e.g., 700 s). These characteristics also delay execution of the processor tasks and result in unpredictable latencies. Thus, overall processor throughput and efficiency of the multi-processing system are sacrificed, which may result in significant impact on the real-time and/or multimedia experience of a user of the system.

Therefore, there are needs in the art for new methods and apparatus for achieving efficient distributed processing of processor tasks among multi-processor systems on a network.

SUMMARY OF THE INVENTION

Methods and systems for migrating a task from a first multi-processor system to a second multi-processor system over a network, such as the Internet are provided in accordance with an aspect of the present invention In accordance with one aspect of the method, a multi-processor determines that a task should be migrated from to one or more additional multi-processors for any of a variety of reasons. When the multi-processor determines that a task should be migrated to another multiprocessor, it broadcasts an application from the first multi-processor system. The application specifies a plurality of tasks and an attribute indicating the distance of the application from at least one of (a) a previous multi-processor broadcasting the application and (b) a multi-processor originally broadcasting the application, and a deadline for completion of each of the plurality of tasks.

In accordance with another aspect of the present invention, the attribute specifies the processing power required to perform the task. Additionally, the same attribute or a different attribute can also specify the memory required to perform the task. The application may specify the plurality of tasks by itself containing the plurality of tasks or via pointer information indicating where the tasks are located.

In accordance with a further aspect of the present invention, the application that was broadcast by a first multi-processor is received at a second multi-processor that is connected to the network. The second multi-processor unbundles the tasks in the application, including the tasks that are to be migrated. The second multi-processor then examines the attribute that specifies the requirements to perform the tasks to determine whether the tasks should be performed by the second multi-processor. The second multi-processor can examine the required processing power and the required memory.

In accordance with another aspect of the present invention, the second multi-processor also examines the distance of the application from at least one of (a) a previous multi-processor broadcasting the application and (b) a multi-processor originally broadcasting the application to determine whether the task should be performed by the second multi-processor. The second multi-processor also preferably advises the first multi-processor whether the second multi-processor is performing the task.

In accordance with another aspect of the present invention, the broadcast application is received by a plurality of other multi-processors. Each of the plurality of other multi-processors unbundle the task or tasks in the application, the task to be migrated being included in the application. Each of the plurality of other multi-processors examines the attribute that specifies the requirements to perform the task to determine whether the task should be performed. Additionally, each of the plurality of other multi-processors preferably also examine the distance of the application from at least one of (a) a previous multi-processor broadcasting the application and (b) a multi-processor originally broadcasting the application, and a deadline for completion of each of said plurality of tasks to determine whether the task should be performed.

In a further aspect of the present invention, there is provided apparatus for migrating tasks, which includes a multi-processor connectable to a network and programmed to determine whether a task should be performed by the multi-processor or migrated to one or more additional multi-processors connected to the network. The multi-processor directs the broadcast of an application from the multi-processor over the network when it determines that the task should be migrated to the one or more additional multi-processors, wherein the application specifies a plurality of tasks and an attribute indicating a distance of the application from at least one of (a) a previous multi-processor broadcasting the application and (b) a multi-processor originally broadcasting the application, and a deadline for completion of each of the plurality of tasks. Other aspects, features, and advantages of the present invention will be apparent to one skilled in the art from the description herein taken in conjunction with the accompanying drawings.

BRIEF DESCRIPTION OF THE DRAWINGS

For the purposes of illustration, there are embodiments shown in the drawings that are presently preferred, it being understood, however, that the invention is not limited to the precise arrangements and instrumentalities shown.

FIG. 5 is an illustration of an example of a processor task table that may be used in accordance with one or more aspects of the present invention;

FIG. 7 is an illustration of an example of a task queue that may be used in conjunction with the task table of FIG. 5 to manage the execution of processor tasks;

FIG. 20 is a block diagram illustrating non-preemptive processor task migration features of certain aspects of the present invention;

FIG. 23 is a block diagram illustrating preemptive multi-tasking features of certain aspects of the present invention;

FIG. 25 is a block diagram illustrating preemptive processor task migration features of certain aspects of the present invention;

FIG. 26 is a block diagram illustrating further preemptive processor task migration features of certain aspects of the present invention;

DETAILED DESCRIPTION

Figure 1:
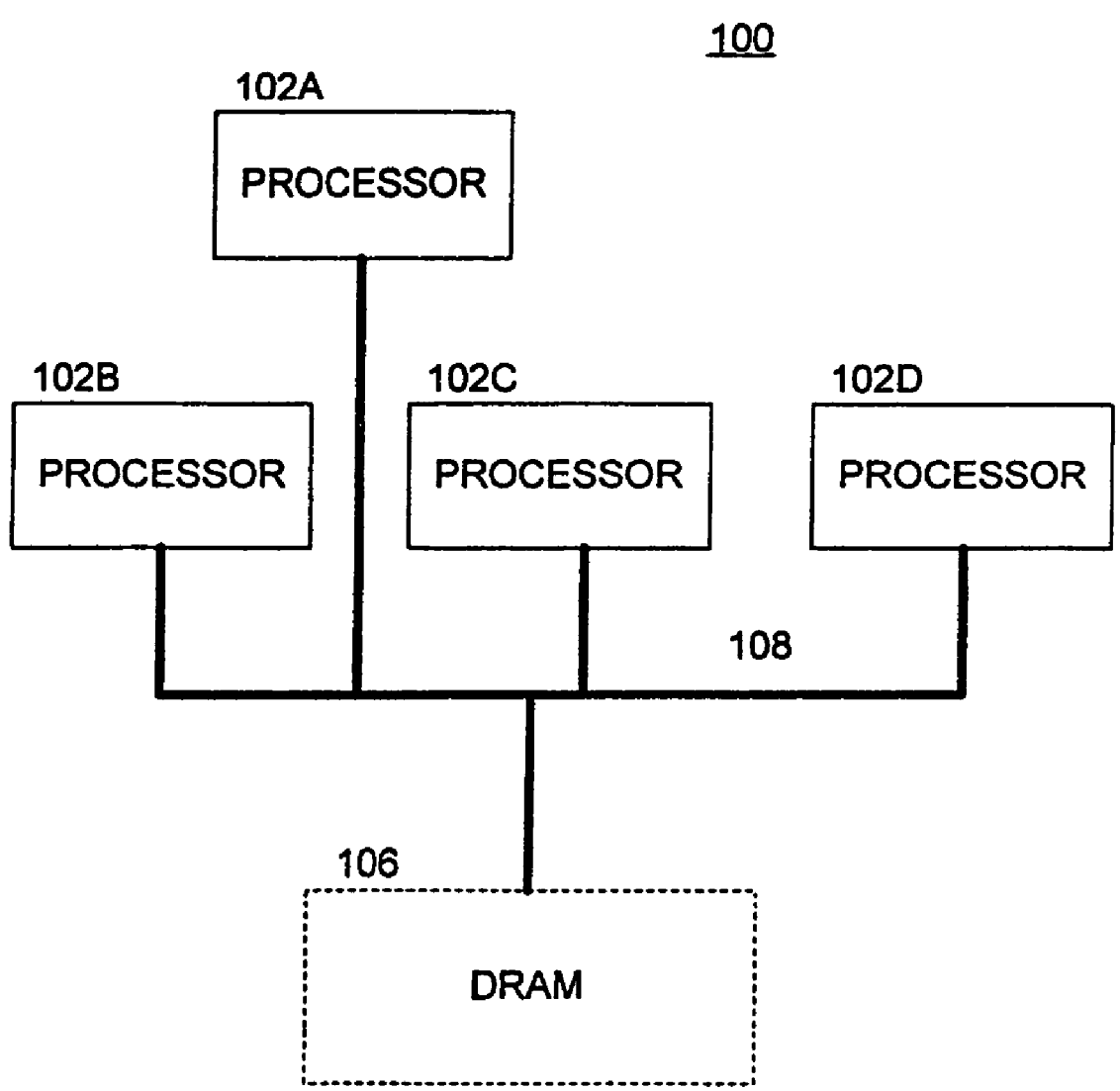
FIG. 1 is a diagram illustrating the structure of a multi-processing system in accordance with one or more aspects of the present invention.

With reference to the drawings, where like numerals indicate like elements, there is shown in FIG. 1 a multi-processing system 100 in accordance with one or more aspects of the present invention. The multi-processing system 100 includes a plurality of processors 102 (any number may be used) coupled to a shared memory 106, such as a DRAM, over a bus 108. It is noted that the shared memory 106 need not be a DRAM; indeed, it may be formed using any known or hereinafter developed technology.

One of the processors 102 is preferably a main processing unit, for example, processing unit 102A. The other processing units 102 are preferably sub-processing units (SPUs), such as processing units 102B, 102C, 102D, etc. The sub-processing units 102 may be implemented using any of the known or hereinafter developed computer architectures. All of the sub-processing units 102 need not be implemented using the same architecture; indeed they may be of heterogeneous or homogenous configurations. It is noted that the main processing unit 102A may be disposed locally with respect to the sub-processing units 102B-D, such as in the same chip, in the same package, on the same circuit board, in the same product, etc. Alternatively, the main processing unit 102A may be remotely located from the sub-processing units 102B-D, such as in different products, which may be coupled over a bus, a communications network (such as the Internet) or the like. Similarly, the sub-processing units 102B-D may be locally or remotely located from one another.

The main processing unit 102A may be used to schedule and orchestrate the processing of data and applications by the sub-processing units 102B-D such that the sub-processing units 102B-D perform the processing of these data and applications in a parallel and independent manner. In accordance with some aspects of the present invention, however, the main processing unit 102A does not take a central role in scheduling the execution of processor tasks among the sub-processing units. Rather, such scheduling is preferably left to the SPUs themselves.

The assignment of roles and functions to the processors 102 in FIG. 1 is flexible. For example, any of the processors 102 can be a main processor unit or sub-processing units.

Figure 2:
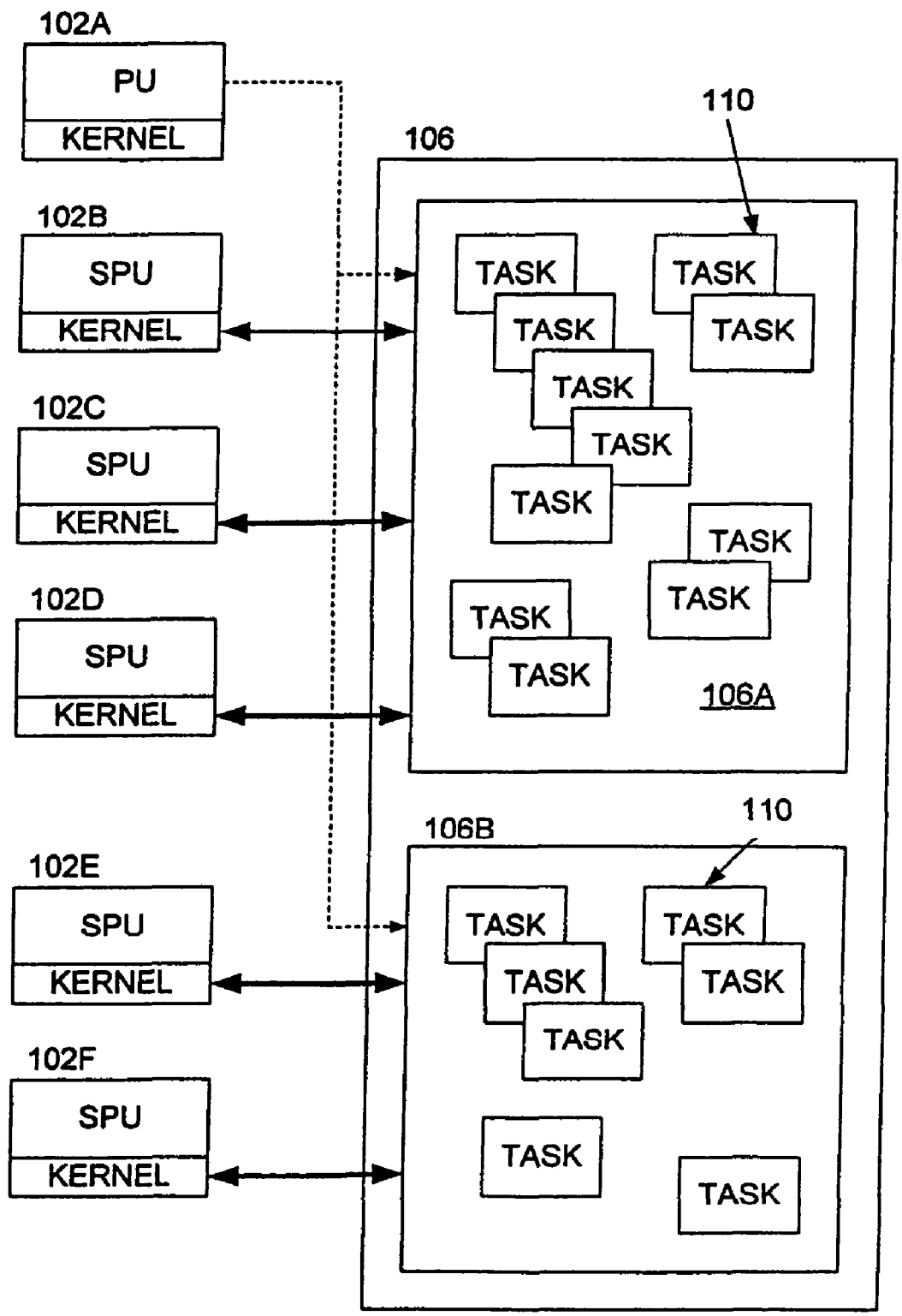
FIG. 2 is a block diagram illustrating the storage of processor tasks in a shared memory.

With reference to FIG. 2, the main processing unit 102A preferably assumes the role of a service processor to the SPUs 102B-F, particularly when it comes to the scheduling and management of the processor tasks among the SPUs. In accordance with some aspects of the present invention, the main processing unit 102A may evaluate the processor tasks that are contained within a software application and take part in the allocation of the shared memory 106, the allocation of the SPUs, and the initial storage of the processor tasks 110 within the shared memory 106. As to the allocation of the shared memory 106, the main processing unit 102A preferably determines how much of the memory space should be allocated to a given number of processor tasks 110. In this regard, the main processing unit 102A may allocate a first area 106A of the shared memory 106 for storage of some processor tasks 110, and may allocate a second area 106B of the shared memory 106 for storage of other processor tasks 110. The main processing unit 102A may also establish rules as to data synchronization within the respective areas 106A and 106B of the shared memory 106.

In accordance with one or more further aspects of the invention, the respective areas 106A and 106B of the shared memory 106 can only be accessed by a prescribed number of sub-processing units 102, such as the sub-processing units 102 that are allocated to perform the particular processor tasks 110 that are stored within a given area of the shared memory 106. For example, sub-processing units 102B-D are preferably the only SPUs that are permitted to access the processor tasks 110 within the first area 106A of the shared memory 106. Likewise, the sub-processing units 102E-F are preferably the only SPUs that are permitted to access the processor tasks 110 within the second area 106B of the shared memory 106. Further details concerning the techniques of protecting the respective areas 106A and 106B of the shared memory 106 may be found in U.S. Pat. No. 6,526,491, entitled MEMORY PROTECTION SYSTEM AND METHOD FOR COMPUTER ARCHITECTURE FOR BROADBAND NETWORKS, the entire disclosure of which is hereby incorporated by reference.

In accordance with one or more further aspects of the present invention, once the processor tasks 110 are disposed within the shared memory 106 and the sub-processing units 102 are allocated to execute the tasks, the main processing unit 102A preferably does not participate in the scheduling and management of the execution of the processor tasks 110. Instead, those responsibilities are left to the particular sub-processing units 102 involved.

Prior to discussing further details regarding the processor task management features of the various embodiments of the present invention, a description of a preferred computer architecture for implementing a multi-processor system will be discussed. In this regard, reference is now made to FIG. 3, which is a block diagram of a basic processing module or processor element (PE) 200. In accordance with this computer architecture, all sub-processors of a multi-processing computer system are constructed from a common computing module (or cell). This common computing module has a consistent structure and preferably employs the same instruction set architecture. In alternative embodiments of the present invention, the sub-processing units may be of heterogeneous configurations. The multi-processing computer system can be formed of one or more clients, servers, PCs, mobile computers, game machines, PDAs, set top boxes, appliances, digital televisions and other devices using, computer processors.

Figure 3:
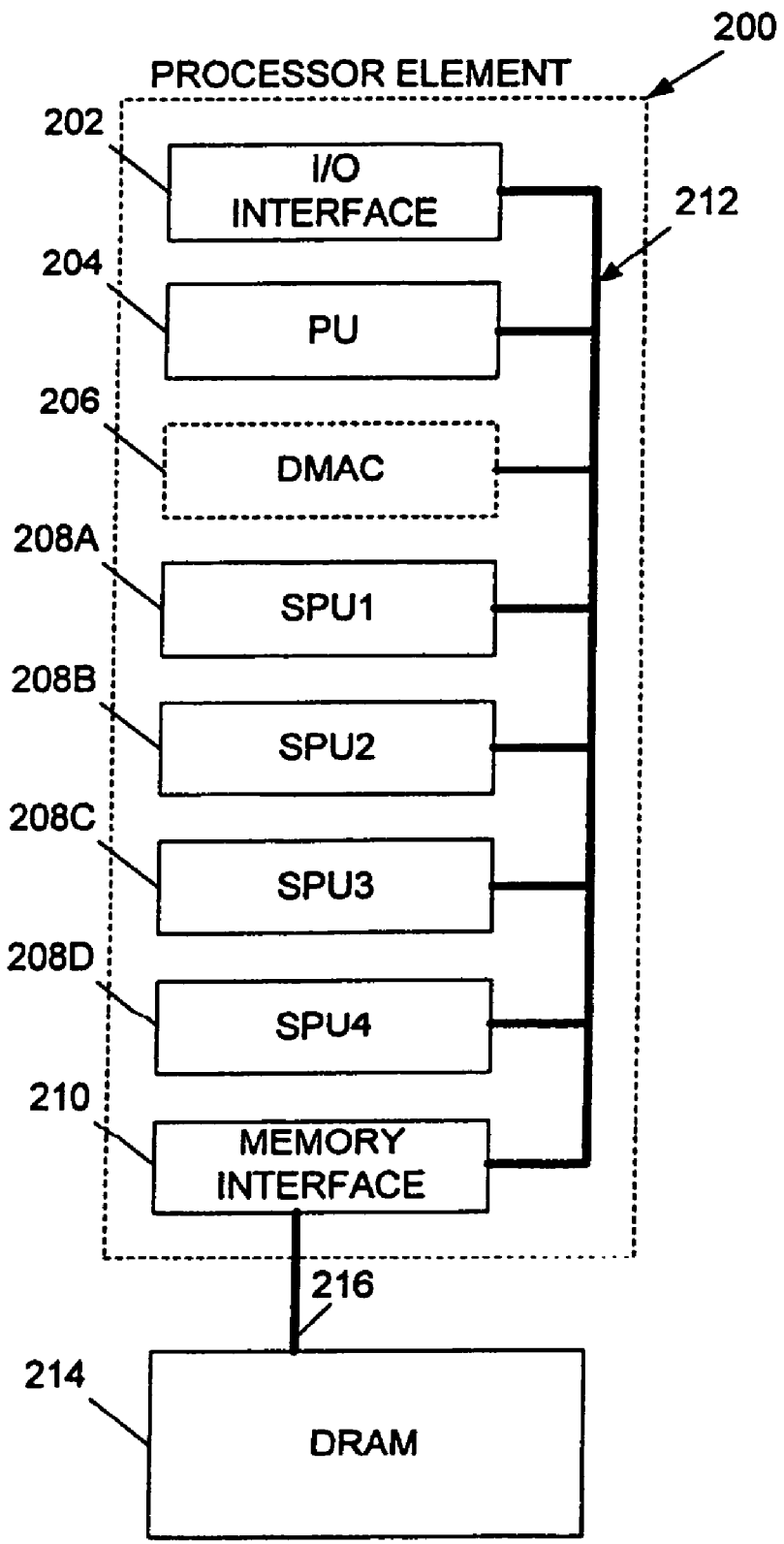
FIG. 3 is a diagram illustrating a preferred structure of a processor element (PE) in accordance with the present invention.

The basic processing module is a processor element (PE). As shown in FIG. 3, the PE 200 comprises an I/O interface 202, a processing unit (PU) 204, a direct memory access controller (DMAC) 206, and a plurality of sub-processing units 208, namely, sub-processing unit 208A, sub-processing unit 208B, sub-processing unit 208C, and sub-processing unit 208D. A local (or internal) PE bus 212 transmits data and applications among the PU 204, the sub-processing units 208, the DMAC 206, and a memory interface 210. The local PE bus 212 can have, e.g., a conventional architecture or can be implemented as a packet switch network. Implementation as a packet switch network, while requiring more hardware, increases available bandwidth.

The PE 200 can be constructed using various methods for implementing digital logic. The PE 200 preferably is constructed, however, as a single integrated circuit employing a complementary metal oxide semiconductor (CMOS) on a silicon substrate. Alternative materials for substrates include gallium arsenide, gallium aluminum arsenide and other so-called III-B compounds employing a wide variety of dopants. The PE 200 also could be implemented using superconducting material, e.g., rapid single-flux-quantum (RSFQ) logic.

The PE 200 is closely associated with a dynamic random access memory (DRAM) 214 through a high bandwidth memory connection 216. The DRAM 214 functions as the main (or shared) memory for the PE 200. Although the DRAM 214 preferably is a dynamic random access memory, the DRAM 214 could be implemented using other means, e.g., as a static random access memory (SRAM), a magnetic random access memory (MRAM), an optical memory, a holographic memory, etc. The DMAC 206 and the memory interface 210 facilitate the transfer of data between the DRAM 214 and the sub-processing units 208 and the PU 204 of the PE 200. It is noted that the DMAC 206 and/or the memory interface 210 may be integrally or separately disposed with respect to the sub-processing units 208 and the PU 204. Indeed, instead of a separate configuration as shown, the DMAC 206 function and/or the memory interface 210 function may be integral with one or more (preferably all) of the sub-processing units 208 and the PU 204.

The PU 204 can be, e.g., a standard processor capable of stand-alone processing of data and applications. The sub-processing units 208 preferably are single instruction, multiple data (SIMD) processors. The sub-processing units 208 perform the processing of data and applications, preferably in a parallel and independent manner. The DMAC 206 controls accesses by the PU 204 and the sub-processing units 208 to the data and applications (e.g., the processor tasks 110) stored in the shared DRAM 214. It is noted that the PU 204 may be implemented by one of the sub-processing units 208 taking on the role of a main processing unit.

In accordance with this modular structure, the number of PEs 200 employed by a particular computer system is based upon the processing power required by that system. For example, a server may employ four PEs 200, a workstation may employ two PEs 200 and a PDA may employ one PE 200. The number of sub-processing units of a PE 200 assigned to processing a particular software cell depends upon the complexity and magnitude of the programs and data within the cell.

Figure 4:
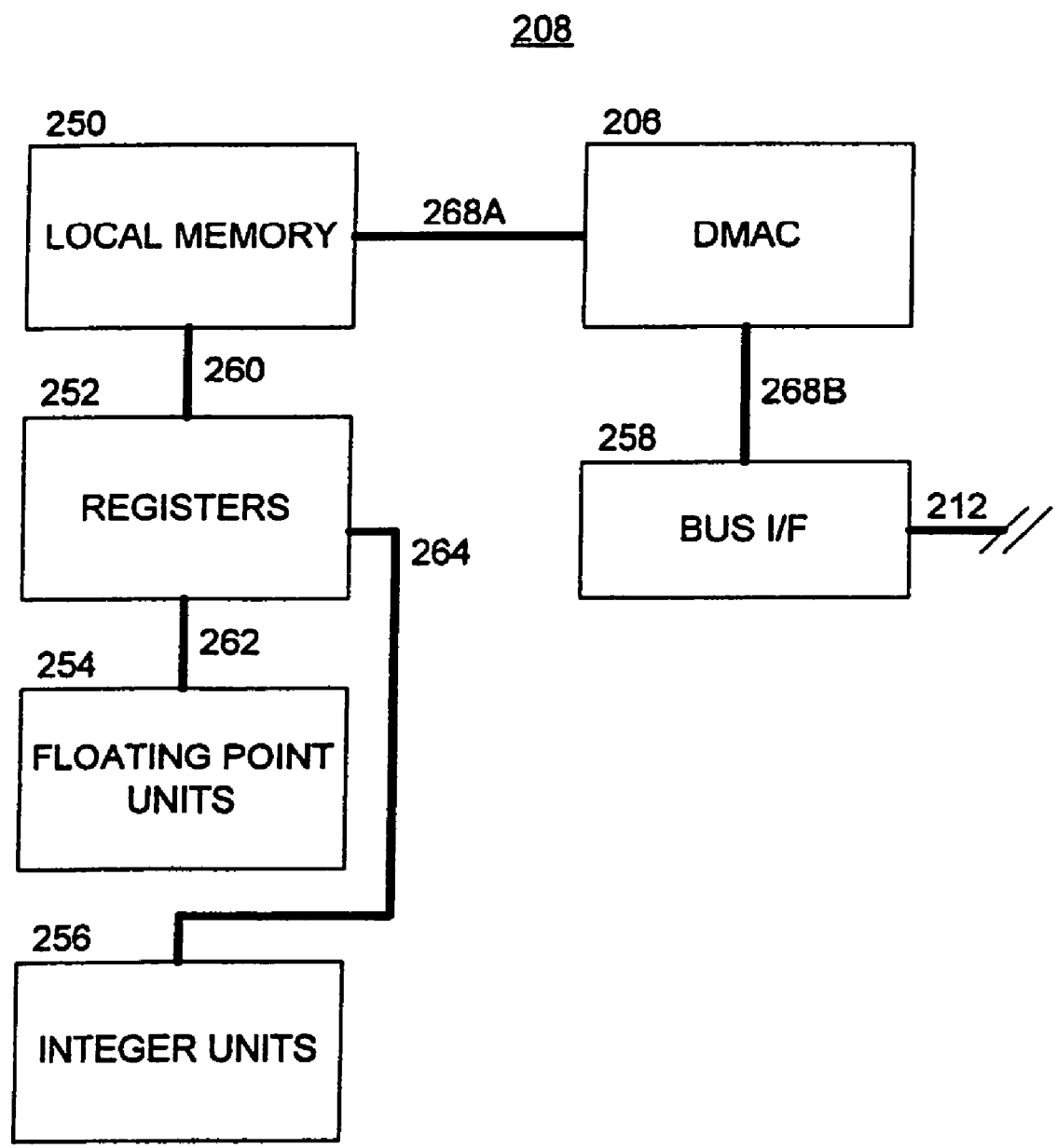
FIG. 4 is a diagram illustrating the structure of an exemplary sub-processing unit (SPU) in accordance with the present invention.

FIG. 4 illustrates the preferred structure and function of a sub-processing unit 208. The sub-processing unit 208 includes local memory 250, registers 252, one or more floating point units 254 and one or more integer units 256. Again, however, depending upon the processing power required, a greater or lesser number of floating points units 254 and integer units 256 may be employed. The floating point units 254 preferably operate at a speed of 32 billion floating point operations per second (32 GFLOPS), and the integer units 256 preferably operate at a speed of 32 billion operations per second (32 GOPS).

In a preferred embodiment, the local memory 250 contains 256 kilobytes of storage, and the capacity of registers 252 is 128×128 bits. It is noted that the processor tasks 110 are not executed using the shared memory 214. Rather, the tasks 110 are copied into the local memory 250 of a given sub-processing unit 208 and executed locally.

The local memory 250 may or may not be a cache memory. The local memory 250 is preferably constructed as a static random access memory (SRAM). A PU 204 may require cache coherency support for direct memory accesses initiated by the PU 204. Cache coherency support is not required, however, for direct memory accesses initiated by the sub-processing units 208 or for accesses from and to external devices.

The sub-processing unit 208 further includes a bus interface (I/F) 258 for transmitting applications and data to and from the sub-processing unit 208. In a preferred embodiment, the bus I/F 258 is coupled to a DMAC 206, which is shown in dashed line to indicate that it may be integrally disposed within the sub-processing unit 208 as shown or may be externally disposed (as shown in FIG. 3). A pair of busses 268A, 268B interconnect the DMAC 206 between the bus I/F 258 and the local memory 250. The busses 268A, 268B are preferably 256 bits wide.

The sub-processing unit 208 further includes internal busses 260, 262 and 264. In a preferred embodiment, the bus 260 has a width of 256 bits and provides communications between the local memory 250 and the registers 252. The busses 262 and 264 provide communications between, respectively, the registers 252 and the floating point units 254, and the registers 252 and the integer units 256. In a preferred embodiment, the width of the busses 264 and 262 from the registers 252 to the floating point or the integer units is 384 bits, and the width of the busses 264 and 262 from the floating point or the integer units 254, 256 to the registers 252 is 128 bits. The larger width of these busses from the registers 252 to the floating point or the integer units 254, 256 than from these units to the registers 252 accommodates the larger data flow from the registers 252 during processing. A maximum of three words are needed for each calculation. The result of each calculation, however, normally is only one word.

Turning again to the various processor tasks management features of the present invention, and with reference to FIG. 2, it is preferable that the sub-processing units 102 utilize a task table in order to determine which of the processor tasks 110 should be copied from the shared memory 106 and into one of the local memories of the SPUs 102 for execution. In this regard, reference is now made to FIG. 5, which is a conceptual illustration of a task table 280 that may be utilized in accordance with various aspects of the present invention. The task table 280 is preferably stored in the shared memory 106 (the details of how the task table 280 is initialized will be discussed later). The task table 280 preferably includes a plurality of task table entries T1, T2, T3, etc. Each task table entry is preferably associated with one of the processor tasks 110 (FIG. 2), for example, by way of associative addressing or some other means for relating the task table entries to the processor tasks 110.

In a preferred embodiment, each of the task table entries may include at least one of a status indication (STAT), a priority indication (PRI), and a pair of pointers (PREV, NEXT). The STAT preferably provides an indication as to whether the processor task associated with the given task table entry is READY to be executed by (or is RUNNING on)

one or more of the sub-processing units. The PRI preferably provides an indication as to a priority level of the associated processor task 110. There may be any number of priority levels-associated with the processor tasks 110, which may be established by the software programmer or may be later established through execution of the software application. In any event, the priority levels of the processor tasks 110 may be utilized to establish an order in which the processor tasks are executed. The PREV value is preferably a pointer to a previous task table entry (or to a previous processor task 110) in an ordered list of linked task table entries (or list of processor tasks). The NEXT value is preferably a pointer to a NEXT task table entry (or processor task) in the ordered list of linked task table entries (or processor tasks).

In accordance with one or more aspects of the present invention, the task table 280 is preferably utilized by the sub-processing unit 102 in order to determine an order in which the processor tasks 110 are copied from the shared memory 106 for execution. For example, in order to properly execute a software application on the multi-processing system 100 or 200, certain processor tasks 110 may need to be executed in a particular order, or at last in terms of a general order, say T1, T8, T6, and T9. In order to reflect this illustrative example of processor task ordering, the task table 280 preferably contains pointers in the respective PREV and NEXT portions of the task table entries that create a linked list of task table entries, and by extension processor tasks. In accordance with the particularities of the above example, the task table entry T1 includes a NEXT value that points to task table entry T8. Task table entry T8 includes a PREV value that points to task table entry T1, and contains a NEXT value that points to task table entry T6. Task table entry T6 includes a PREV value that points to task table entry T8, and a NEXT value that points to task table entry T9. Task table entry T9 includes a PREV value that points to task table entry T6.

Figure 6:
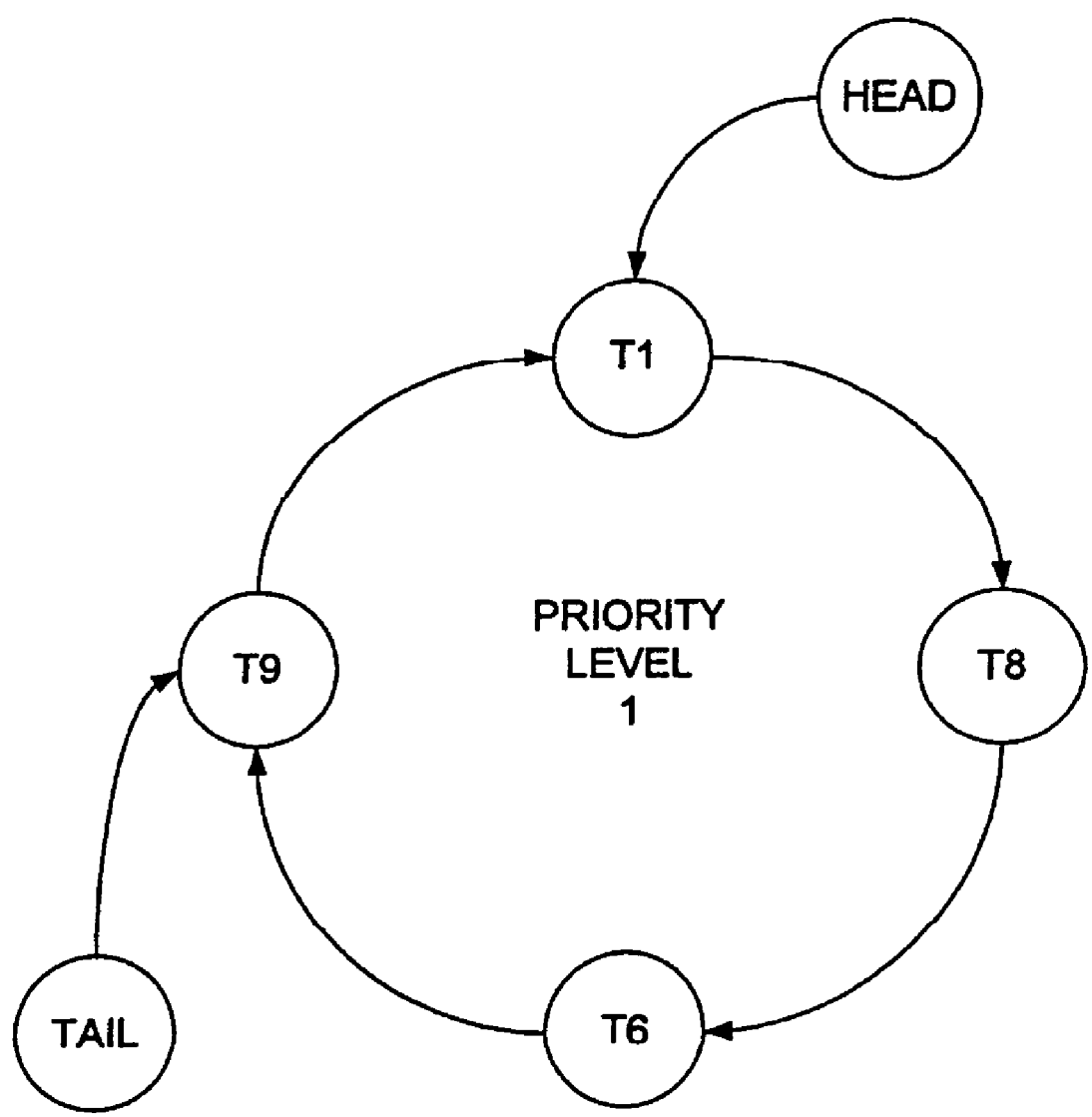
FIG. 6 is a state diagram of a linked list of processor tasks established by the task table of FIG. 5.

With reference to FIG. 6, the linked list of task table entries of the above example may be conceptually illustrated as a state diagram in which a transition from a particular processor task associated with task table entry T1 results in the selection and execution of another processor task that is associated with task table entry T8. A transition from the processor task associated with task table entry T8 results in the selection and execution of a processor task associated with task table entry T6, and so on. A circular association of the task table entries (and/or the processor tasks themselves) may be obtained by insuring that the first, or head, task table entry T1 includes a PREV value that points to task table entry T9, and that task table entry T9 includes a NEXT value that points to task table entry T1.

During operation, the respective sub-processing units 102 that are allocated to execute the pool of processor tasks 110 (preferably within a given area 106A or 106B) of the shared memory 106 first access the task table 280 to determine which processor task 110 should be taken up next for execution. In order to aid in the identification of the first (or head) entry of the linked list, the sub-processing units 102 preferably also have access to a task queue 282, which is conceptually illustrated in FIG. 7. The task queue 282 preferably includes an entry for each priority level of the associated processor tasks 110. Each entry preferably includes at least one of a HEAD pointer and a TAIL pointer.

With further reference to FIG. 6, the illustrated state diagram of the exemplary linked list is representative of processor tasks 110 having a priority level of 1. Indeed, each task table entry (FIG. 5) for entries T1, T8, T6, and T9 include PRI values of 1.

The HEAD pointer and TAIL pointer of the task queue entry associated with priority level 1 contain pointers to task table entry T1 an task table entry T9, respectively. The other entries of the task queue 282 are associated with the HEAD and TAIL pointers of other priority levels for other linked lists. In this manner, it is contemplated that various embodiments of the present invention may include multiple linked lists of task table entries (and by extension processor tasks), where each linked list contains entries of the same or a least similar priority levels. The respective sub-processing units 102 preferably utilize the task table 280 and the task queue 282 to determine which of the processor tasks 110 should be copied from the shared memory 106 for execution. Provided that the respective linked lists are created and maintained properly, the processor tasks 110 may be executed in the proper order in order to achieve desirable results in the execution of the overall software application.

Figure 8:
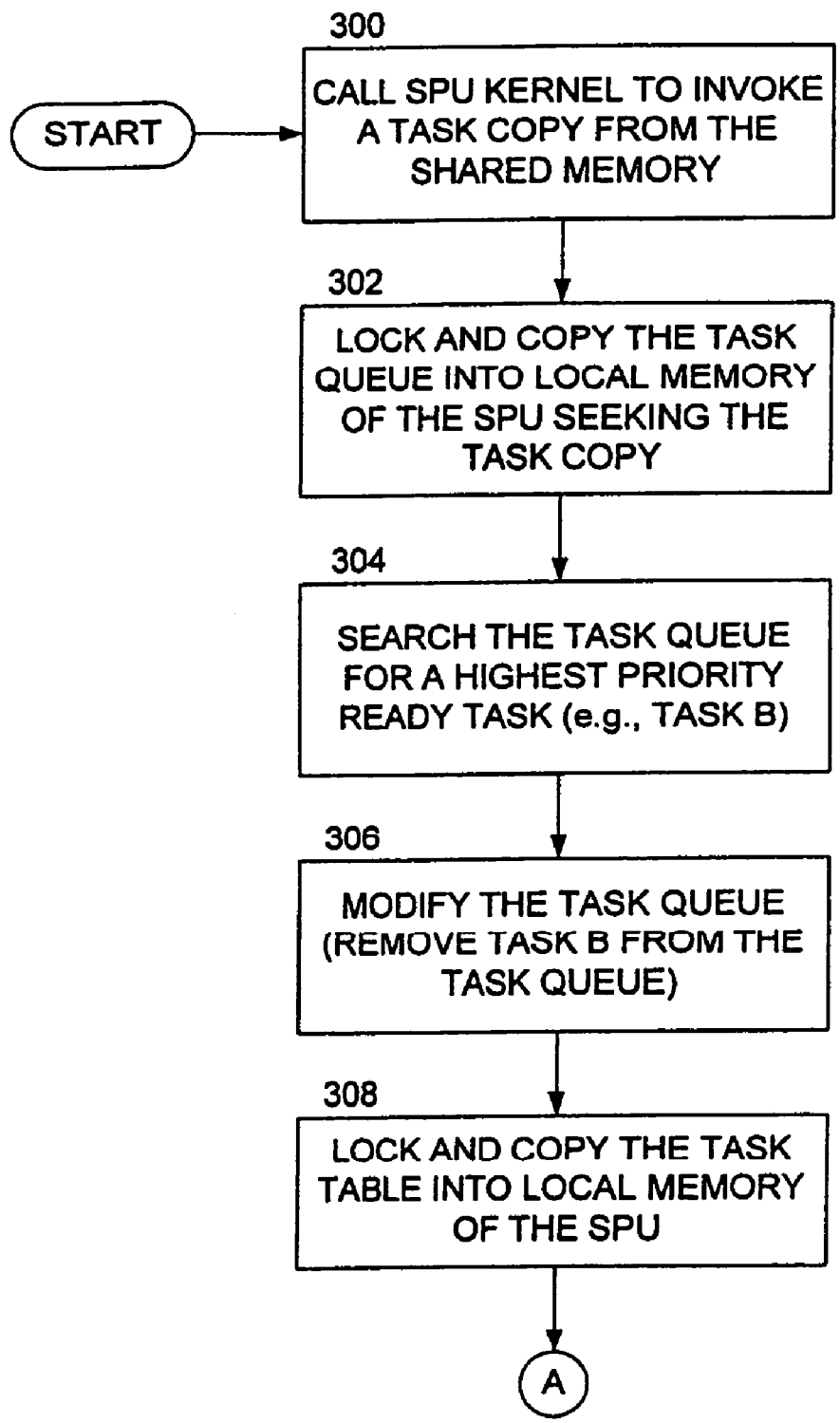
FIG. 8 is a flow diagram illustrating process steps that may be carried out by the multi-processing system in accordance with one or more aspects of the present invention.

In accordance with various aspects of the present invention, the sub-processing units 102 maintain and modify the task table 280 and the task queue 282 during execution of the software application. In this regard, reference is now made to FIGS. 8-10, which are flow diagrams illustrating a process flow that is suitable for achieving one or more desirable features of the present invention. At action 300, a particular sub-processing unit 102 is called to initiate the copying of a processor task 110 from the shared memory 106 to the local memory thereof. At action 302, the sub-processing unit 102 locks and copies the task queue 282 into its local memory. Thereafter, the task queue 282 is searched for a highest priority ready task (action 304). Using the example illustrated in FIG. 7, the task queue 282 includes a HEAD pointer that points to the task table entry T1, which is associated with a processor task of highest priority, such as priority level 1. Since the processor task associated with task table entry T1 is targeted for execution, the sub-processing unit 102 preferably modifies the task queue 282 to remove the reference to that processor task (action 306). In accordance with a preferred embodiment, this entails modification of the HEAD pointer to the TASK table entry T1 to another task table entry that will become a new first (or head) task table entry indicating the next processor task that should be taken up for execution. In particular, the NEXT pointer of the task table entry T1 may be used as the new HEAD pointer of priority level 1. Indeed, as illustrated in FIG. 6, once the processor task associated with task table entry T1 is being executed (or RUNNING) it is no longer in the READY state and should be removed from the state diagram. This should leave the task table entry T8 as the head entry of the state diagram. As task table entry T1 will no longer be part of the READY state diagram, the PREV pointer of the task table entry T8 may be modified to point to task table entry T9. Thus, at action 308 that task table is labeled and copied into the local memory of the SPU 102 such that it may be modified. Similarly, the NEXT pointer of the task table entry T9 may be modified to point to the task table entry T8.

Figure 9:
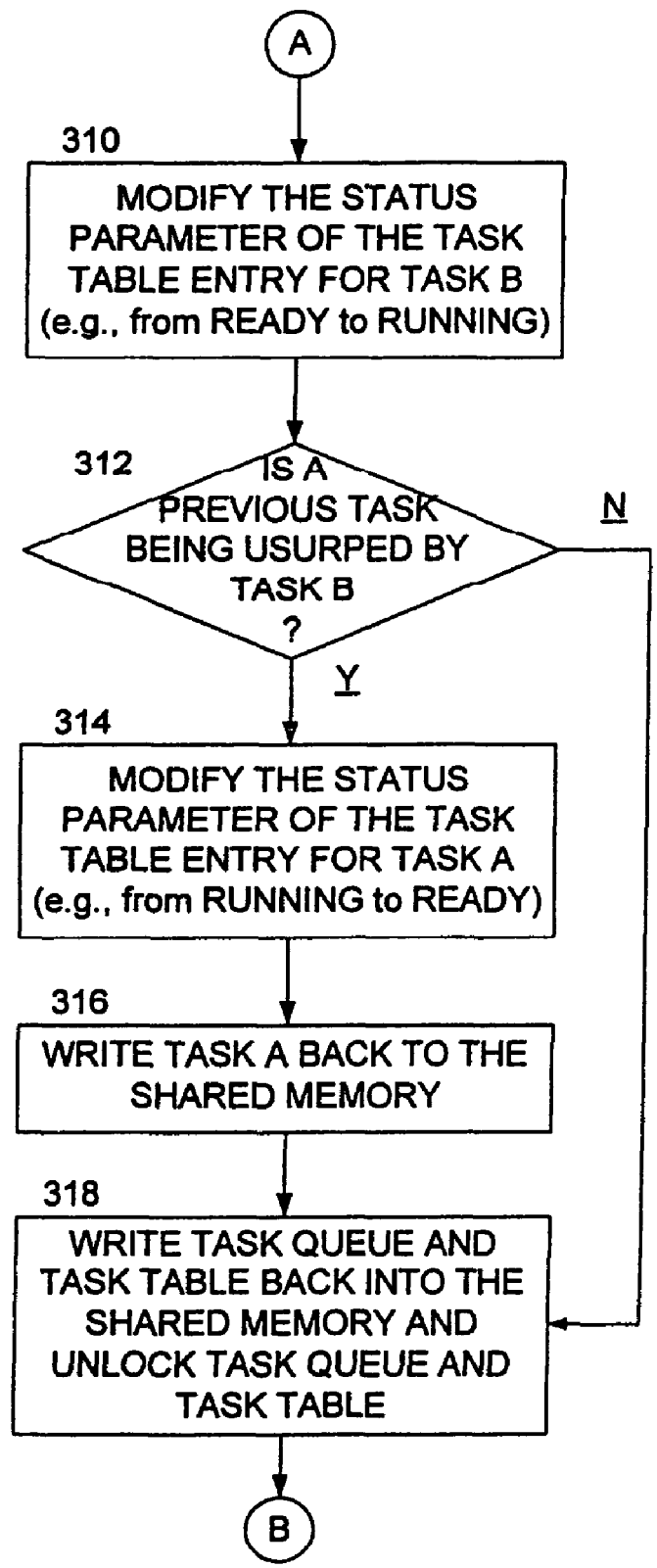
FIG. 9 is a flow diagram illustrating further process steps that may be carried out by the multi-processing system in accordance with the present invention.
Figure 10:
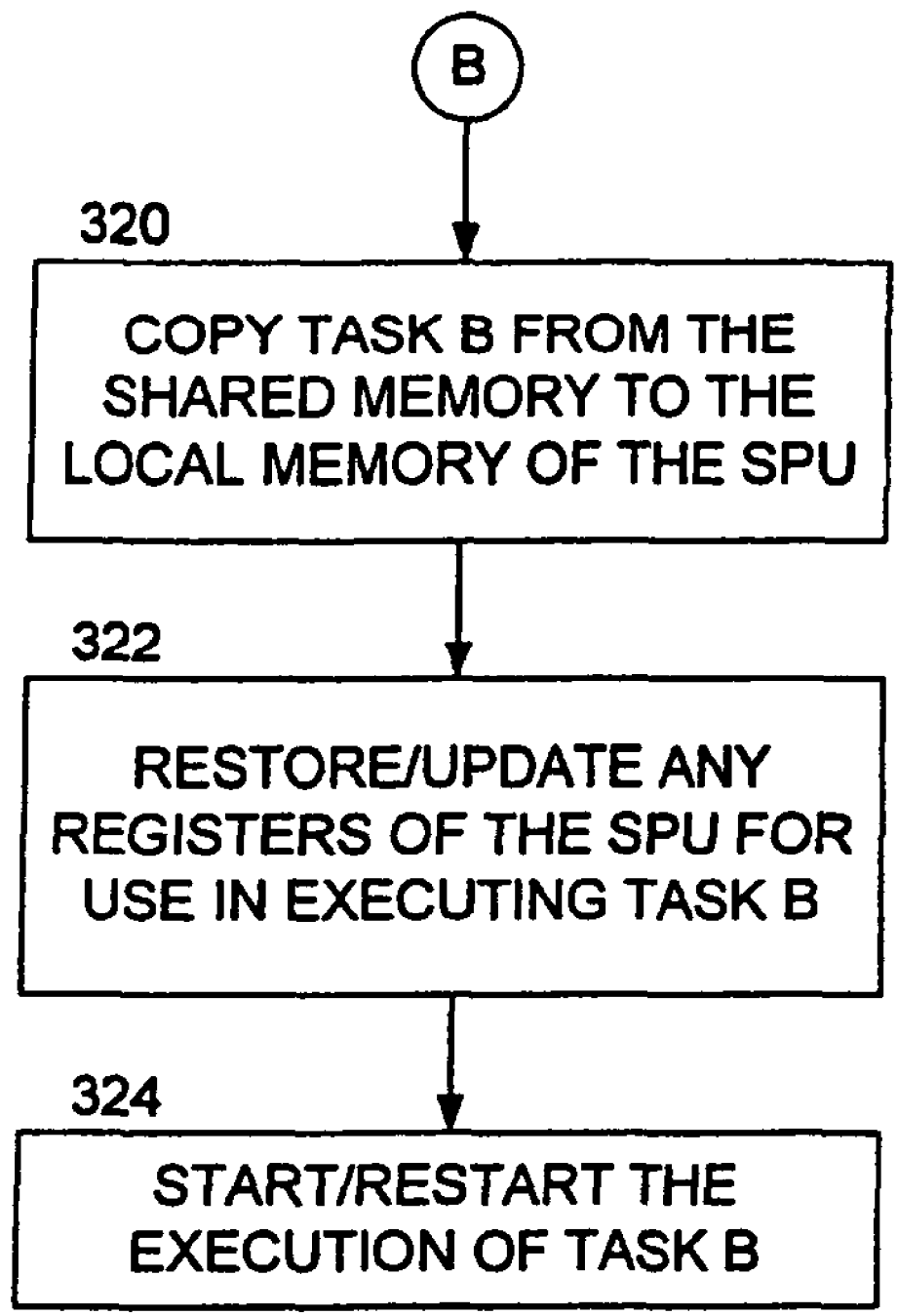
FIG. 10 is a flow diagram illustrating still further process steps that may be carried out by the multi-processing system in accordance with the present invention.

In accordance with preferable aspects of the present invention, the SPU 102 preferably modifies the STAT value of the task table entry T1 from READY to RUNNING (action 310, FIG. 9). As action 312, a determination is preferably made as to whether the SPU 102 was running a previous task at the time that it was called (action 300) to invoke a next task. This may occur when a previous task running on the SPU 102 yields to another task. For purposes of the present example, it is assumed that a previous task neither yielded to, nor was otherwise usurped by, the next processor task 110 and that the result of the determination at action 312 is in the negative. Accordingly, the process flow preferably advances to action 318, where the SPU 102 writes the modified task queue 282 and the modified task table 280 back into the shared memory 106. At this point, the task table 280 and the task queue 282 have been updated and, in accordance with preferred synchronization techniques, are unlocked such that they may be copied and modified by other sub-processing units 102.

If the result of the determination at action 312 is in the affirmative, such as would be the case if a previous processor task 110 yielded to the next processor task for execution, the process flow preferably advances to action 314. There, the SPU preferably modifies the STAT value of the task table entry associated with the yielding processor task from RUNNING to READY. Further, the SPU may then modify the PREV and NEXT pointers of various task table entries (including the task table entry associated with the yielding processor task) in order to reintroduce the yielding processor task back into the appropriate linked list. Preferably, this is accomplished by referencing the priority level of the yielding processor task 110 as reflected in the PRI value of the associated task table entry. At action 316, the yielding processor task may be written back into the shared memory 106 such that it may be taken up at a later time. Thereafter, the process flow advances to action 318, where the task queue 282 and the task table 280 are written back into the shared memory 106.

At action 320 (FIG. 10), the next processor task 110 (e.g., the processor task associated with task table entry T8) is copied by the sub-processing unit 102 from the shared memory 106 to the local memory thereof. At action 322, the sub-processing unit 120 preferably restores and/or updates registers thereof (e.g., with any data associated with the new processor task) for use in executing the new processor task 110. Finally, at action 324, the new processor task 110 is executed by the sub-processing unit 102.

It is noted that the above sequence of actions is presented by way of example only and it should be understood by those skilled in the art that the sequence of these actions may be modified without departing from the spirit and scope of the present invention. For example, as will be discussed later in this description, the order in which the processor tasks are copied from and written back into the shared memory 106 and the order in which the task table and task queue 282 are utilized, may be modified in order to achieve desirable results.

Figure 11:
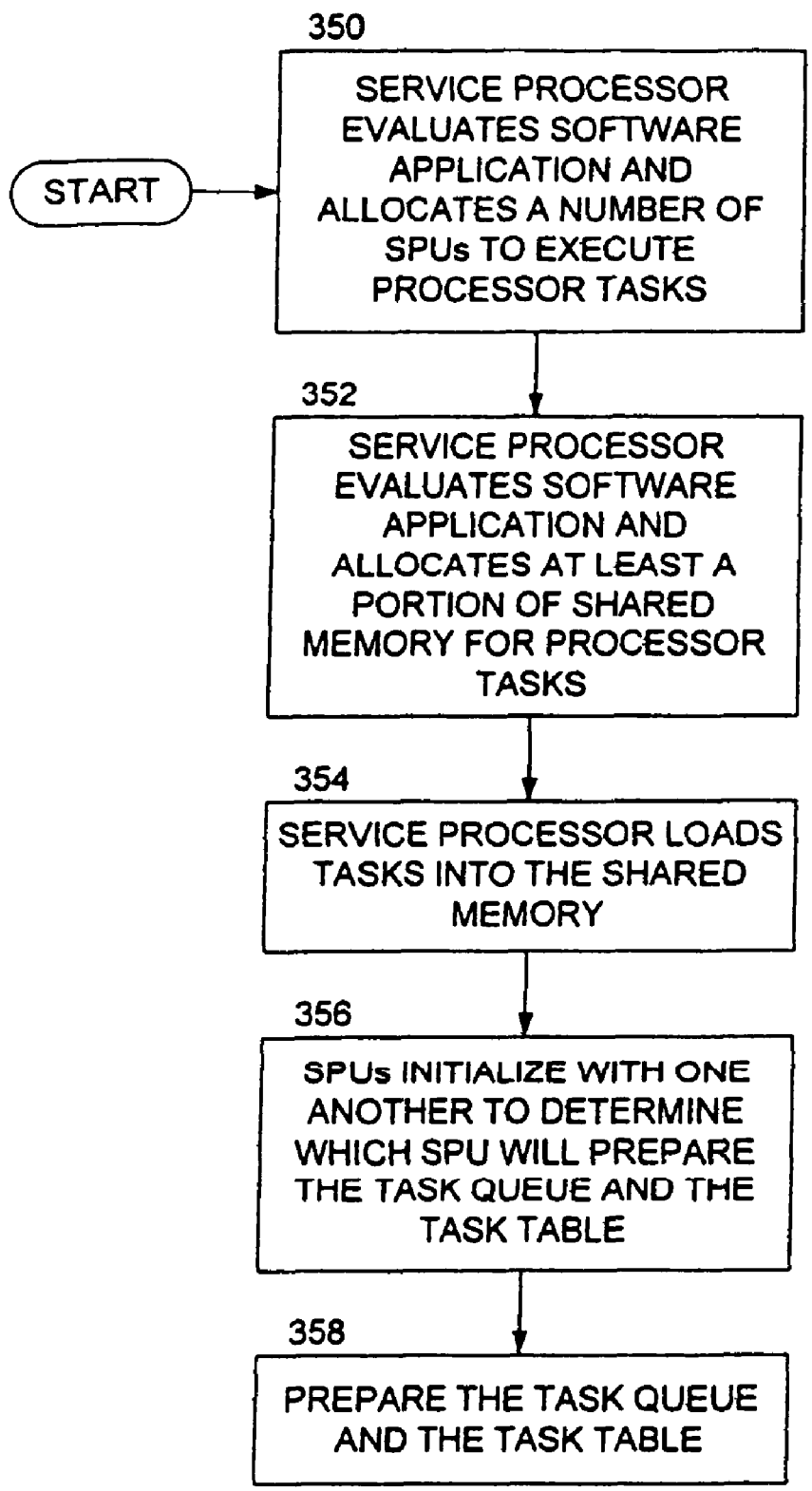
FIG. 11 is a flow diagram illustrating process steps for initializing the processor tasks in the shared memory and that may be carried out by the multi-processing system in accordance with various aspects of the present invention.

As discussed above, the main processing unit 102A is preferably utilized during an initialization phase of the system in order to place the system in a state in which the execution and management of the processor tasks 110 may be handled by the sub-processing units 102. The sub-processing units 102 also preferably conduct an initialization routine in order to create the task table 280 and the task queue 282 in the first instance. These initialization processes are illustrated in the flow diagram of FIG. 11.

At action 350, the service processor (e.g., the main processing unit 102) evaluates the software application to be executed on the system and allocates a number of the sub-processing units 102 to execute the processor tasks 110. The process flow preferably advances to action 352 where the service processor evaluates the software application and allocates one or more portions of the shared memory 106 to receive the processor tasks 110. At action 354, the processor tasks 110 are loaded into the shared memory 106 in accordance with any memory allocation that was performed at action 352. At this stage of the initialization process, the service processor is preferably no longer involved in the maintenance and/or allocation of the processor tasks among the sub-processing units 102.

The process flow preferably advances to action 356, where the sub-processing units 102 initialize with one another to determine which SPU is to prepare the task table 280 and the task queue 282 in the first instance. At action 358, the sub-processing unit 102 that was charged to create the task table 280 and the task queue 282 prepares such information and stores same in the shared memory 106. By way of example, the initialization of the task table 280 and task queue 282 is preferably performed by having each SPU kernel execute an initial task. The program init.c, reproduced below, is a preferred example of the initial task performed by each SPU:

```
#include <spurs.h>
#include "task_instance.h"
int
main( )
{
spurs_begin_init( );
if (spurs_get_spu_id( )==o); {
spurs_create_task(melchior);
spurs_create_task(balthasar);
spurs_create_task(caspar);
spurs_start_task(melchior);
spurs_start_task(balthasar);
spurs_start_task(caspar);
}
spurs_end_init( );
return 0;
}
```

In this program, 'melchior', 'balthasar' and 'caspar' are the names of the very beginning tasks, which are typical start up tasks. All of the SPU kernels execute this initial task, init.c, but only one SPU the SPU with ID0 executes these tasks, as specified by the line of code: if(spurs_get_spu_id ( ) = = ). All the other SPUs; e.g., those with a different ID, wait at spurs_end_init( ). Thus, each of the SPU kernel executes the initial task and after this initial task finishes, the SPU kernels just start looking for next task as described herein.

It is noted that the main processing unit 102, acting as a service processor as discussed above, may designate one or more of the processor tasks 110 as being within a group. This is preferably performed during the initialization stage. For example, two or more processor tasks 110 may need to tightly communicate with one another and, therefore, may be executed more efficiently if they are grouped together in a task group. An encryption program is an example of an application that may contain processor tasks that communicate tightly and would be more efficiently executed if they were formed into one or more task groups.

The processor task management features of the present invention may be utilized to assist the main processing unit 102A to off-load a device driver to a particular sub-processing unit 102 or group of sub-processing units 102. By way of example, a network interface, such as a gigabit Ethernet handler, may utilize up to 80% of CPU power. If the network interface is executed solely by the main processing unit 102A, then the main processing unit 102A may not be available to do other service-oriented processing tasks. Accordingly, it may be beneficial for a main processing unit 102A to off-load the network interface program to one or more of the sub-processing units 102. The main processing unit 102A may achieve this result by placing the processing tasks of the network interface into the shared memory 106 and allocating one or more sub-processing units 102 to execute same. In response, the SPUs may form a task table 280 and a task queue 282 suitable for managing and scheduling the execution of such processor tasks. Advantageously, the main processing unit 102A may therefore devote more CPU power to executing other tasks. The main processing unit 102A may also off-load other device drivers, such as a digital television device driver. Other device drivers that are good candidates for off-loading to SPUs are those that have heavy protocol stacks. For example, drivers for real-time high speed access devices, such as for a HDD recorder, can be advantageously off-loaded. Other examples of tasks that can be off-loaded include network packet encryption/decryption tasks used for Virtual Private Networks and multimedia over IP (e.g. VoIP) applications.

Figure 12:
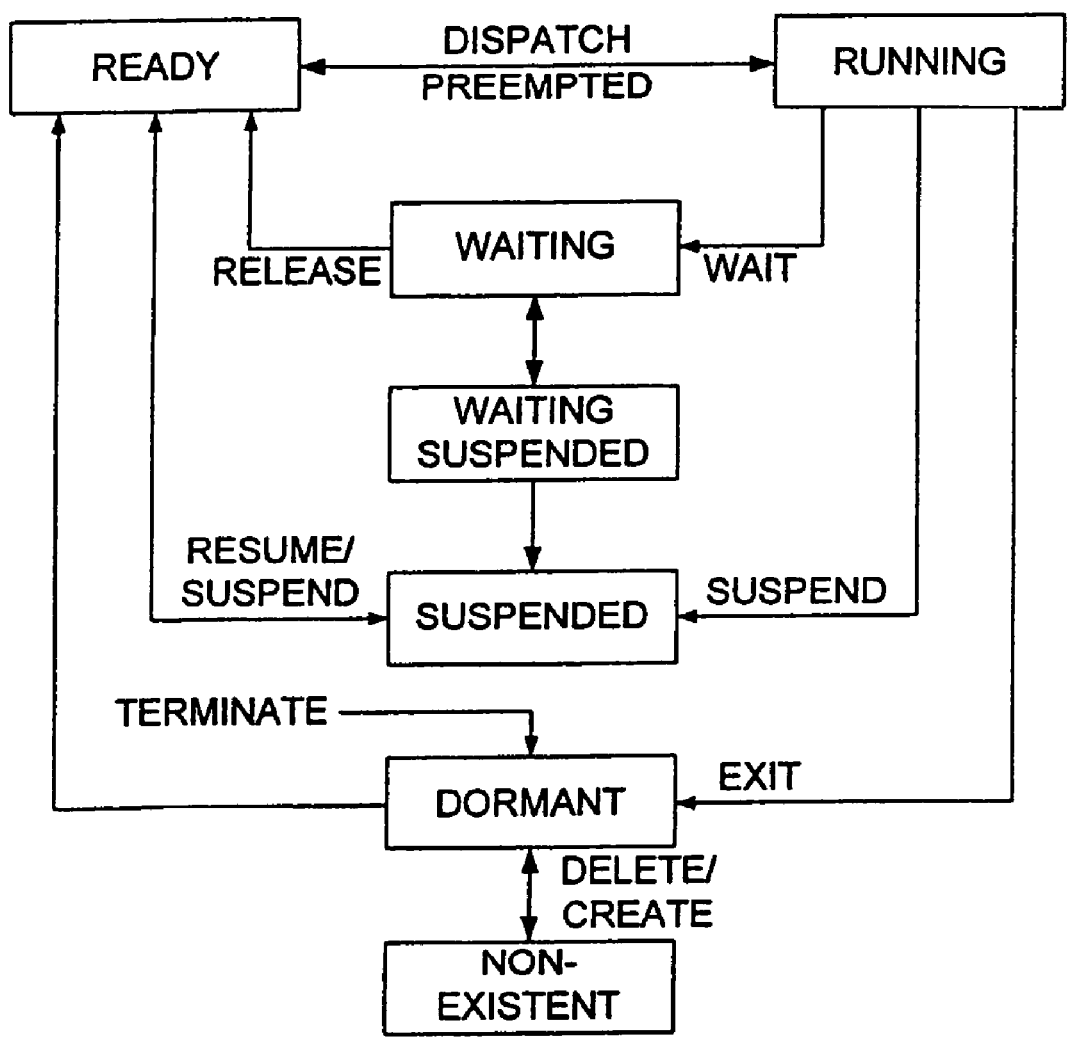
FIG. 12 is a state diagram illustrating the different status states of the processor tasks in accordance with one or more aspects of the present invention.

Reference is now made to FIG. 12, which is an example of a state diagram of the status of the processor tasks. The task states may be classified into five categories: the RUNNING state, the READY state, the BLOCKED state, the DORMANT state, and the NON-EXISTENT state. A processor task is in the RUNNING state when it is currently executing. Under some circumstances, a processor task may remain in the RUNNING state even in non-task contexts, such as during interrupts. A processor task is in the READY state when the task is ready to be executed, but cannot be executed because one or more processor tasks with higher precedence are already being executed and a sub-processing unit is not available to take up the task. Once the priority level of the READY processor task is high enough among the pool of READY tasks in the shared memory 106, a sub-processing unit may take up the processor task and execute same. Thus, the state of a processor task may change from the READY state to the RUNNING state when the task is dispatched. Conversely, the task state of a RUNNING task may change to the READY state if such task is preempted or otherwise usurped during its execution. An example of the preemption of a processor task was discussed hereinabove in connection with one processor task yielding to another.

The BLOCKED state category may include the WAITING state, the SUSPENDED state, and the WAITING-SUSPENDED state. A processor task is in the WAITING state when the execution of such task is blocked due to the invocation of a service call specifying that certain conditions must be met before execution of the task continues. Thus, the state of a RUNNING task may change to the WAITING state upon the invocation of a service call. A processor task in the WAITING state may be released into the READY state when the specified conditions are met, thereby enabling the processing task to be taken up by a sub-processing unit 102 thereafter. A processor task may enter the SUSPENDED state from the RUNNING state when the task is forcibly halted (which the task itself may invoke). Similarly, a processor task in the READY may enter the SUSPENDED state through forced action. A SUSPENDED processor task may be resumed and enter the READY state when the forcible halting of such processor task is released. A processor task is in the WAITING-SUSPENDED state when the task is both waiting for a condition to be met and when it has been forcibly suspended. Thus, a WAITING-SUSPENDED processor task may enter the WAITING state when the forcible suspension of the PROCESSOR task, where the processor task will wait for the condition to be satisfied.

A processor task is in the DORMANT state when the task has not been executed or has already finished its execution. A DORMANT processor task may enter the READY state under appropriate circumstances. The NON-EXISTENT state is a so-called virtual state where the task does not exist in the system, for example, because it has not yet been created or because it has already been deleted.

If a task that has been moved to the READY state has a higher precedence (or priority) than a task in the RUNNING state, the lower precedence task is preferably moved to the READY state and the higher priority task is preferably dispatched and moved to the RUNNING state. In this circumstance, the lower priority task has been preempted by the higher priority task.

Non-preemptive, priority-based task scheduling is conducted based on the priorities assigned to the processor tasks. If there are a number of processor tasks with the same priority, scheduling is conducted on a first-come, first-served (FCFS) basis. This task scheduling rule may be defined using a precedence between tasks based on task priorities. If a runable task exists, at most the same number of high precedence tasks as allocated sub-processing units 102 will be in the RUNNING state. The remainder of the runable tasks will be in the READY state. Among the tasks with different priorities, the task with the highest priority has higher precedence. Among tasks of the same priority, the processor task that entered the runable (RUNNING or READY) state earliest has the higher precedence. However, the precedence between tasks of the same priority may change do to the invocation of some service calls. When a processor task is given precedence over other processor tasks, it is preferred that a dispatch occurs immediately and that the task is moved into the RUNNING state.

Figure 13:
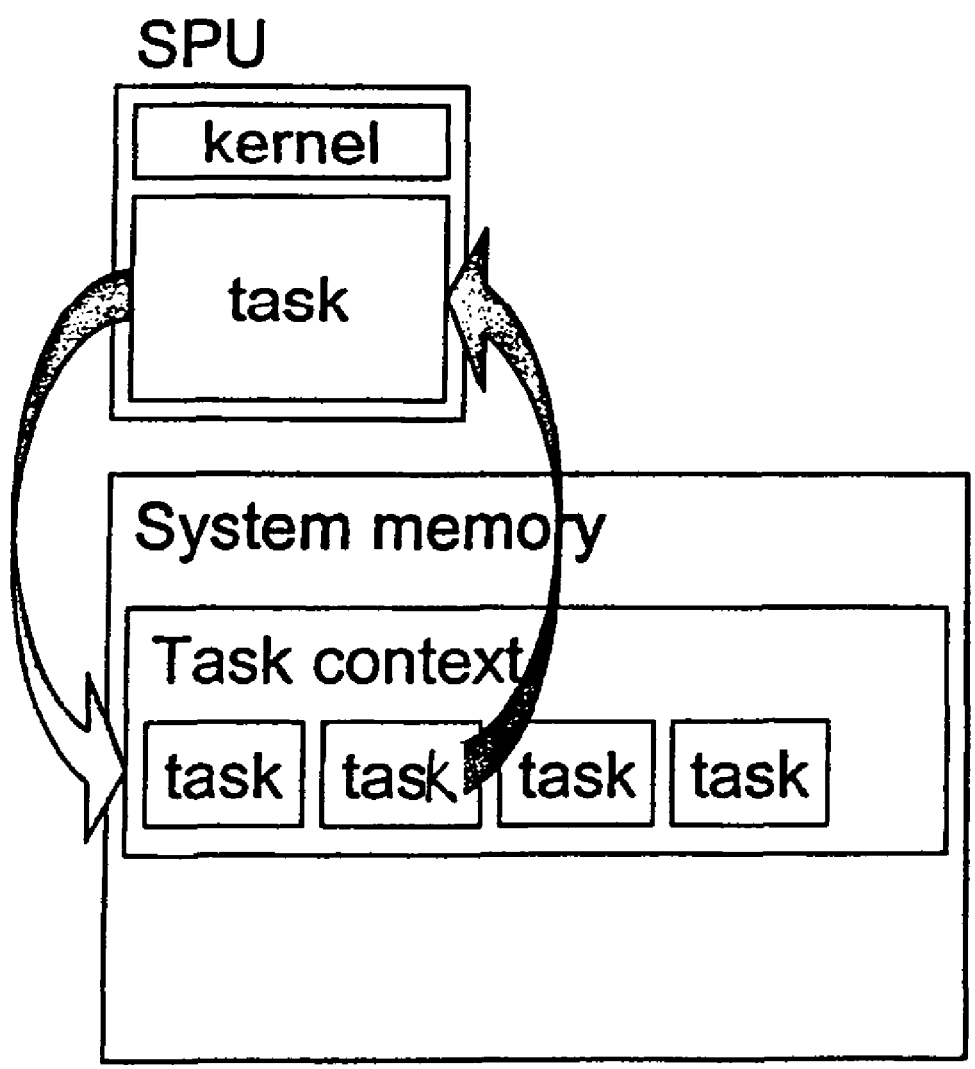
FIG. 13 is a block diagram illustrating how processor tasks may be copied from and written back to the shared memory in accordance with one or more aspects of the present invention.
Figure 14:
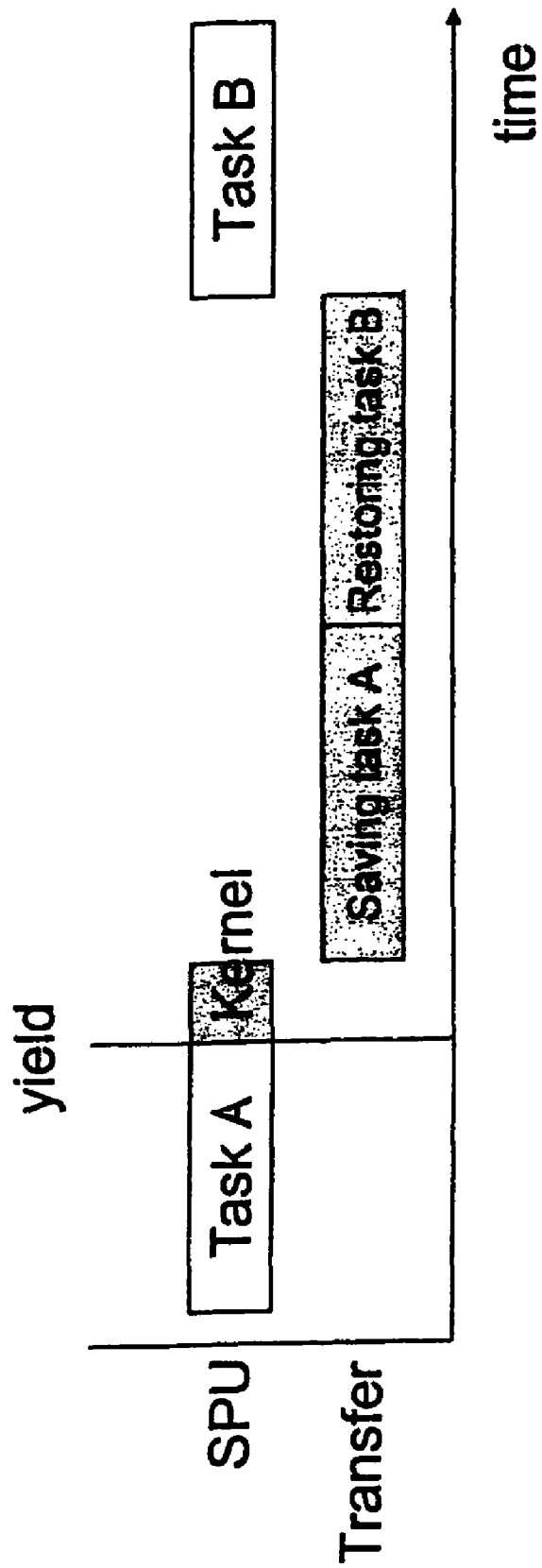
FIG. 14 is a timing diagram illustrating the processing latency associated with the copy and write back technique of FIG. 13.

Reference is now made to FIGS. 13-14, which illustrate certain preemption features in accordance with certain aspects of the present invention. As discussed above, a processor task in the RUNNING state (e.g., task A) may be preempted or otherwise yield to another processor task in the READY state (e.g., task B). As illustrated in FIGS. 13 and 14, task A is being executed on the sub-processing unit 102 up to the point of the yield. At that point, the kernel of the SPU operates to copy task A back to the shared memory 106 (saving task A). Thereafter, task B is copied from the shared memory 106 to the local memory of the SPU (restoring task B). The SPU then executes task B. While this technique enjoys relatively high performance with reference to the amount of local memory utilization and high bandwidth, there is task execution latency from the point of the yield to the execution of task B that is not optimized.

Figure 15:
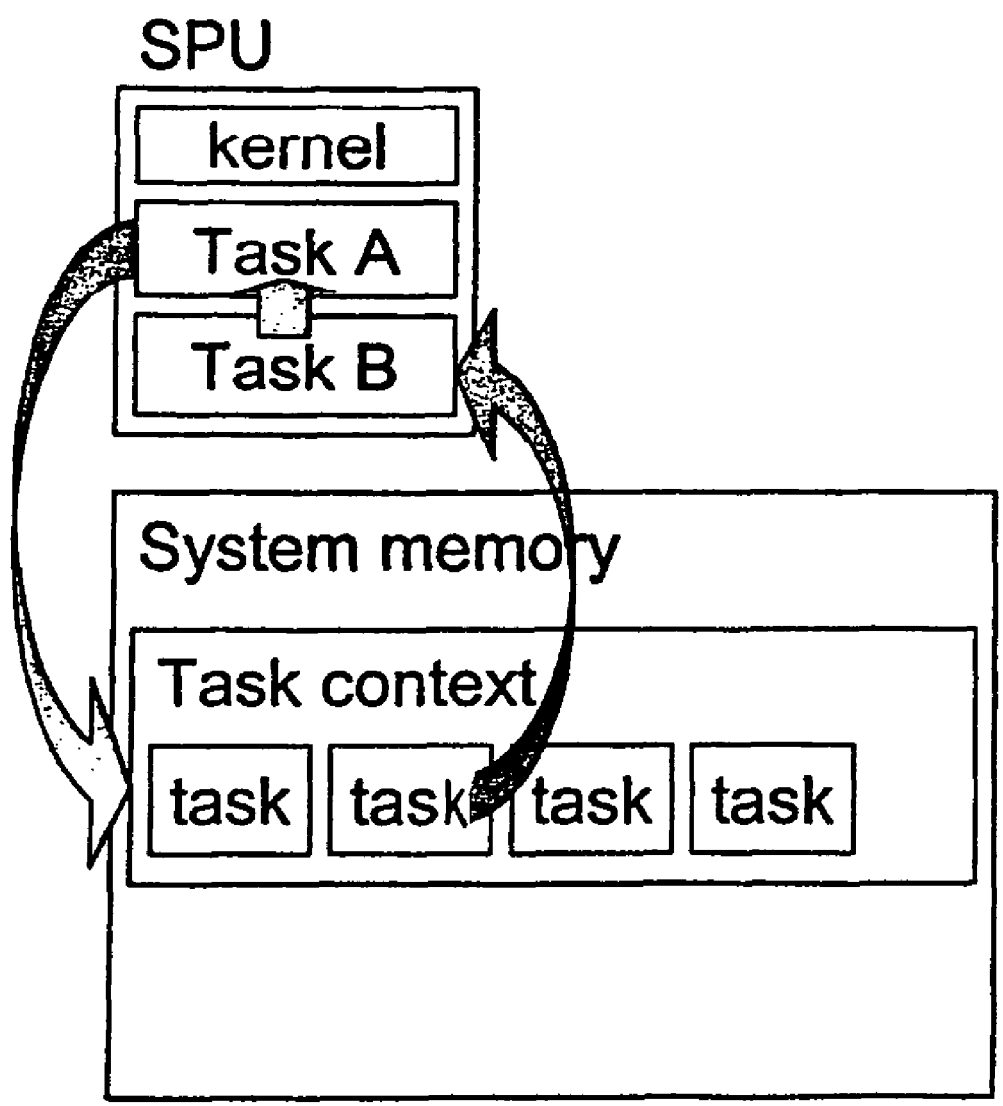
FIG. 15 is a block diagram illustrating how processor tasks may be copied from and written back to the shared memory in accordance with one or more further aspects of the present invention.
Figure 16:
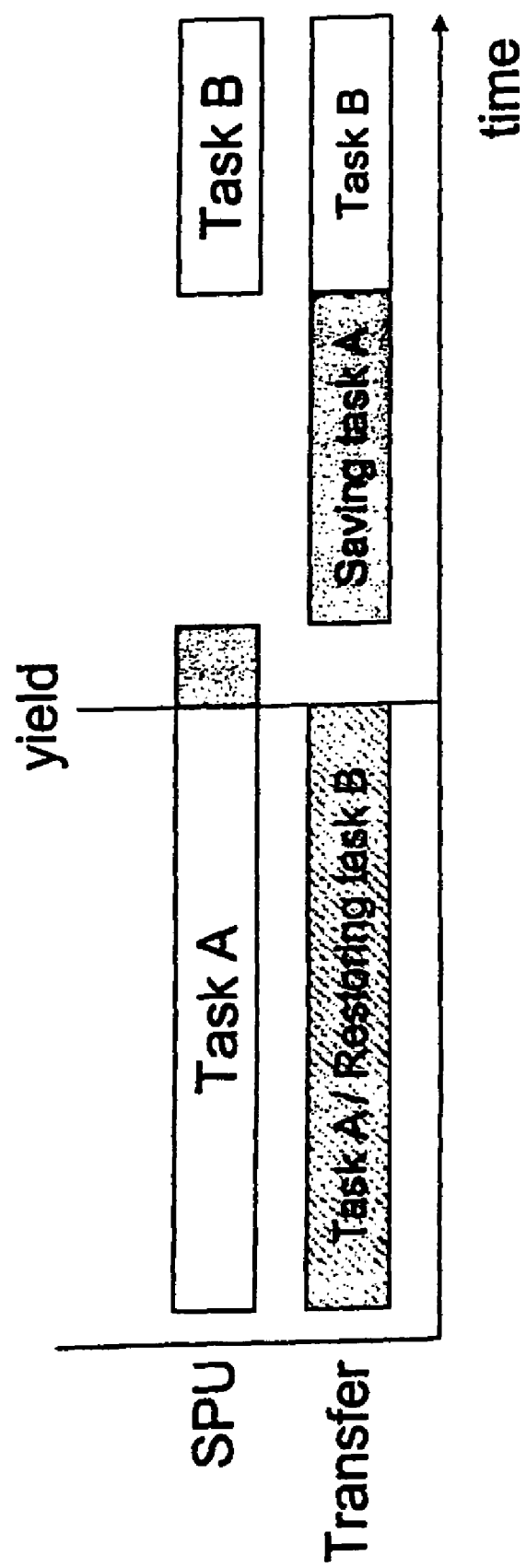
FIG. 16 is a timing diagram illustrating the processing latency associated with the copy and write back technique of FIG. 15.

With reference to FIGS. 15-16, an alternative approach is illustrated in accordance with further aspects of the present invention. In this scenario, task B may be copied from the shared memory 106 to the local memory of the sub-processing unit 102 prior to copying task A from the local memory to the shared memory 106. In this regard, the sub-processing unit 102 may execute task A, while at the same time taking steps to identify and retrieve task B from the shared memory 106. This may entail copying the task table 280 and the task queue 282 from the shared memory 106 to the local memory of the sub-processing unit 102A and using same to identify the next READY task, i.e., task B. At the yield point, the kernel of the sub-processing unit 102A copies task A from the local memory to the shared memory 106, which may entail modifying the task table 280 and the task queue 282 as described hereinabove. Thereafter, the sub-processing unit 102 may take up the execution of task B. This technique significantly reduces the latency between the yield and the execution of task B as compared with the technique illustrated in FIGS. 13-14.

Figure 17:
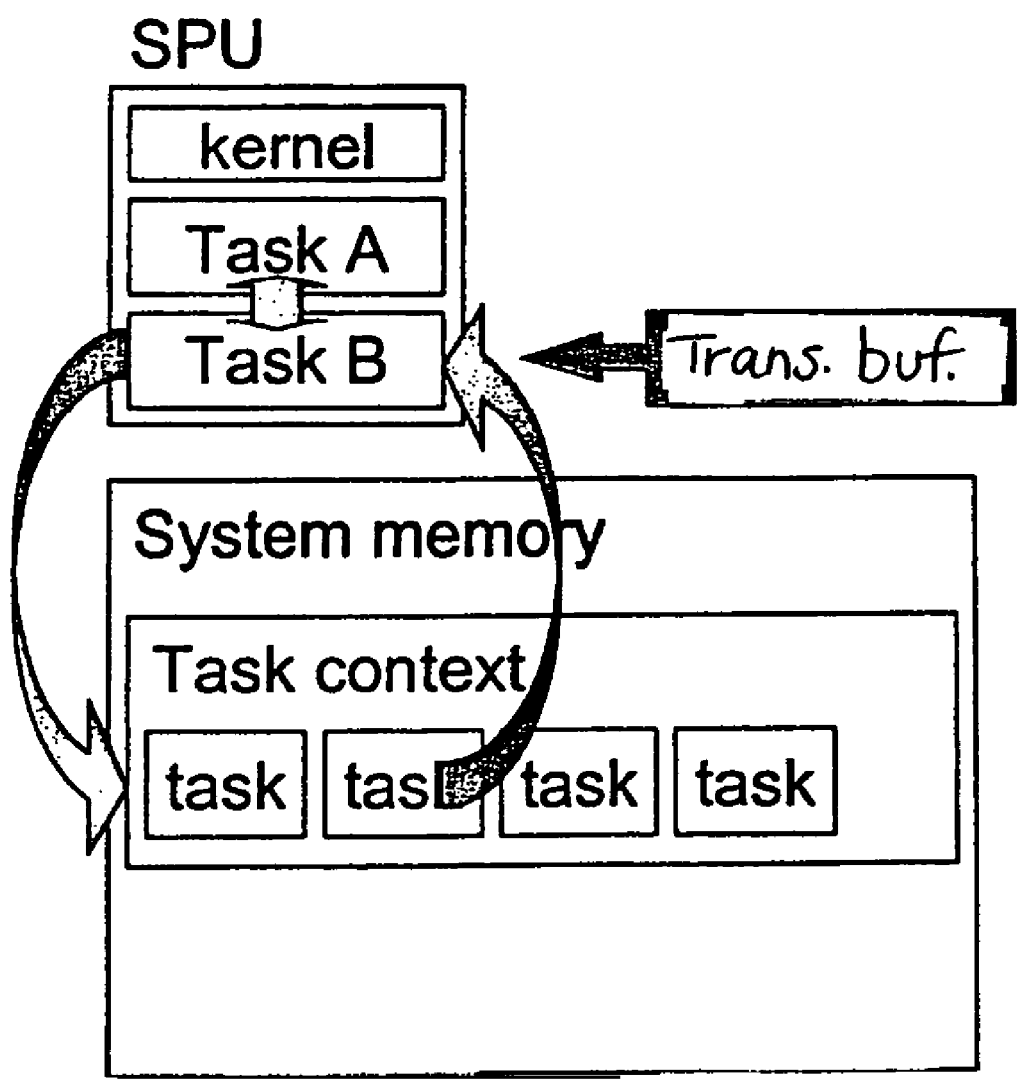
FIG. 17 is a block diagram illustrating how processor tasks may be copied from and written back to the shared memory in accordance with one or more still further aspects of the present invention.
Figure 18:
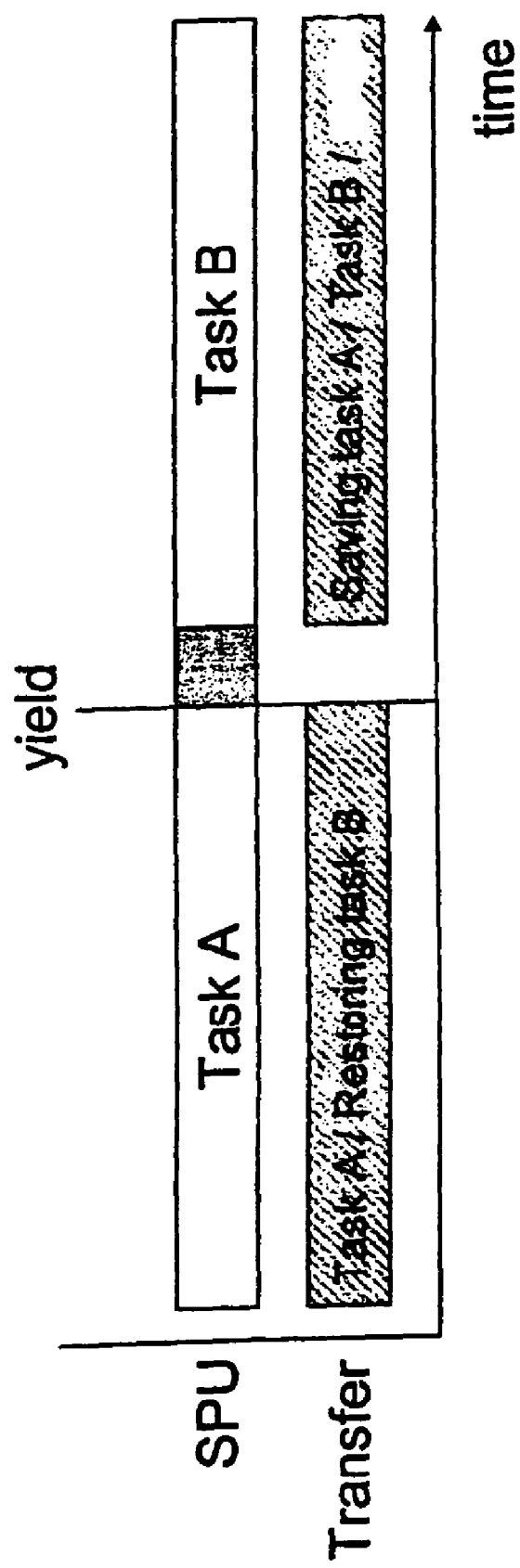
FIG. 18 is a timing diagram illustrating the processing latency associated with the copy and write back technique of FIG. 17.

With reference to FIGS. 17 and 18, the latency between the yield and the execution of task B may be further reduced in accordance with one or more further aspects of the present invention. In particular, the sub-processing unit 102 may operate in a substantially similar way as discussed hereinabove with respect to FIGS. 15 and 16 up to the point of the yield. After the yield, however, the sub-processing unit 102 preferably initiates the execution of task B. At substantially the same time, the kernel of the sub-processing unit 102 preferably operates to copy task A from the local memory of the sub-processing unit 102 to the shared memory 106. Since task B is executed very shortly after the yield, the latency is significantly reduced as compared with the approaches illustrated in FIGS. 14-16.

Figure 19:
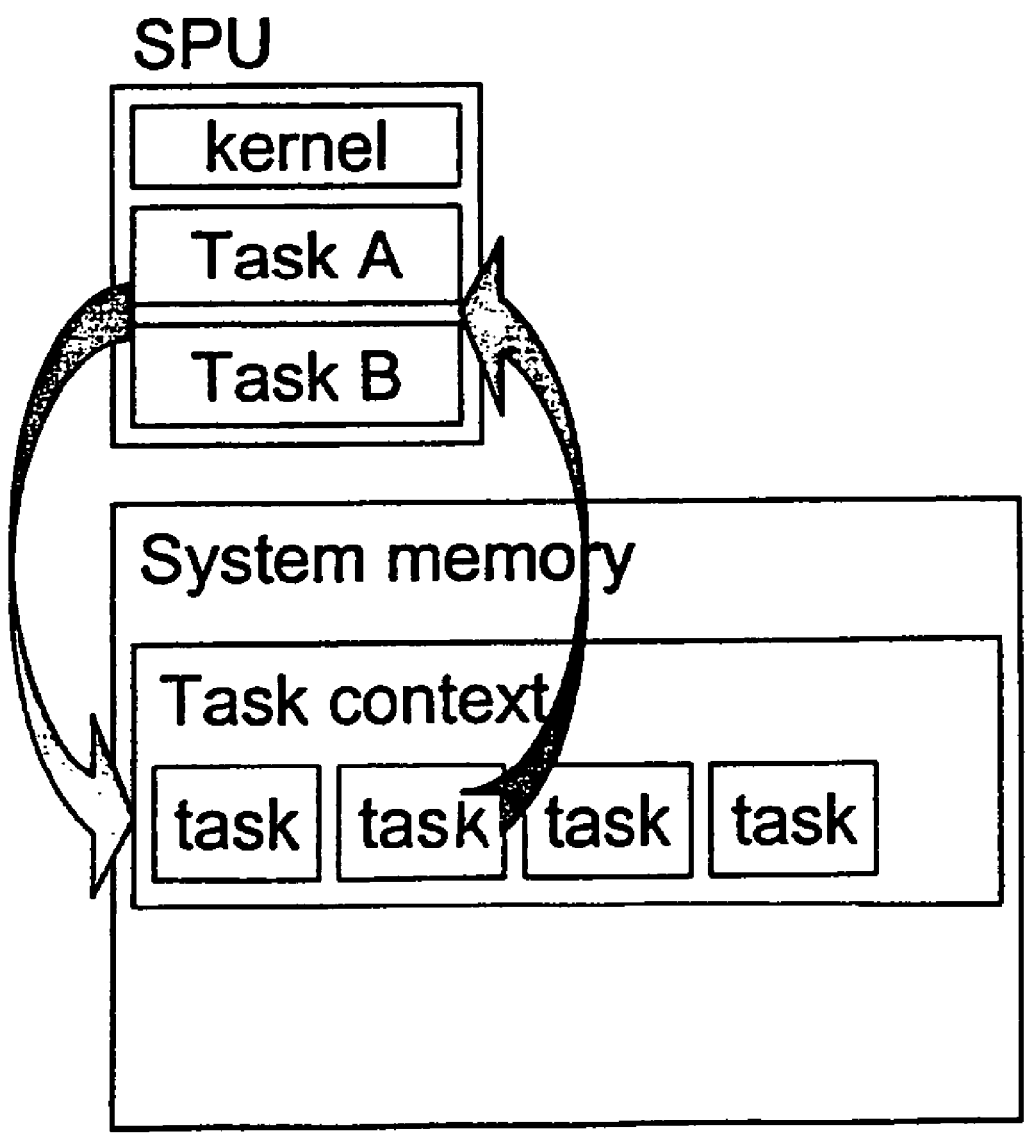
FIG. 19 is a block diagram illustrating how processor tasks may be copied from and written back to the shared memory in accordance with one or more still further aspects of the present invention.

In accordance with one or more further aspects of the present invention, the sub-processing units 102 may maintain multiple processor tasks in the local memory for execution. This is illustrated in FIG. 19. The local memory includes a plurality of pages and a page table in order to manage the execution of multiple processor tasks. The advantage of this approach is that latencies may be further reduced, although one drawback is that significantly more space within the local memory will be monopolized by process task execution.

Figure 21:
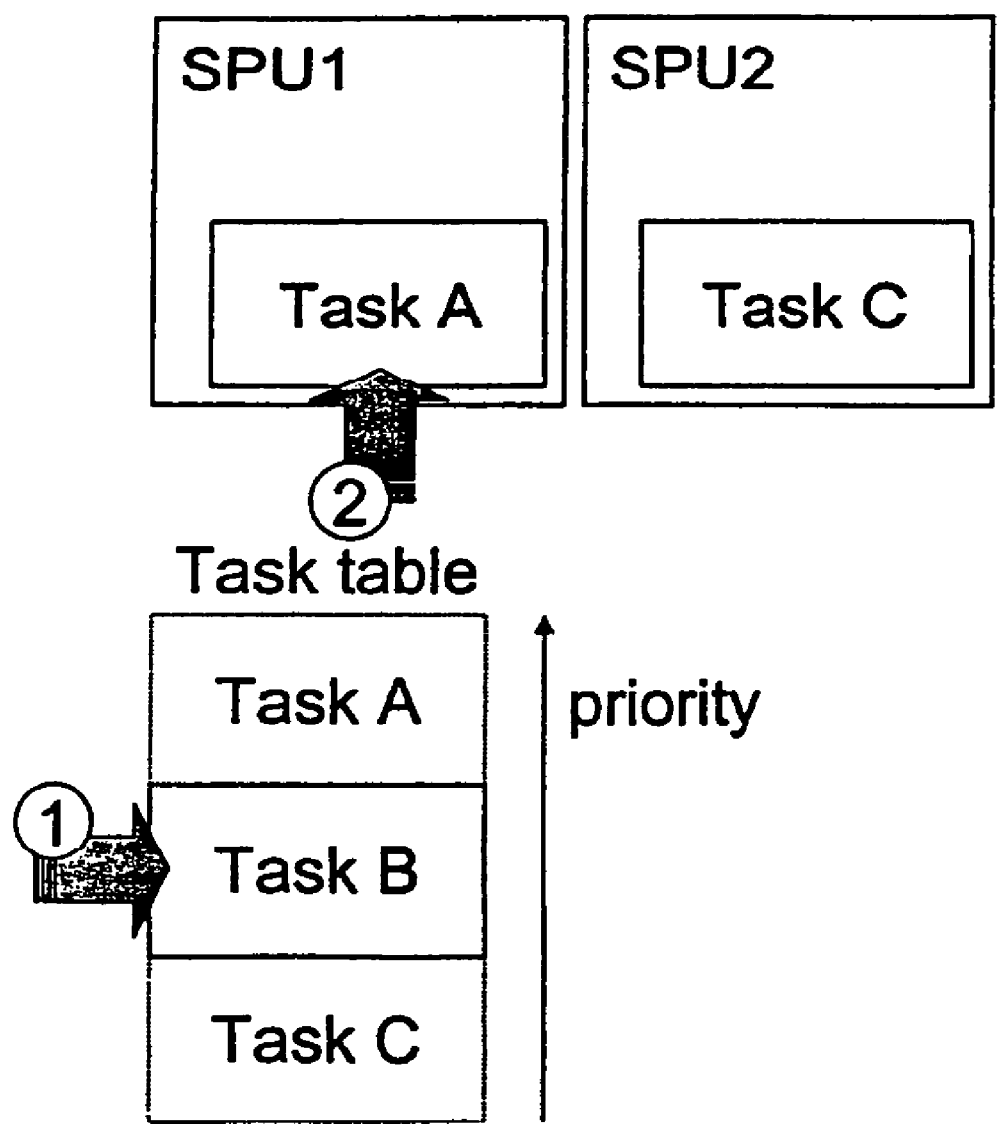
FIG. 21 is a block diagram illustrating further non-preemptive processor task migration features of certain aspects of the present invention.
Figure 22:
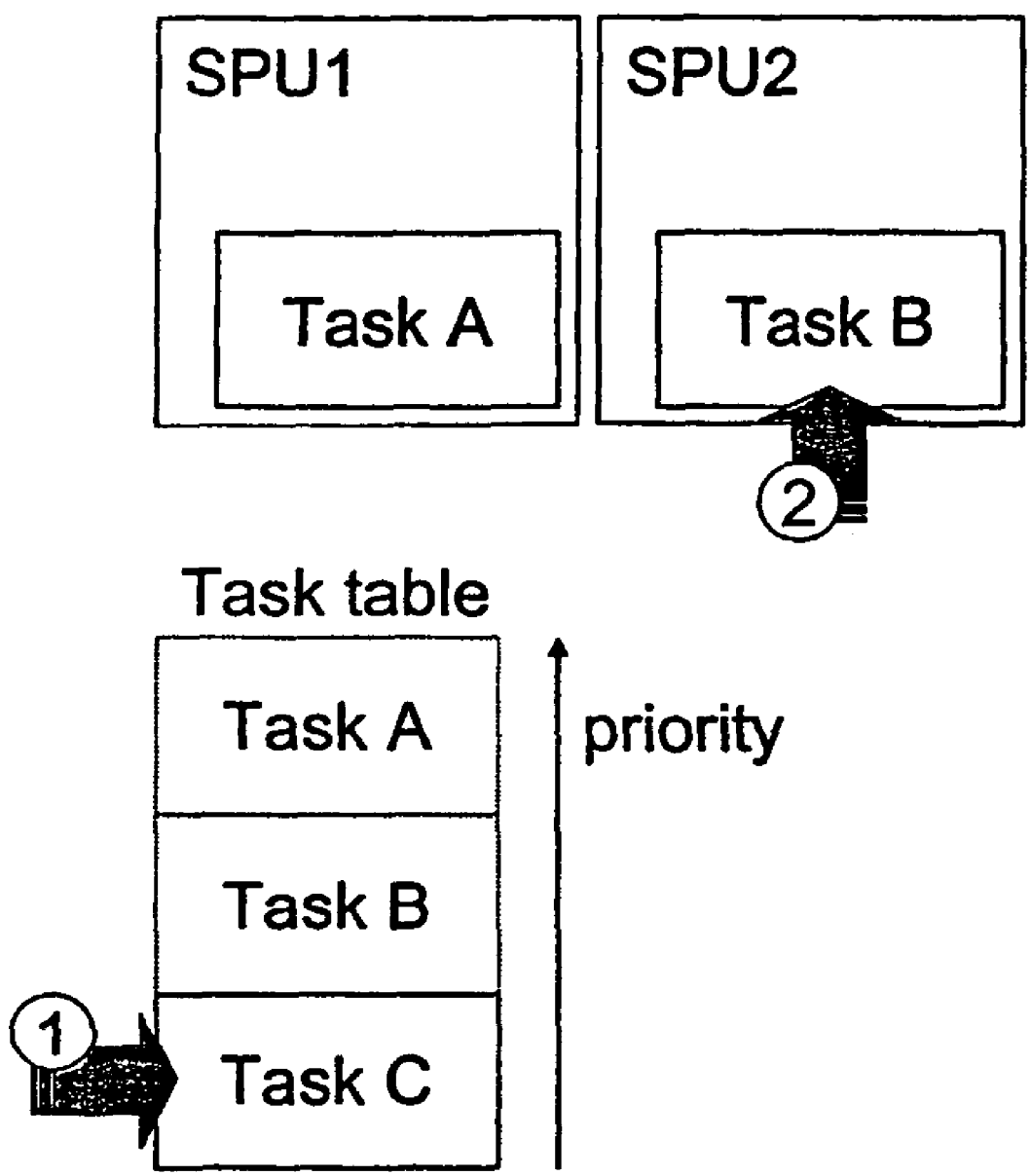
FIG. 22 is a block diagram illustrating still further non-preemptive processor task migration features of certain aspects of the present invention.

Reference is now made to FIGS. 20-22, which illustrate processor task migration in accordance with one or more aspects of the present invention. These figures illustrate how a processor task, for example, task B may be migrated from one sub-processing, unit SPU1 to another sub-processing unit SPU2. The migration may be based on some condition, such as respective priority levels associated with the respective processor tasks. In accordance with some aspects of the invention, the migration of the processor task from one sub-processing unit to another may not be preemptive. In other words, the migration of the processor task may naturally flow as a result of priority conditions and timing, but are not based on some decision to cause the migration.

This non-preemptive migration may be illustrated by the following example. Assume that processor task B was selected from the shared memory 106 utilizing the task table, which dictates a priority order for the processor tasks that are ready to be executed. Task B is running on sub-processing unit SPU1. Similarly, it is assumed that processor task C was selected from the shared memory 106 in accordance with the task table and is running on sub-processing unit SPU2. At the time that processor task B and processor task C were selected, it is assumed that processor task A of a higher priority level was not ready to be executed and, therefore, was not selected for execution. While processor task B and processor task C are running, however, it is assumed that processor task A becomes ready for execution.

With reference to FIG. 21, processor task B may yield sub-processing unit SPU1. This yielding action by processor task B may occur due to the programmer having decided that a yield would be beneficial to the overall execution of the software application. In any case, sub-processing unit SPU1 responds to the yield by writing processor task B back into the shared memory 106 and updating the task table. The sub-processing unit SPU1 also accesses the task table to determine which of the plurality of processor tasks in the shared memory 106 should be copied and executed. In this example, processor task A is of a highest priority according to the task table and, therefore, the sub-processing unit SPU1 copies processor tasks A from the shared memory 106 into its local memory for execution. At this point, sub-processing unit SPU1 executes processor task A and sub-processing unit SPU2 continues executing processor task C.

With further reference to FIG. 22, the processor task C may yield the sub-processing unit SPU2 to another processor task. Again, the yield may be invoked through program instructions and/or conditions of the processor task C. In any case, the sub-processing unit SPU2 writes the processor task C back into the shared memory 106 and updates the task table accordingly. The sub-processing unit SPU2 also accesses the task table to determine which of the processor tasks that are ready to be executed should be copied. In this example, processor task B is ready to be executed and is of the highest priority among the plurality of processor tasks that are ready to be executed. Accordingly, the sub-processor unit SPU2 copies the processor task B from the shared memory 106 into its local memory for execution.

A comparison of the processing conditions illustrated in FIG. 20 and the processing conditions illustrated in FIG. 22 reveals that processor task B has migrated from the sub-processing unit SPU1 to the sub-processing unit SPU2.

Figure 24:
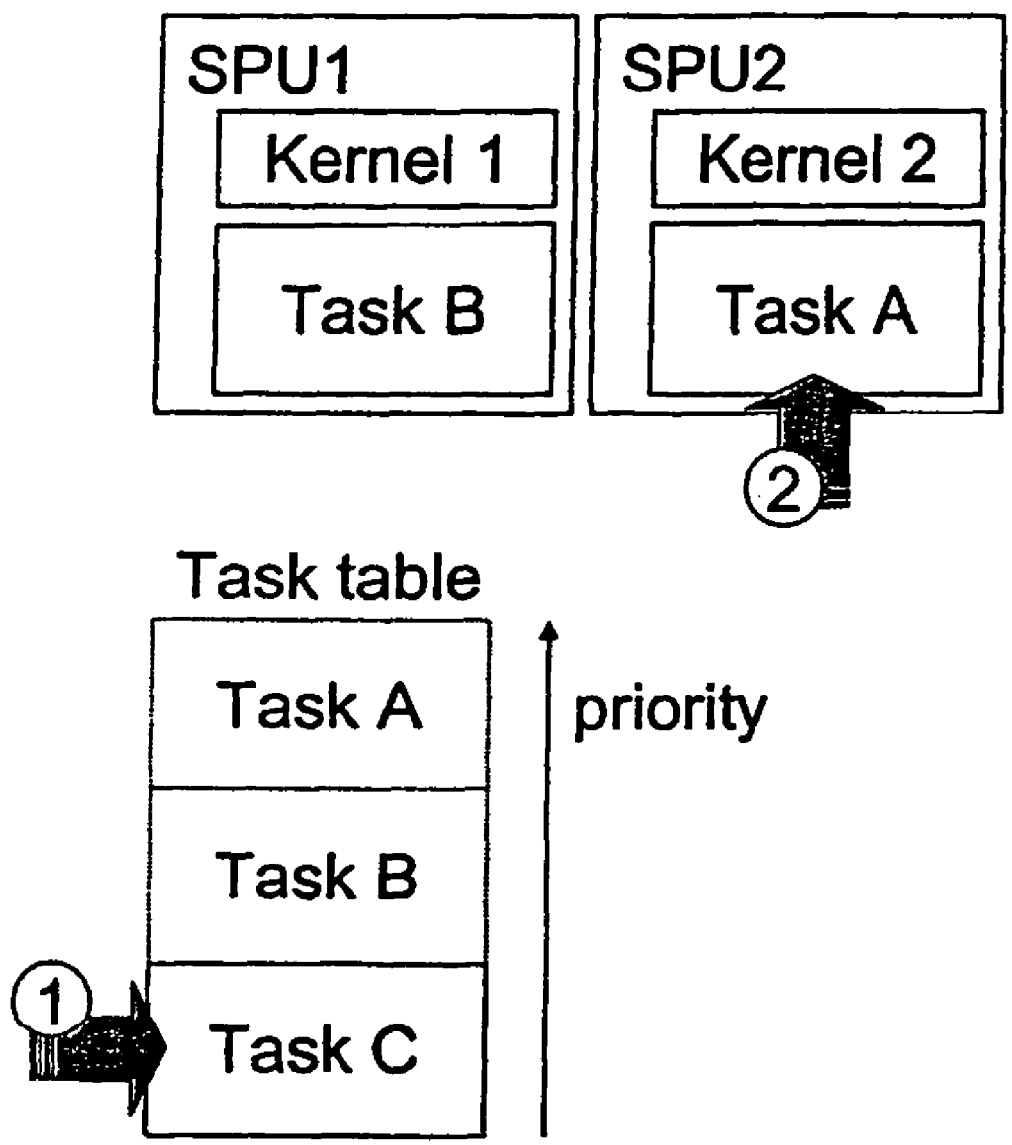
FIG. 24 is a block diagram illustrating further preemptive multi-tasking features of certain aspects of the present invention.

Reference is now made to FIGS. 23-24, which illustrate preemptive multi-tasking aspects of the present invention. These aspects of the present invention provide that a processor task of lower priority running on one of the sub-processing units, such as the sub-processing unit SPU2, may be preemptively replaced with a processor task of higher priority, such as processor task A. More particularly, processor task B may be running on the sub-processing unit SPU1, while processor task C may be running on the sub-processing unit SPU2 (FIG. 23). Thereafter, a higher priority task, task A, may become ready for execution. This may occur due to some action by another sub-processing unit of the system.

For purposes of discussion, it is assumed that the sub-processing unit SPU1 changed the status of the processor task A to RUNNING, for example, as a result of executing processor task B. As a result, the sub-processing unit SPU1 preferably makes a determination as to whether the priority level of the processor task A is higher than any of the priority levels of the processor tasks running on the other sub-processing units. In this simplified case, the sub-processing unit SPU1 makes a determination as to whether the processor task A is of a higher priority level than the processor task C. If so, the sub-processing unit SPU1 at least initiates the replacement of the processor task C with the processor task A. In other words, the sub-processing unit SPU1 preferably causes the processor task C to yield the sub-processing unit SPU2 to the processor task A. In this regard, the kernel of the sub-processing unit SPU1 may issue an interrupt to the kernel of the sub-processing unit SPU2. In response to the interrupt, the sub-processing unit SPU2 may write the processor task C back to the shared memory 106 and update the task table (FIG. 24). The sub-processing unit SPU2 may also copy the processor task A from the shared memory to its local memory for execution.

Reference is now made to FIGS. 25-26, which illustrate certain direct migration aspects of the present invention. These aspects provide that a processor task of higher priority running on one of the sub-processing units may be migrated to another of the sub-processing units running a processor task of lower priority. This migration may be in response to a direct interrupt received by the sub-processing unit running the higher priority processor task. With reference to FIG. 25, the sub-processing unit SPU1 may receive an interrupt that indicates that it must execute some other task. The interrupt may also cause the sub-processing unit SPU1 to make a determination as to whether any of the other sub-processing units of the system are executing processing tasks of lower priority. If so, such sub-processing units may yield the execution of the processor task in favor of the higher priority processing task. More particularly, if the sub-processing unit SPU1 determines that the sub-processing unit SPU2 is running a processor task, such as processor task B, of a lower priority than the processor task. A, then the kernel of the sub-processing unit SPU1 preferably issues an interrupt to the kernel of the sub-processing unit SPU2. In response to the interrupt, the sub-processing unit SPU2 preferably writes the processor task B from its local memory back to the shared memory 106 and updates the task table. The sub-processing unit SPU2 also preferably copies (or moves) the processor task A from the local memory of the sub-processing unit SPU1 to its local memory for execution.

Figure 27:
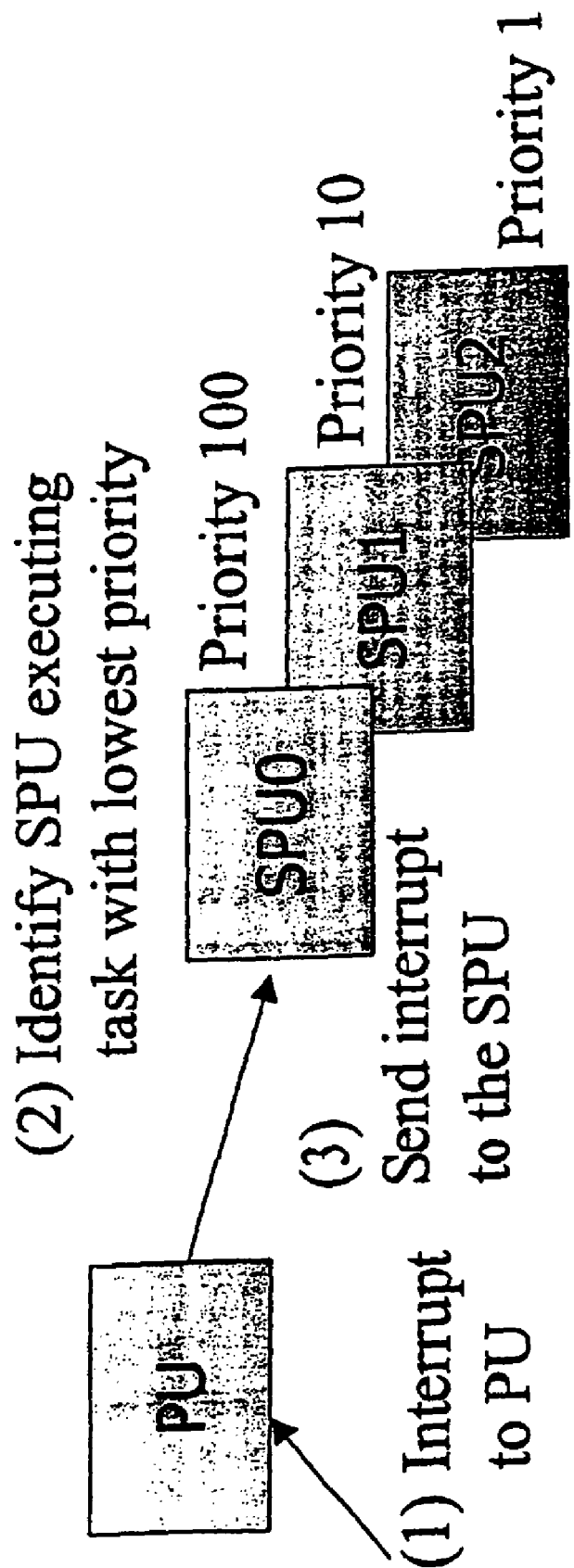
FIG. 27 is a partial block diagram and partial flow diagram illustrating certain processor interrupt techniques in accordance with one or more aspects of the present invention.

FIG. 27 illustrates how a processing unit ("PU") can handle an interrupt in accordance with one aspect of the present invention. In a first step, the PU receives an interrupt. THE PU then determines which sub-processing unit in this case, from the group of SPU0, SPU1 and SPU2, has the lowest priority. Then, the PU sends the interrupt to the SPU with the lowest priority. In the case of FIG. 27, SPU2 has the lowest priority, so the PU would send an interrupt to the SPU2.

Figure 28:
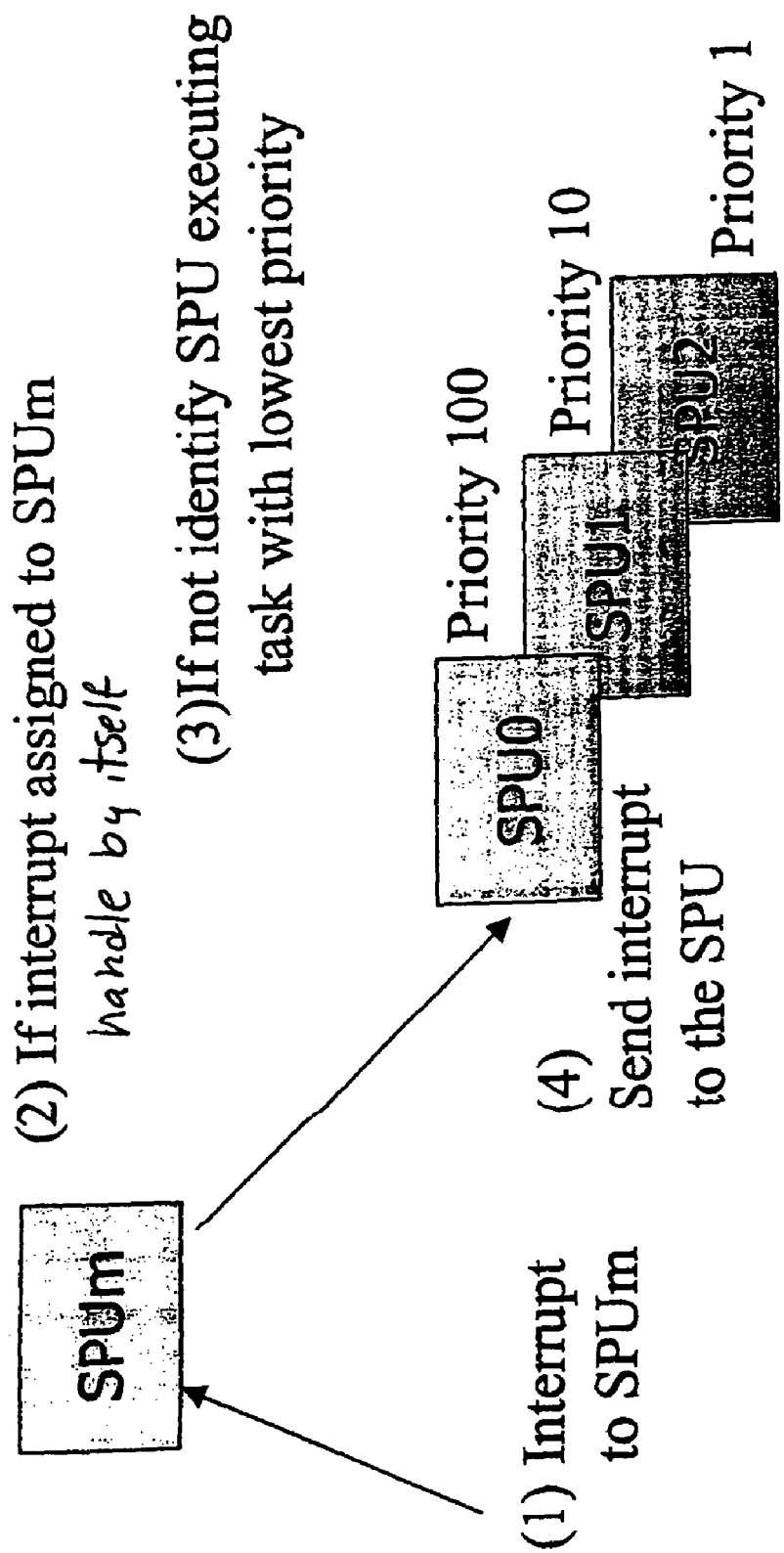
FIG. 28 is a partial block diagram and partial flow diagram illustrating further processor interrupt techniques in accordance with one or more aspects of the present invention.

In accordance with one or more further aspects of the present invention, the interrupt from one of the sub-processing units to another of the sub-processing units may be handled in a number of ways. Reference is now made to FIG. 28, which illustrates how in one embodiment of the present invention, one sub-processing unit may be designated to manage interrupts to any of the other sub-processing units in the system. The designated sub-processing unit receives all such task migration interrupts and either handles them itself or makes a determination as to whether to pass the interrupt on to another sub-processing unit. For example, if the interrupt is intended for the designated sub-processing unit, then it may handle the interrupt itself. Alternatively, if the interrupt is not intended for the designated sub-processing unit, then the designated sub-processing unit may send the interrupt to the sub-processing unit of the group that is executing a processor task of lowest priority.

Figure 29:
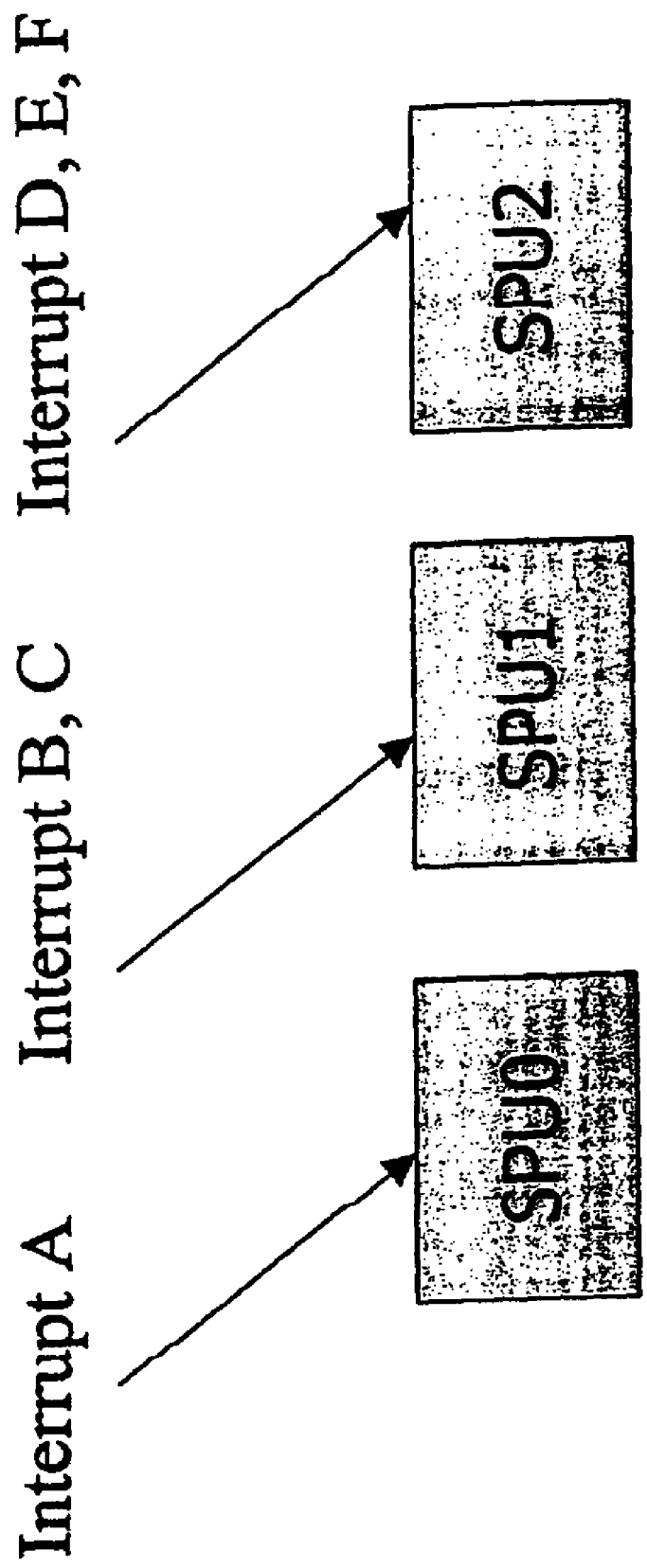
FIG. 29 is a partial block diagram and partial flow diagram illustrating still further processor interrupt techniques in accordance with one or more aspects of the present invention.

FIG. 29 illustrates an alternative approach in which a distributed interrupt handling scheme may be employed. In accordance with this technique, respective interrupts are assigned to each sub-processing unit, for example, interrupt A may be assigned to sub-processing unit SPU0. Interrupts B, C may be assigned to the sub-processing unit SPU1, and interrupt D, E, F may be assigned to the sub-processing unit SPU2.

The discussion hereinabove with respect to FIGS. 23-26 entailed that the sub-processing units be capable of determining the priority levels of the processor tasks running on the other sub-processing units of the system. In accordance with one embodiment of the present invention, the sub-processing units may utilize a shared task priority table in determining the priority levels of the running processor tasks. The shared task priority table may be located in the shared memory and may include a plurality of entries for sub-processing unit identifiers and processor task priority identifiers. For example, the sub-processing unit identifiers may be numerical and/or alphanumerical codes unique to the sub-processing units. The processor task priority identifiers preferably indicate what priority level of the particular processor tasks being executed. Each entry in the shared task priority table preferably includes a pair: a sub-processing unit identifier and a priority identifier, indicative of a priority level of a given processor task running on an associated sub-processing unit. Thus, a sub-processing unit seeking to determine the priority levels of the running processor tasks may access the shared task priority table to find a sub-processing unit running a lower priority processor task. Preferably, the sub-processing unit running a lowest priority processor task is identified for yielding to the higher priority level processor task.

Other embodiments of the present invention may provide that the sub-processing units utilize a shared variable that indicates which sub-processing unit is running a lowest priority processor task. The use of a shared variable is preferably achieved by way of atomic update processes such that accurate indications of priority levels are guaranteed. An alternative approach may utilize a serialized message that is transmitted from one sub-processing unit to another sub-processing unit in series. The message may be updated with the priority level and sub-processing unit identifier of lower priority level processor tasks.

Figure 30:
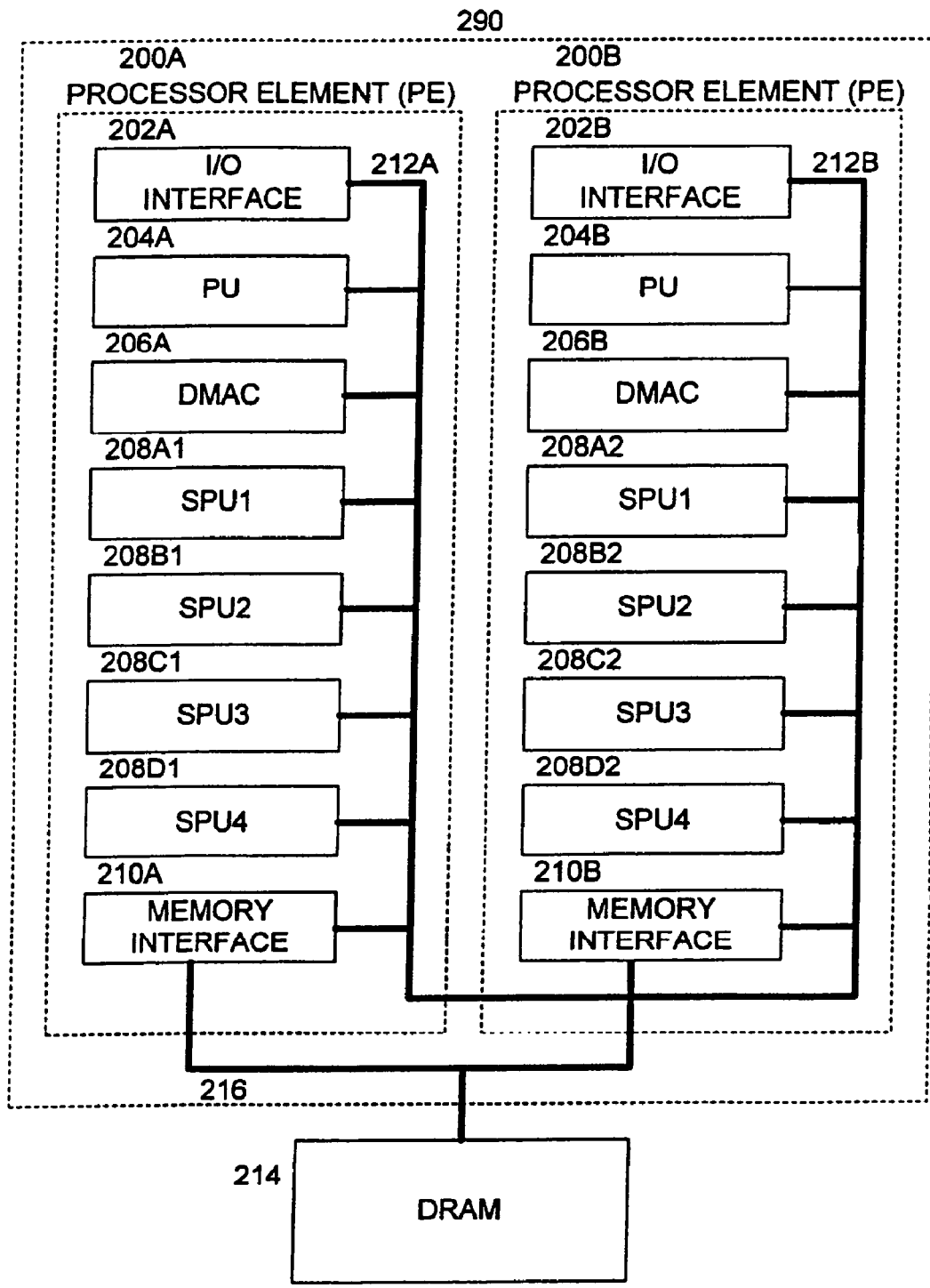
FIG. 30 is a diagram illustrating the structure of a processing system including more than one sub-processing unit in accordance with one or more further aspects of the present invention.

With reference to FIG. 30, alternative embodiments of the present invention contemplate that the number of sub-processing units 208 allocated to execute the processor tasks 110 may be increased by joining a number of processor elements 200 together to provide enhanced processing power. For example, two or more processor elements 200A, 200B may be packaged or joined together, e.g., within one or more chip packages, to form a set of multi-processor units. This configuration may be referred to as a broadband engine (BE). The broadband engine 290 contains the two processor elements 200A, 200B, which are interconnected for data communication over a bus 212. An additional data bus 216 is preferably provided to permit communication between the processor elements 200A, 200B and the shared DRAM 214. One or more input/output (I/O) interfaces 202A and 202B and an external bus (not shown) provide communications between the broadband engine 290 and any external elements. Each of the processor elements 200A and 200B of the broadband engine 290 perform processing of data and applications in a parallel and independent manner analogous to the parallel and independent processing of applications and data performed by the sub-processing unit 208 discussed hereinabove with respect to FIG. 3. In accordance with various aspects of the present intention, the BE may include a single processor element or multiple processor elements. Additionally, a BE may be formed by containing multiple BEs.

Figure 31:
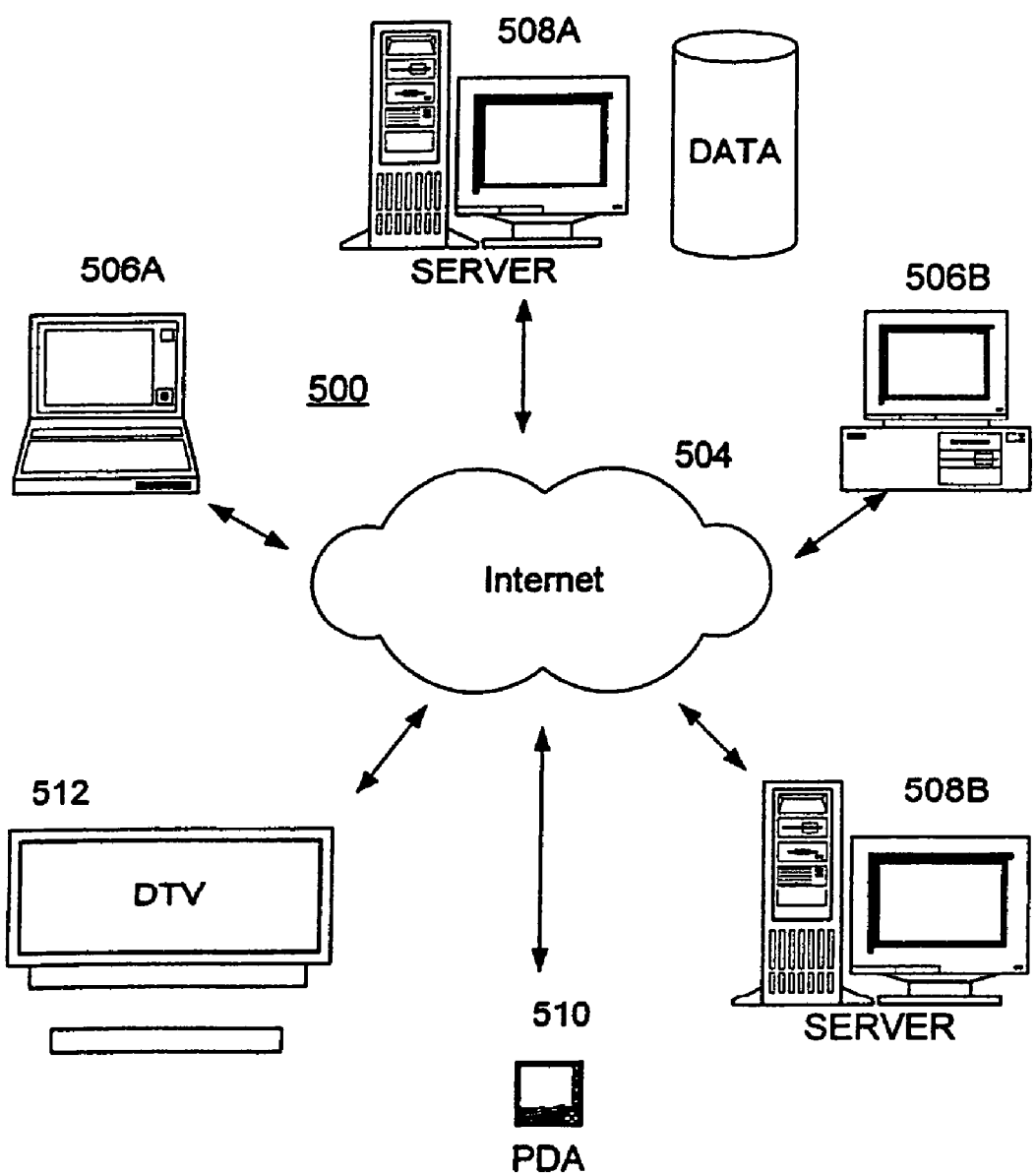
FIG. 31 is a system diagram of a distributed multi-processing system in accordance with one or more aspects of the present invention.

Reference is now made to FIG. 31. Here, the stand-alone multi-processing elements 208 or BEs 290 (sets of multi-processing elements) may be distributed among a plurality of products to form a multi-processing system 500. The elements or members (implemented as computer and/or computing devices) of the system 500 are preferably in communication over a network 504. The network 504 may be a local area network (LAN), a global network, such as the Internet, or any other computer network.

The members that are connected to the network 504 include, e.g., client computers 506, server computers 508, personal digital assistants (PDAs) 510, digital televisions (DTV) 512, and other wired or wireless computers and computing devices. For example, the client 506A may be a laptop computer constructed from one or more of the PES 200 or other suitable multi-processing systems. The client 506B may be a desk-top computer (or set top box) constructed from one or more of the PEs 200 or other suitable multi-processing systems. Further, the server 506A may be a administrative entity (employing a database capability), which is also preferably constructed from one or more of the PES 200. And so on.

Thus, the processing capabilities of the multi-processing system 500 may rely on a plurality of processor elements 200 disposed locally (e.g., one product) or disposed remotely (e.g., in multiple products). In this regard, reference is made to FIG. 32, which is a block diagram of an overall computer network in accordance with one or more aspects of the present invention. Again, the PEs 200 and/or broadband engines (BEs) (made of one or multiple PEs) may be used to implement an overall distributed architecture for the computer system 500.

Since the servers 508 of the system 500 perform more processing of data and applications than the clients 506, the servers 508 typically contain more computing modules (e.g., PEs 200) then the clients 506. The PDAs 510, on the other hand, in this example perform the least amount of processing. Thus, the PDAs 510 contain the smallest number of PEs 200, such as a single PE 200. The DTVs 512 perform a level of processing that is substantially between that of the clients 506 and the servers 508. Thus, the DTVs 512 contain a number of processor elements typically between that of the clients 506 and the servers 508.

Further details concerning the distributed multi-processing system 500 will now be provided. The homogenous configuration for the system 500 facilitates adaptability, processing speed, and processing efficiency. Because each member of the system 500 performs processing using one or more (or some fraction) of the same computing module, e.g., processor element 200, the particular computer or computing device performing the processing of data and/or application is unimportant because the processing of such data an applications may be shared among the network's members. By uniquely identifying the software cells comprising the data and applications processed by the system 500, the processing results can be transmitted to the computer or computing device requesting the processing regardless of where this processing occurred. Because the modules performing this processing have a common structure and employ a common instruction set architecture, the computational burdens of an added layer of software to achieve compatibility among the processors is avoided. This architecture and programming model facilitates the processing speed necessary to execute, e.g., real-time, multimedia applications.

To take further advantage of the processing speeds and efficiencies facilitated by the system 500, the data and applications processed by this system may be packaged into uniquely identified, uniformly formatted software cells 502. Each software cell 502 contains, or can contain, both applications and data. Each software cell, further detailed below, also contains an ID to globally identify the cell throughout the network 504 and the system 500.

This uniformity of structure for the software cells, and the software cells unique identification throughout the network, facilitates the processing of applications and data on any computer or computing device of the network 504. For example, a client 506 may formulate a software cell 502 but, because of the limited processing capabilities of the client 506, transmit the software cell 502 to a server 508 for processing. Software cells 502 can migrate, therefore, throughout the network 504 for processing on the basis of the availability of processing resources on the network 504.

The homogenous structure of processors and software cells 502 of the system 500 also avoids many of the problems of today's heterogeneous networks. For example, inefficient programming modules which seek to permit processing of applications on any ISA using any instruction set, e.g., virtual machines such as the Java virtual machine, are avoided. The system 500, therefore, can implement broadband processing far more effectively and efficiently than conventional networks.

In accordance with one aspect of a method of present invention, a first multi-processor (for example, a first BE) determines that a task should be migrated from the first BE for any of a variety of reasons. For example, the first BE may determine that it is too busy to complete the task within either a specified deadline or a reasonable time period. When the first BE determines that a task should be migrated to another processing system, it broadcasts an application from the first BE over a network. The application specifies a plurality of tasks and an attribute. The task being migrated would be one of the specified tasks. The attribute preferably indicates a distance of the application from at least one of (a) a previous BE broadcasting the application and (b) a BE originally broadcasting the application, and a deadline for completion of each of the plurality of tasks. A task queue can also be specified. The application can directly specify the plurality of tasks by the application itself containing the tasks, or alternatively, the application can indirectly specify the tasks via the use of pointer information, such as a pointer, an index or other like methods, which would indicate or point to where the tasks are located. Alternatively, the attribute can be linked with at least one of the task queue, each task, and a block of tasks, which are combined with the attribute in the application. Further, in accordance with an aspect of the present invention, the tasks have an attribute that specifies the requirements to perform the task. The attribute can be common to two or more of the tasks or common to all of the tasks. Alternatively, each of the tasks can have its own separate attribute.

The "distance" of the application preferably refers to the network latency in moving the application across the network to another location or processor, although it could also refer to physical distance, which can be a measure of transfer latency.

For example, an originating or "Owner BE" decides to migrate an application "A" and broadcast A to the cell network. A has a deadline, required computation resources (e.g., number of SPUs or a plurality of tasks) and other parameters. Another cell, "a first BE," finds A and checks the parameters and the "distance" to the Owner BE. Because of some reason, the first BE decides not to process A and broadcasts A back onto the cell network. In this case, the distance of A is still the network latency from the potential new BE to the Owner BE. A second BE now finds A and checks the parameters and distance to the Owner BE. Based on this information, the second BE may return the results of A to the Owner BE.

Alternatively, the distance can also be the distance from the immediately prior BE rather than the originating or owner BE. For example, the Owner BE decides to migrate application A onto the cell network. A has a deadline, required computation resources (e.g., number of SPUs or plurality of tasks) and other parameters. The first BE finds A and checks the parameters and the distance to the Owner BE. Because of some reason, the first BE decides to migrate a part of application A as A' and broadcasts A' to the cell network. The distance of A' is now the network latency from the potential new BE to the first BE. The deadline of A' is sooner than "A". The second BE finds A' and checks the parameters and the distance to the first BE. The second BE may return the result of A' to the first BE. The first BE generates the results of A with A' and may return the results to the Owner BE.

The attribute preferably specifies the processing power required to perform the task. Thus, if the previously described processor architecture is utilized, this attribute may specify the number of SPUs required to perform the task. Additionally, the same attribute or a different attribute can also specify the amount of memory required to perform the task.

The cell application that was broadcast by the first BE is received at a second BE that is connected to the first BE by a network. The second BE unbundles the tasks in the cell application, and then determines which tasks are to be migrated from the first BE. After unbundling the tasks and determining the tasks to be migrated, the second BE, via software commands, then preferably examines the attribute that specifies the requirements to perform the task to determine whether the task should be performed by the second BE. As previously described, if the attribute (or attributes) describe the required processing power and the required memory, the second BE preferably examines the required processing power and the required memory associated with the task to be migrated.

In accordance with another aspect of the present invention, the second BE also examines the distance of the application from at least one of a previous BE broadcasting the application or the BE originally broadcasting the application, and a deadline for completion of each of the plurality of tasks to determine whether the tasks should be performed by the second BE. The second BE also preferably advises the first BE whether the second BE is performing the task(s).

In accordance with another aspect of the present invention, the broadcast application is received by a plurality of other BEs. Each of the plurality of other BEs perform the steps previously described with respect to the second BE. Thus, each of the other BEs unbundles the task or tasks in the application, the task(s) to be migrated being included in the application. Each of the plurality of other BEs examines the attribute that specifies the requirements to perform the tasks to determine whether the tasks should be performed. Additionally, each of the plurality of other BEs preferably also examines the distance of the application from at least one of (a) a previous BE broadcasting the application and (b) a BE originally broadcasting the application, and a deadline for completion of each of said plurality of tasks to determine whether the task should be performed.

Figure 32:
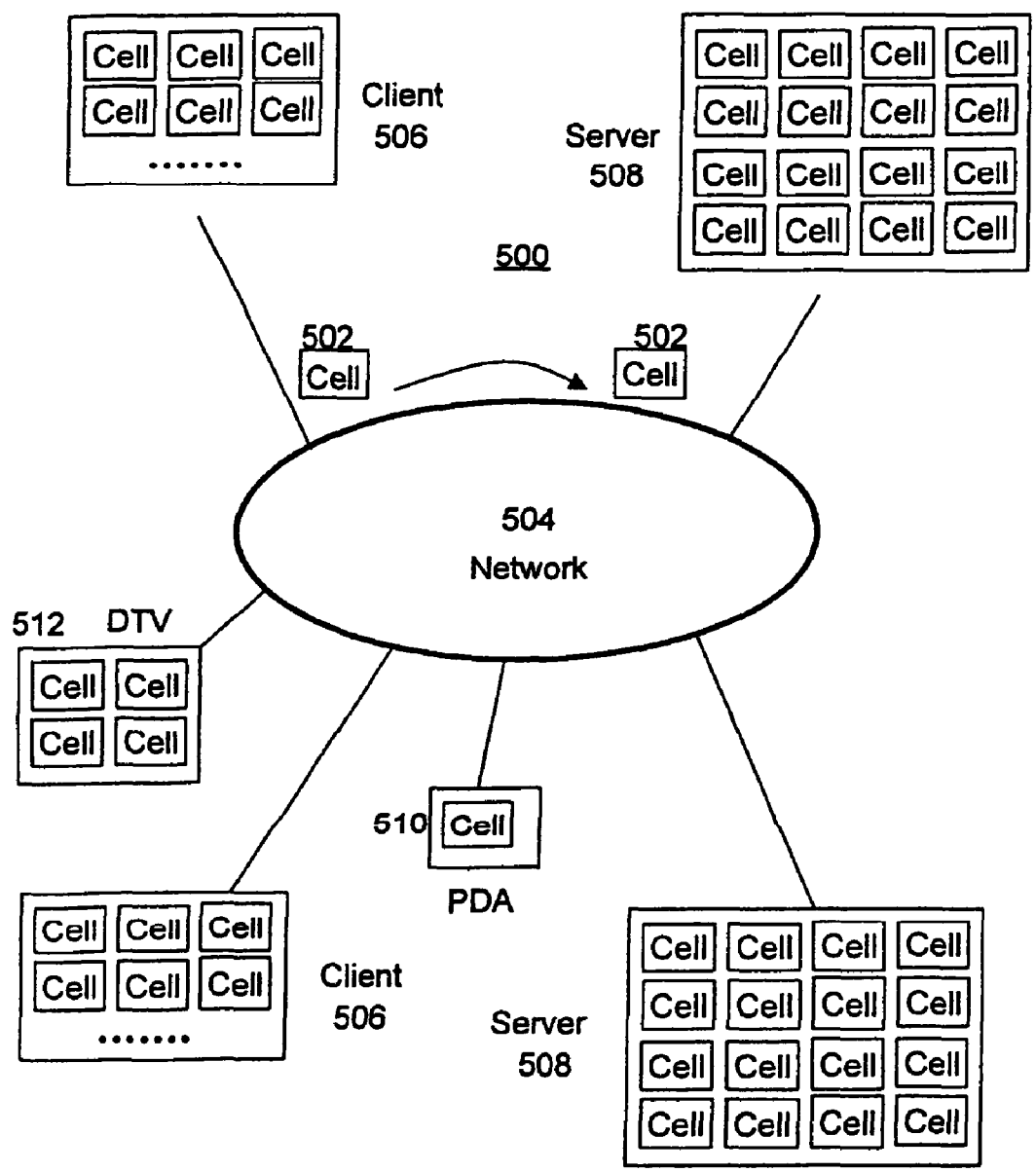
FIG. 32 is a block diagram of a software cell feature that may be used in conjunction with the multi-processing units of the present invention.

In explanation stated above, the first BE is referred to as the first multi-processor and the second BE is referred to as the second multi-processor for the sake of convenience. However, each of the first multi-processor and the second multi-processor can be any of the elements shown in FIG. 32 as a matter of course. Thus, by way of example only, the first multi-processor can be one of the clients 506 and the second multi-processor can be another of the clients 506 or a PDA 510. In FIG. 32, multiple cells 502 are migrated on the network 504. The cells 502 correspond to the application that is transferred or broadcast between BEs as described above. For example, multiple cells are illustrated in the client 506, which depicts the image that cell applications are performed in multiple BEs or PEs in the client 506. Cells are also illustrated in the server 508 in addition to the client 506, which depicts the image that cells can be performed in the server 508. It should be noted that BEs or PEs in the server and client do not always perform as cells. Each of the processing elements can have an architecture as disclosed in FIG. 3, with a plurality of SPUs. It is understood, however, that the present invention is also applicable to any system having a plurality of networked processors, regardless of the type or architectures of the processors.

Figure 33:
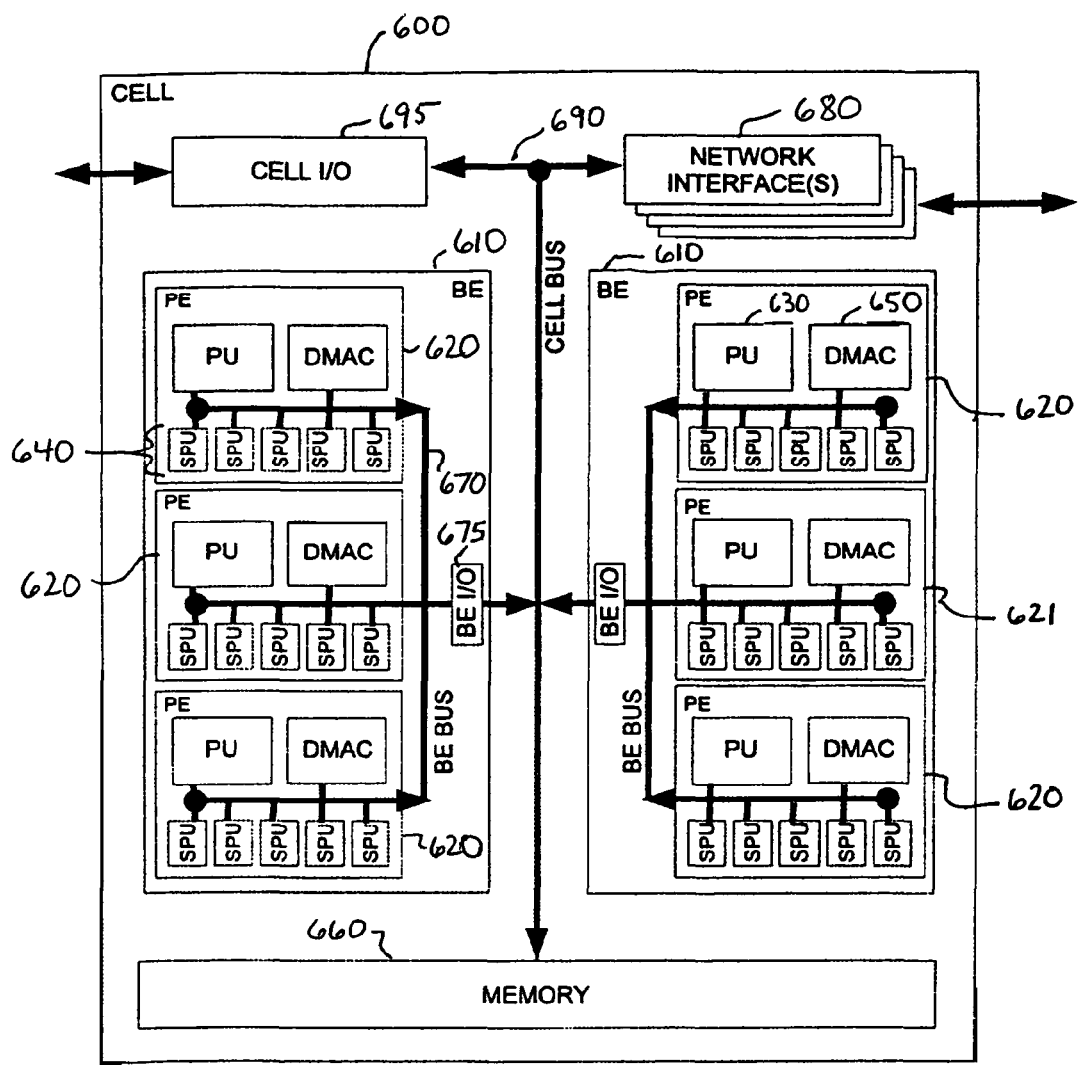
FIG. 33 is a system diagram illustrating one embodiment of the present invention.

In this regard, FIG. 33 illustrates one embodiment of a cell server 600 of the present invention. One or more broadband engines (BEs) 610 are managed by the cell server. Each BE includes a basic processing element (PE) 620 including, as in previous environments, a processing unit (PU) 630, a plurality of synergistic processing units (SPUs) 640, advantageously logical stores (LSs) (accessed via DMACs 650) for local memory associated with each of the plurality of SPUs (illustrated in FIG. 4), and a shared memory 660. The BE performs internal communications via a BE bus 670 and a BE I/O channel 675. In addition, the cell server includes one or more network interfaces 680. Network interfaces are advantageously associated with each PU or SPU or may be directly associated with the cell server. The cell server 600 also advantageously includes a cell bus 690 for internal communications and a local cell I/O channel 695.

Further description of the general memory handling characteristics of one embodiment of BEs is detailed in U.S. patent application Ser. No. 09/815,554, filed Mar. 22, 2001, entitled SYSTEM AND METHOD FOR DATA SYNCHRONIZATION FOR A COMPUTER ARCHITECTURE FOR BROADBAND NETWORKS, and assigned to the assignee of the present application and hereby incorporated by reference in its entirety. Further description of one embodiment of the basic interconnection of BEs in a networked multi-processing environment is provided in U.S. provisional patent application No. 60/564,647 filed Apr. 22, 2004, entitled METHOD AND APPARATUS FOR PROVIDING AN INTERCONNECTION NETWORK FUNCTION, assigned to the assignee of the present application and hereby incorporated by reference in its entirety.

Figure 34:
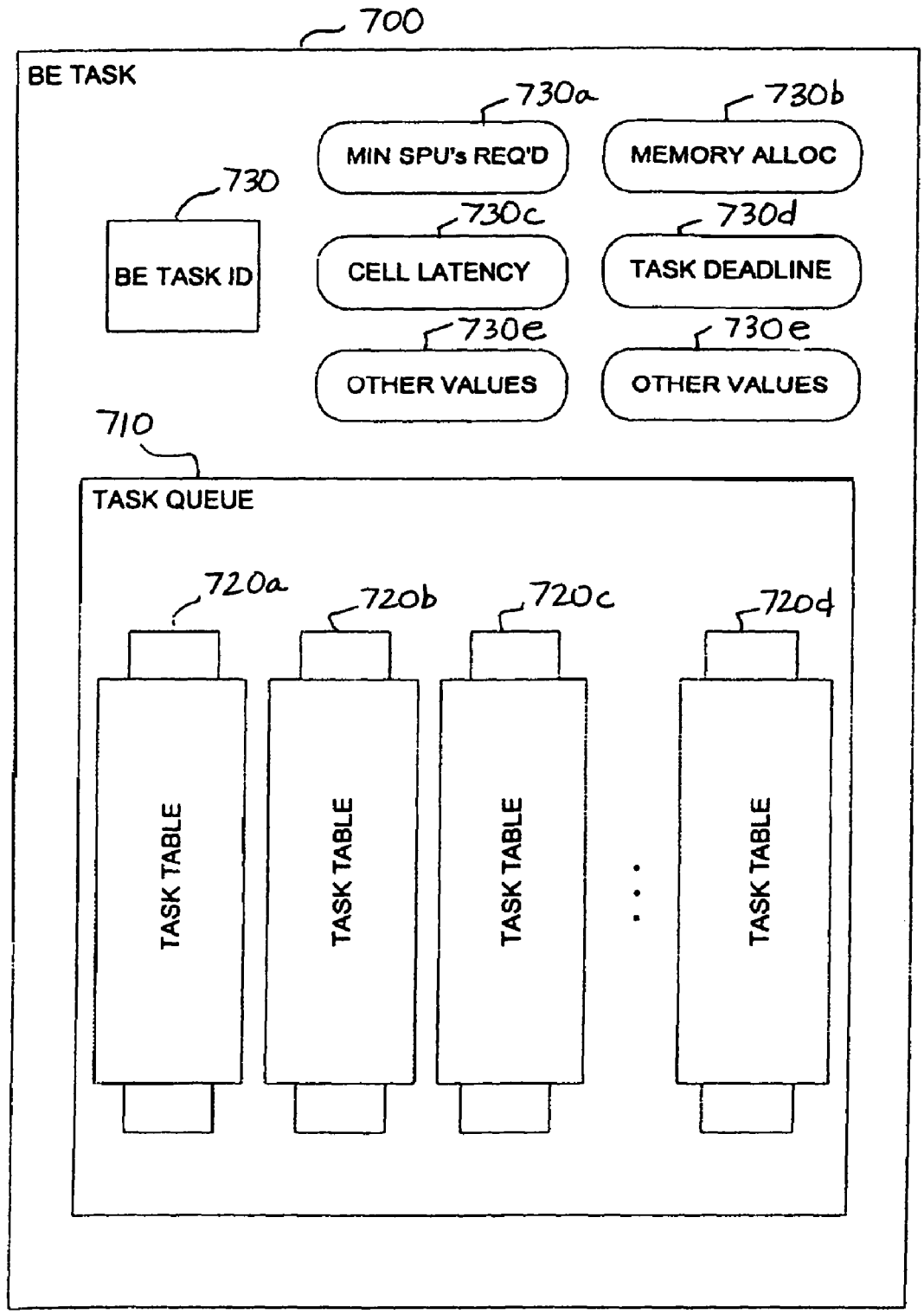
FIG. 34 is a block diagram illustrating one embodiment of broadband engine tasks of the present invention.

Each BE includes one or more BE tasks 700, as schematically illustrated in one embodiment via FIG. 34. The BE tasks 700 are preferably organized in the shared memory of the cell server utilizing a task queue 710 and associated task tables 720a-d, where the task tables 720a-d each include a set of task table entries (see FIG. 35), and where the task table includes one or more SPU tasks to be executed by one or more SPUs (see FIG. 35). Preferably the BE task includes a unique BE task identification 730.

In addition, each BE task preferably includes at least the following four parameters: the minimum number of SPUs required for execution of the BE task or task group (MIN SPUs REQD 730a), the memory size required by the BE task or task group (MEMORY ALLOC 730b), the cell latency or distance between the cell server owning this BE and a receiving BE (CELL LATENCY 730c), and the task deadline for the SPU tasks contained in the BE task (TASK DEADLINE 730d). The BE task also preferably includes other values as required by a cell server network (730e). One exemplary embodiment of a BE task is shown in Table 1 herein.

TABLE 1

| BE task | |
| --- | --- |
| SPU task queue | object |
| SPU task table | Object |
| minimum SPUs required | Integer |
| memory size requested | Integer |
| distance to source cell | Integer |
| task deadline | Integer |

Figure 35:
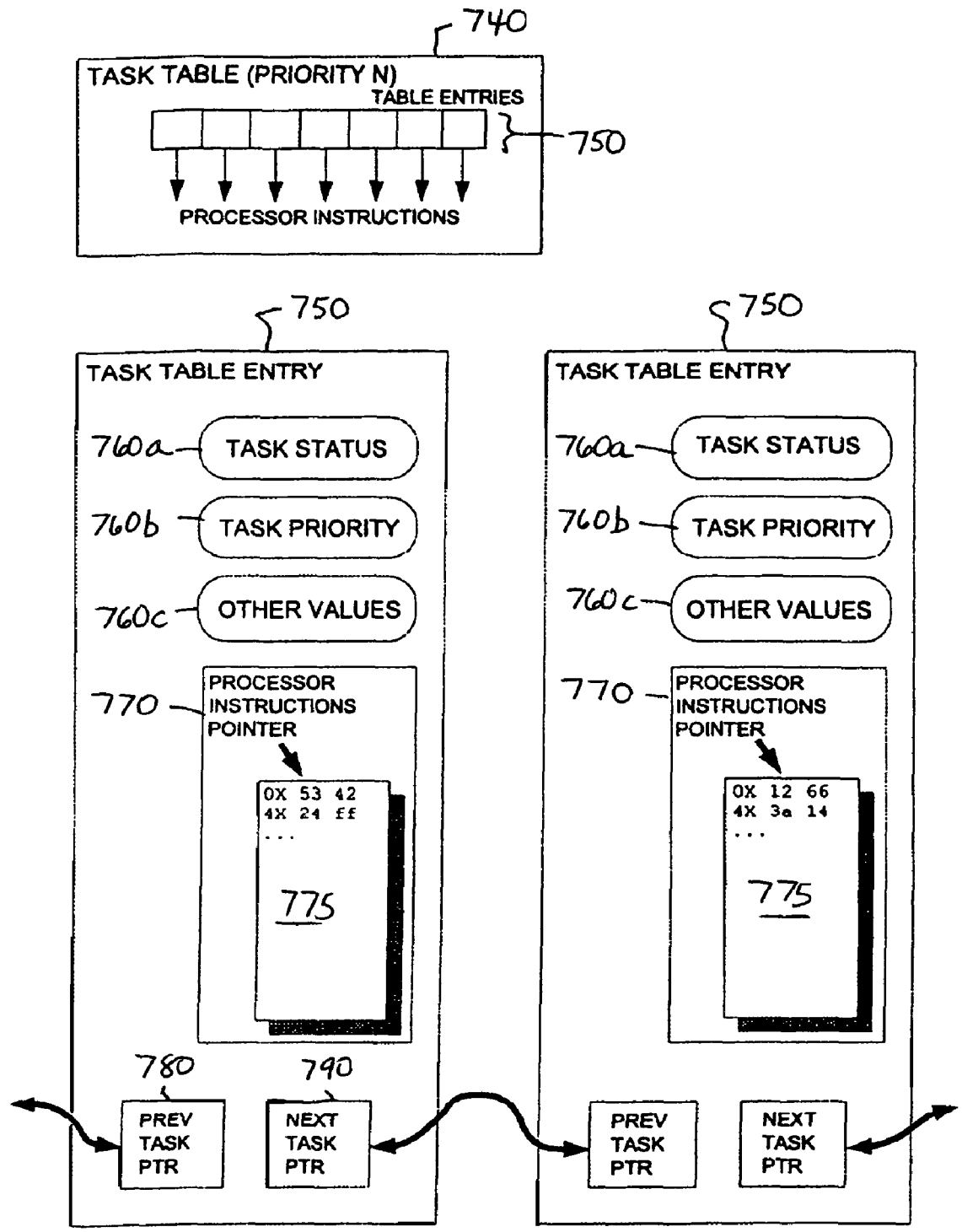
FIG. 35 is a block diagram illustrating one embodiment of task tables and task table entries of the present invention.

FIG. 35 illustrates one embodiment of task tables of the present invention. As previously described, each task table 740 includes a set of table entries 750 holding one or more of the following parameters: task status 760a, task priority 760b, other task table values 760c, a pointer to the previous task 780, and a pointer to the next task 790. Each task table 740 may also include an instruction pointer 770 to the actual instructions to be executed.

Task status 760a represents the state of the task, such as whether the task is running, ready, waiting, waiting-suspended, suspended, dormant, or non-existent. The task priority 760b represents the level or importance of the task and is used to determine the order of execution of tasks during scheduling. The previous task pointer 780 and next task pointer 790 are used in association with other table entries 750 to form a linked list within the task table 740. The previous task pointer 780 and next task pointer 790 also provide ordered access of the processing tasks of the task table to the PU and SPU.

Figure 36:
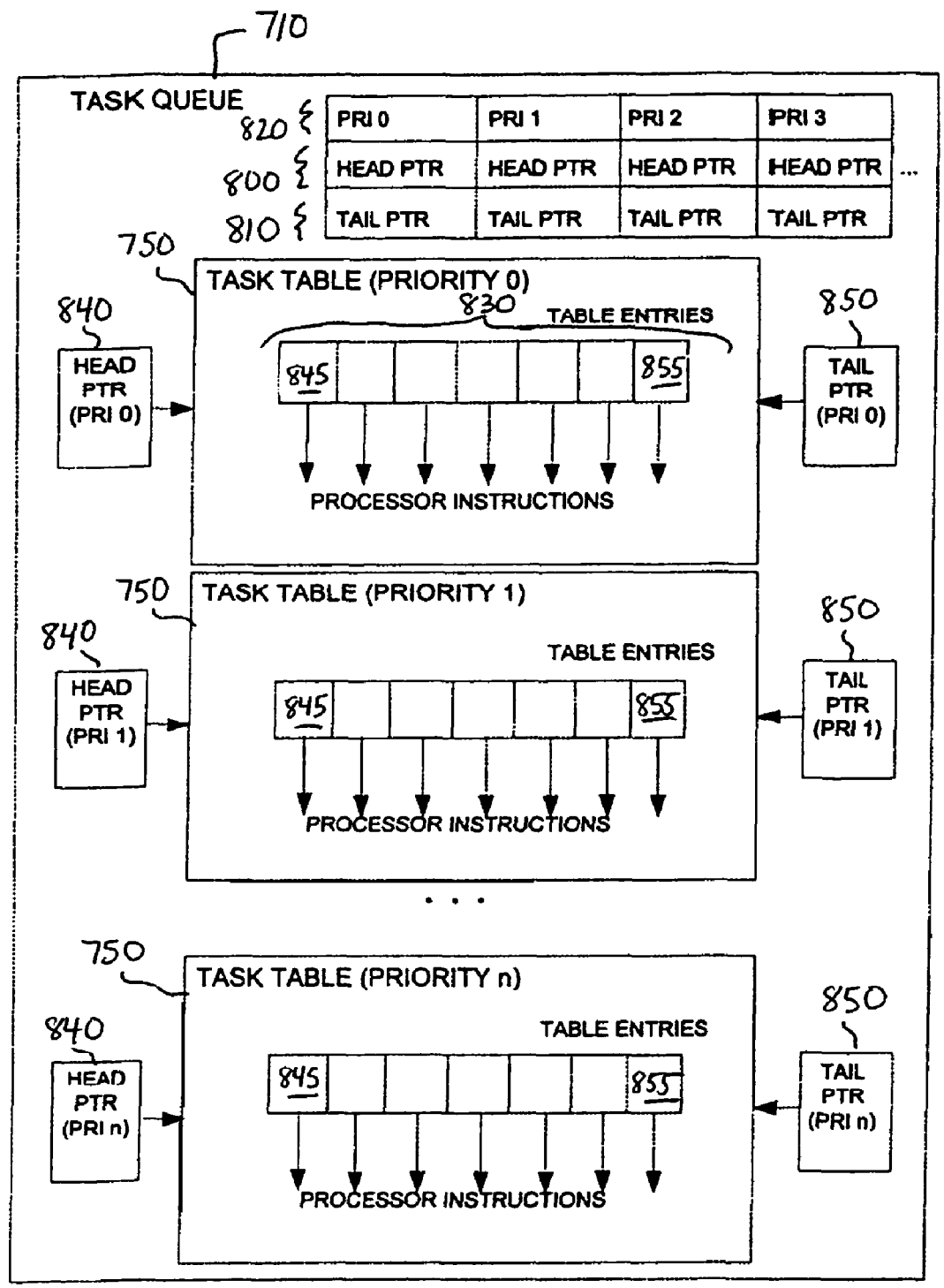
FIG. 36 is a block diagram illustrating one embodiment of a task queue of the present invention.

FIG. 36 illustrates one embodiment of a BE task queue of the present invention. Each task queue 710 includes a set of head entry pointers 800 and tail entry pointers 810 for each of a plurality of task priority levels 820. Specifically, the task queue 710 includes a separate head and tail entry pair for each of the n priority levels (0 through n−1) provided for prioritizing of task instruction execution on a BE on the cell server, such that typically there are as many linked lists as there are priority levels. Thus, for each priority level, a linked list 830 of tasks at that priority level is associated with a head pointer 840 pointing to a first task entry 845 within the task table 750 at that priority, and a tail pointer 850 pointing to the last task entry 855 within the task table at that priority. One example of a task queue 710 is shown in Table 2 herein.

TABLE 2

| Task Queue (n priorities) | |
|---|---|
| priority 0 | head entry pointer –> table 0 |
|  | tail entry pointer –> table 0 |
| priority 1 | head entry pointer –> table 1 |
|  | tail entry pointer –> table 1 |
| ... | |
| priority n – 1 | head entry pointer –> table n – 1 |
|  | tail entry pointer –> table n – 1 |

The PU and/or the SPU use the BE task queue and associated BE task table(s) to perform scheduling of task processing, and specifically to determine the order in which process tasks are pulled from the shared memory into one of the SPUs for execution. Each BE within the cell server preferably maintains at least one task queue and associated task tables.

The task queues and task tables for each BE facilitate the migration of processor tasks from one BE to another BE within the same cell server, or from one BE to another BE on separate cell servers connected via a network. The processor tasks to be forwarded to another BE for execution are bundled in a software cell for migration. A software cell typically includes one or more BE tasks wrapped with other information described in more detail below. A cell server that manages a particular BE is typically considered the application owner of that BE.

Figure 37:
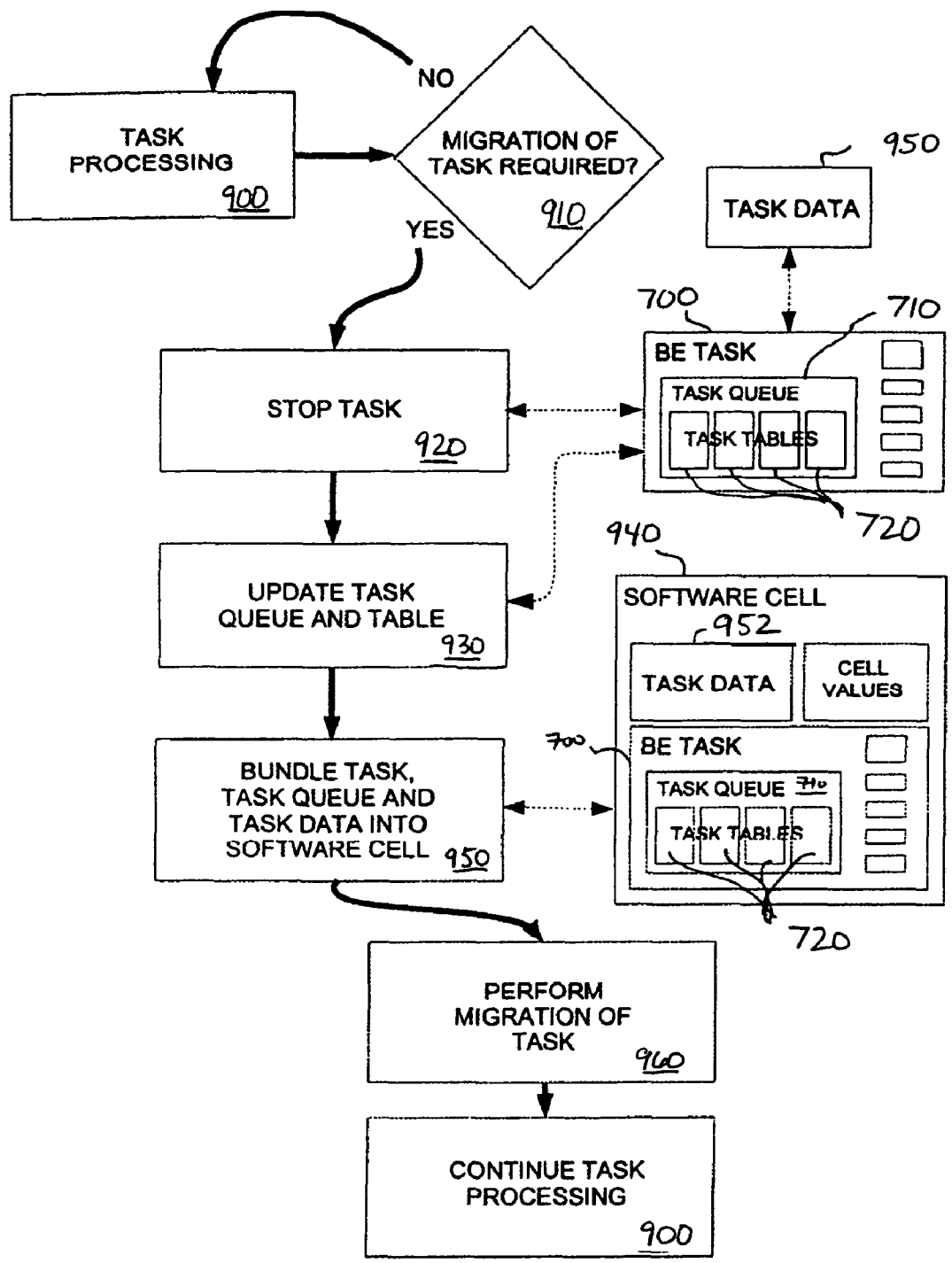
FIG. 37 is a partial flow diagram illustrating one embodiment of bundling of software cells of the present invention.

FIG. 37 illustrates the steps of one embodiment of a method of bundling a software cell for migration. Generally speaking, a BE in a particular cell server migrates a software cell including a set of one or more BE tasks to another BE, when, for example, there is high processor load in a BE (or in a particular SPU of the cell server), or when a priority conflict occurs in a particular SPU, as well as other situations. In particular, the bundling of a software cell for migration entails a multi-step process handled by the sending BE.

During a regular task processing state 900, the BE determines in a migration determination step 910 whether migration of a task is necessary due to, for example, high processor load, low memory availability, and the like. If migration is needed, the currently running task 700 is stopped in a stop task step 920. In preparation for bundling, the current task queue 710 and task table 720 of the sending BE is updated in a task update step 930. The BE tasks to be migrated are bundled into a software cell 940 for migration in a bundling step 950. The software cell 940 preferably includes not only the BE tasks 700 to be migrated (including task queue 710 and task table 720 information), but also the task data 952 associated with the BE tasks. The software cell advantageously may be compressed or encrypted to minimize software cell size, ensure software cell security, and verify software cell integrity as needed. The task is then migrated to another BE through a migration step 960 through a poll-response-migrate-return process as detailed in FIG. 38. Once the migration process (and return of the migrated process) is complete, the BE returns to continue processing of the task via the regular task processing state 900.

Figure 38:
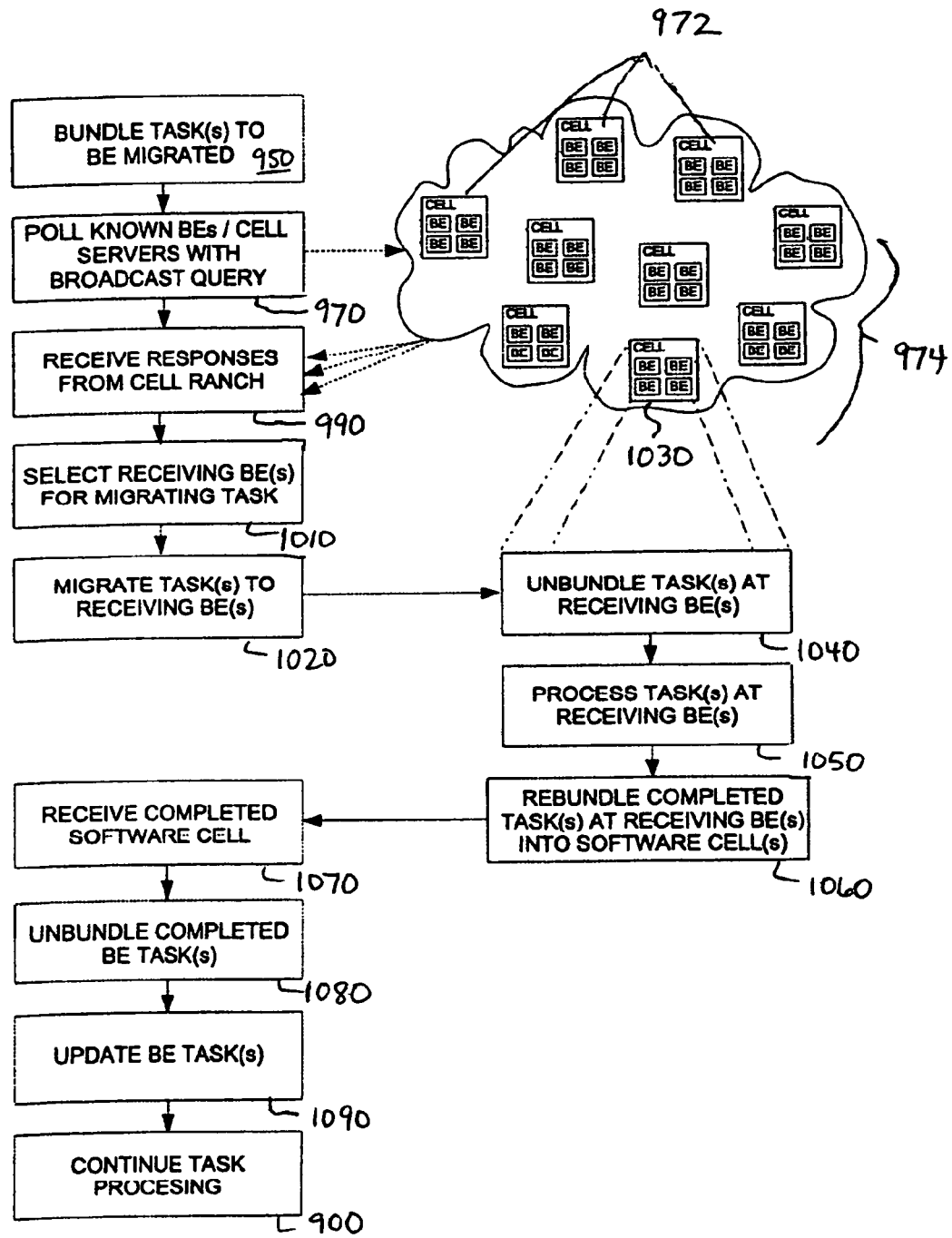
FIG. 38 is a partial flow diagram illustrating one embodiment of task migration of the present invention.

FIG. 38 illustrates one embodiment of the migration process for BE tasks from a sending BE to a receiving BE somewhere on a known cell server network. After the BE task(s) to be migrated have been bundled as described in the bundling step 950 of FIG. 37, the BE then polls other BEs via a polling step 970. The BE preferably polls other BEs 610 both on the same cell server 600 and on other known cell servers 972 on one or more cell server networks 974.

Figure 39:
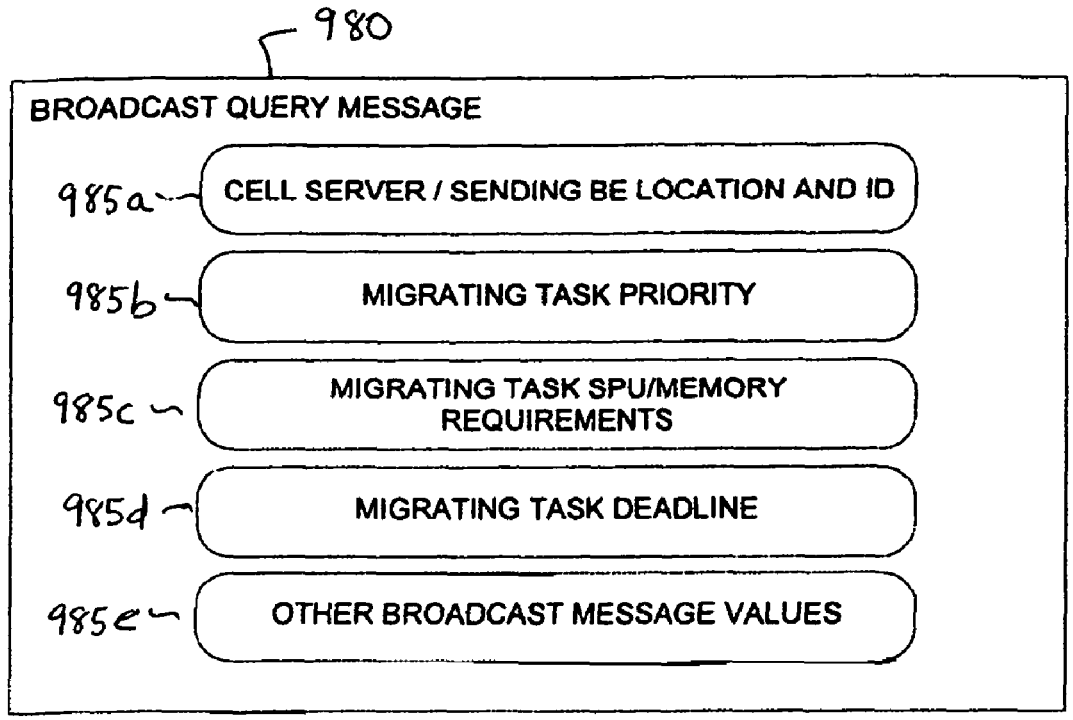
FIG. 39 is a block diagram illustrating one embodiment of a broadcast query message of the present invention.

The polling step 970 is preferably performed via a broadcast query to known BEs on a known cell server network as shown in FIG. 39. In one embodiment, the broadcast query message 980 takes the form of a network message including a number of values, including but not limited to a representation of the originating cell server and BE 985a, a representation of the task priority of the task to be migrated 985b, a representation of needed SPU and/or memory resources 985c, a representation of the task deadline for the migrating task 985d, and any other values advantageously sent by the broadcast query 985e. These values are stored in the task table which is part of the bundled software cell. These values may also be set forth in other data structures, if desired.

Figure 40:
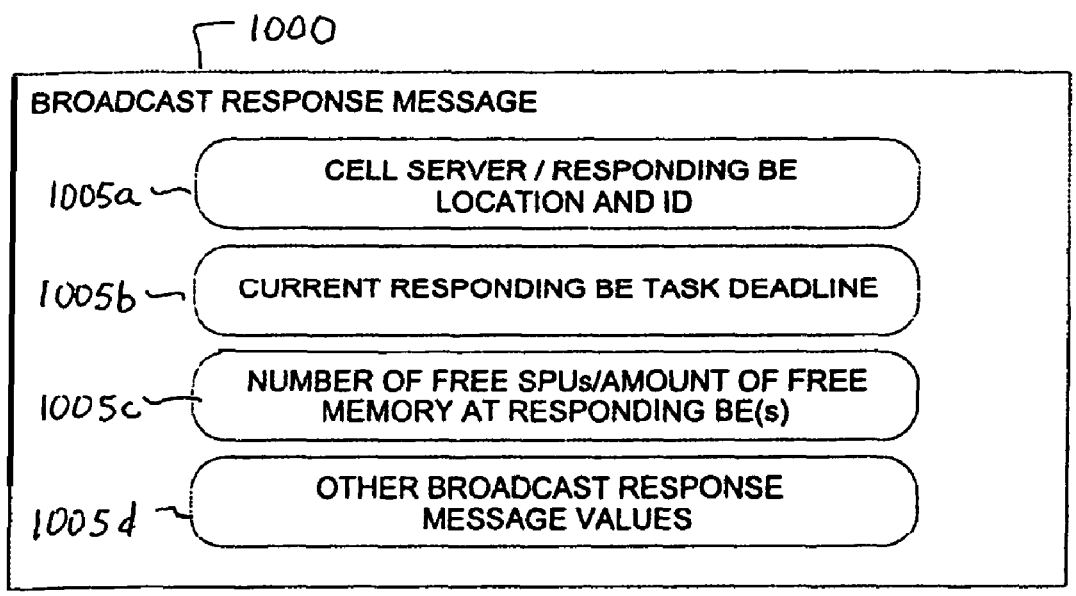
FIG. 40 is a block diagram illustrating one embodiment of a query response message of the present invention.

Returning to FIG. 38, the sending BE in the sending cell server receives one or more responses from known BES in the cell server network in a query response receiving step 990. A query response, as shown in FIG. 40, preferably takes the form of a network message including certain values including but not limited to a representation of responding BE and cell server location 1005a, a representation of the responding BEs current task deadline(s) 1005b, a representation of the current BEs free SPUs, processor load, and/or memory load 1005c, and any other broadcast response message values 1005d required, requested or included in the query response 1000.

Returning again to FIG. 38, the sending BE then determines, from the query responses 1000 received, what set of responding BEs the migrating tasks should be sent to in a receiving BE selection step 1010. This selection is preferably based on a determination taking into account some or all of small cell latency or small network topological distance between the sending BE and receiving BE, a short pending task deadline at the receiving BE, and sufficient availability of SPUs and memory at the receiving BE. The bundled tasks in a software cell 940 are then migrated to the selected receiving BE(s) 1030 via a migration step 1020.

Once the software cell 940 is sent to the receiving BE(s), a receiving BE 1030 advantageously unbundles and disposes of the software cell in shared memory in a receiving BE task unbundling step 1040, and accesses the bundled tasks, data, task queues and task table to execute the migrated processing tasks in a receiving BE task processing step 1050.

Once processing of the migrated tasks in step 1050 is completed by the receiving BE(s), the completed tasks, data, task queues and task table are advantageously re-bundled into a software cell via a receiving BE rebundling step 1060 and returned to the original sending BE, typically at the cell server that owns the BE tasks originally migrated. After the completed tasks are received by the original sending BE in a sending BE completed task % receipt step 1070, the sending BE unbundles the completed BE task in a task unbundling step 1080. The completed BE task then updates the relevant processes in a completed task update step 1090, and the general task processing state 900 resumes. Messages 980, 1000, software cells 600, and other critical data such as task data 952 may be advantageously encrypted via a known algorithms such as, for example, the AES standard, Blowfish, or RSA-based public key encryption algorithms. Similarly, messages, data structures and other features of the present application may be fingerprinted via digest algorithms such as, for example, MD5, to ensure critical data integrity as tasks, task data, and messages are sent over sometimes unreliable networks and network protocols.

Figure 41:
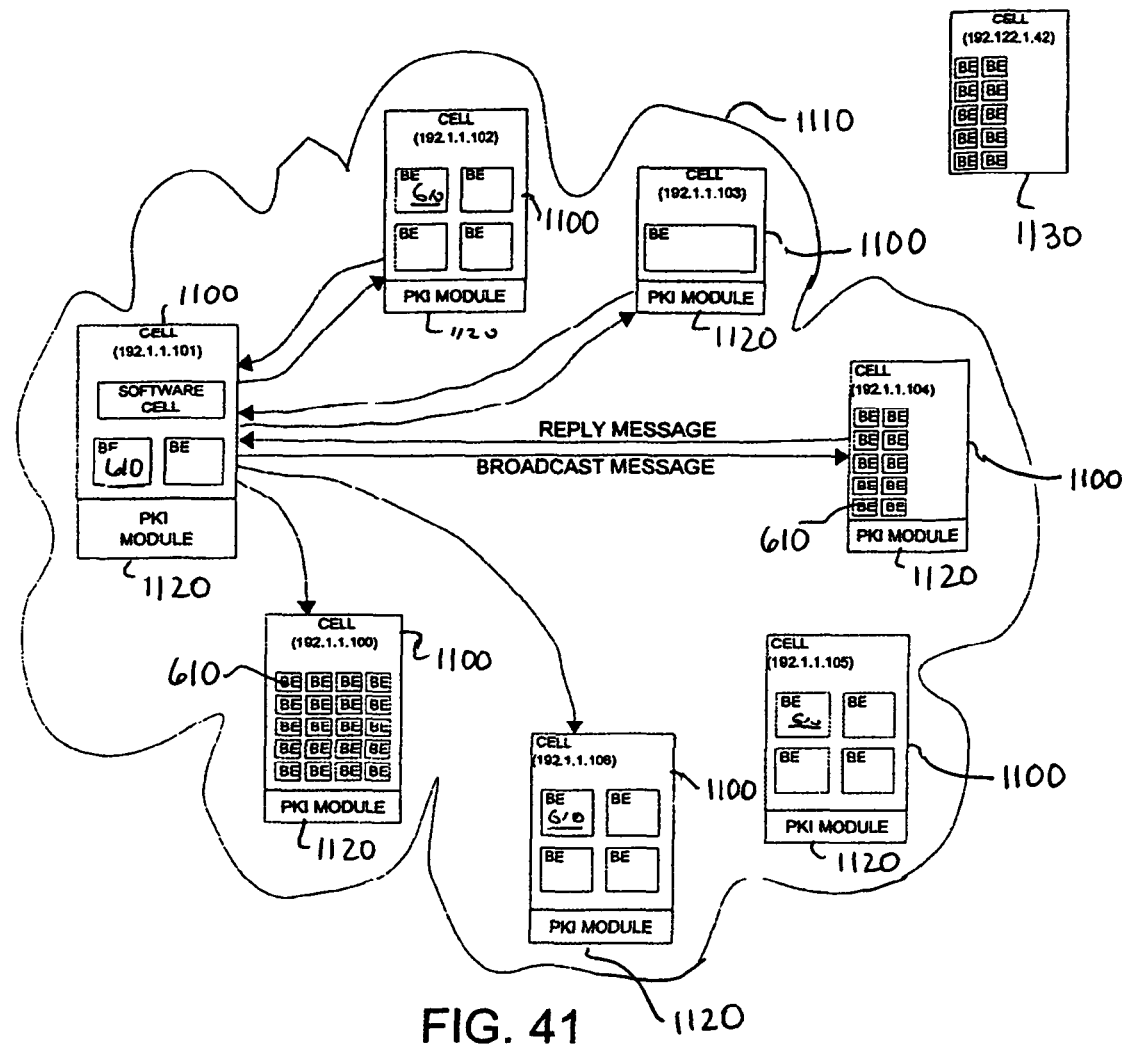
FIG. 41 is a system diagram illustrating one embodiment of a secure cell ranch of the present invention.

FIG. 41 illustrates one embodiment of a secure server ranch of the present invention. The individual inter-networked cell servers 1100 advantageously form a community of cell servers called a server ranch 1110. The server ranch is preferably formed on a topology free network such as, for example, an IP (Internet Protocol) based network such as an intranet or the Internet. However, any network protocol of sufficient efficiency and reliability may be used.

Advantageously, the server ranch may be secure relative to the network on which it resides, as such security is critical when the server ranch is on an otherwise open network such as a wireless network, an insecure local area network, a wide area network, an organizational or topological intra-net or more generally on the Internet. In one embodiment, each cell server in a secure server ranch employs a public and a private key, and cell servers distributed over a network can send, receive and authenticate software cells and other messages via a encryption module 1120, in one embodiment a public key encryption (PKI) module. Any type of encryption algorithm may be used, however, such as an AES-based handshake or compression-encryption techniques. Cell servers outside the known network 1130, while typically capable of joining a cell ranch, will be preferably prevented from joining a secure server ranch if they lack the proper type of encryption module and the proper authentication (i.e. keys and/or signatures).

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of migrating a task over a network from a first multi-processor to one or more additional multi-processors, comprising:
   determining that a given task should be migrated from the first multi-processor to the one or more additional multi-processors; and
   broadcasting an application from the first multi-processor when it is determined that the given task should be migrated to the one or more additional multi-processors, wherein the application specifies a plurality of tasks to be migrated, including the given task, and an attribute indicating a distance of the application from at least one of (a) a previous multi-processor broadcasting the application and (b) a multi-processor originally broadcasting the application, and a deadline for completion of each of the plurality of tasks.

2. The method of claim 1, wherein the attribute specifies a processing power required to perform the given task.

3. The method of claim 2, further comprising:
   receiving the broadcast application at a second multi-processor, the second multi-processor being one of the one or more additional multi-processors;
   unbundling the plurality of tasks specified in the application; and
   at the second multi-processor, examining the attribute that specifies the processing power required to perform task requirements to determine whether the given task should be performed by the second multi-processor.

4. The method of claim 3, wherein the second multi-processor also examines the distance of the application from at least one of (a) the previous multi-processor broadcasting the application and (b) the multi-processor originally broadcasting the application, and the deadline for completion of the plurality of tasks to determine whether the plurality of tasks should be performed by the second multi-processor.

5. The method of claim 3, further comprising examining the attribute at the second multi-processor, the attribute specifying memory required to perform the given task, to determine whether the given task should be performed by the second multi-processor.

6. The method of claim 5, wherein the second multi-processor also examines the distance of the application from at least one of (a) the previous multi-processor broadcasting the application and (b) the multi-processor originally broadcasting the application, and the deadline for completion of each of the plurality of tasks to determine whether the plurality of tasks should be performed by the second multi-processor.

7. The method of any one of claims 3, 4 or 5, further comprising the second multi-processor advising the first multi-processor whether the second multi-processor is performing the given task.

8. The method of claim 2, wherein the processing power identifies a number of multi-processors needed to perform the given task.

9. The method of claim 1, wherein the attribute specifies a memory size required to perform the given task.

10. The method of claim 9, further comprising:
    receiving the broadcast application at a second multi-processor, the second multi-processor being one of the one or more additional multi-processors;
    unbundling the plurality of tasks specified in the application; and
    at the second multi-processor, examining the attribute, the attribute specifying memory required to perform the given task, to determine whether the given task should be performed by the second multi-processor.

11. The method of claim 1, wherein the application specifies the plurality of tasks by containing the plurality of tasks.

12. The method of claim 1, wherein the application specifies the plurality of tasks via pointer information indicating where the plurality of tasks are located.

13. The method of claim 1, further comprising:
    receiving the broadcast application at a second multi-processor, the second multi-processor being one of the one or more additional multi-processors;
    unbundling the plurality of tasks specified in the application; and
    at the second multi-processor, examining the attribute, the attribute specifying requirements to perform the given task, to determine whether the given task should be performed by the second multi-processor.

14. The method of claim 13, wherein the second multi-processor further examines the distance of the application from at least one of (a) the previous multi-processor broadcasting the application and (b) the multi-processor originally broadcasting the application, and the deadline for completion of the plurality of tasks to determine whether the plurality of tasks should be performed by the second multi-processor.

15. The method of any one of claims 10, 13 or 14, further comprising the second multi-processor advising the first multi-processor whether the second multi-processor is performing the given task.

16. The method of claim 13, further comprising:
receiving the broadcast application at a plurality of other multi-processors, the plurality of other multi-processors being ones of the one or more additional multi-processors;
unbundling the plurality of tasks specified in the application at each of the plurality of other multi-processors; and
at each of the plurality of other multi-processors, examining the attribute that specifies the requirements to perform the given task to determine whether the given task should be performed.

17. The method of claim 16, wherein each of the plurality of other multi-processors also examine the distance of the application from at least one of (a) the previous multi-processor broadcasting the application and (b) the multi-processor originally broadcasting the application, and the deadline for completion of the plurality of tasks to determine whether the plurality of tasks should be performed by each respective of the plurality of other multi-processors.

18. The method of claim 16, further comprising the plurality of other multi-processors advising the first multi-processor whether the given task is being performed.

19. The method of claim 1, further comprising, prior to broadcasting the application, bundling the plurality of tasks into a software cell, and compressing the software cell.

20. The method of claim 1, further comprising, prior to broadcasting the application, bundling the plurality of tasks into a software cell, and encrypting the software cell.

21. A system for migrating tasks, comprising:
a network;
a plurality of multi-processors connected to the network;
means for determining that a given task should be migrated from a first one of the plurality of multi-processors to one or more additional ones of the plurality of multi-processors; and
means for broadcasting an application from the first one of the multi-processors over the network when it is determined that the given task should be migrated to the one or more additional multi-processors, wherein the application specifies a plurality of tasks to be migrated, including the given task, and an attribute indicating a distance of the application from at least one of (a) a previous multi-processor broadcasting the application and (b) a multi-processor originally broadcasting the application, and a deadline for completion of each of the plurality of tasks.

22. The system of claim 21, wherein the attribute specifies a processing power required to perform the given task.

23. The system of claim 22, wherein the attribute also specifies a memory size required to perform the given task.

24. The system of claim 22, further comprising:
means for receiving the broadcast application at a second multi-processor, the second multi-processor being one of the one or more additional multi-processors;
means for unbundling the plurality of tasks in the application at the second multi-processor; and
at the second multi-processor, means for examining the attribute that specifies the processing power required to perform task requirements to determine whether the given task should be performed by the second multi-processor.

25. The system of claim 24, wherein the second multi-processor also includes means for examining the distance of the application from at least one of (a) the previous multi-processor broadcasting the application and (b) the multi-processor originally broadcasting the application, and the deadline for completion of each of the plurality of tasks to determine whether the plurality of tasks should be performed by the second multi-processor.

26. The system of claim 25, wherein the second multi-processor includes means for examining the attribute, that the attribute specifying memory required to perform the given task, to determine whether the given task should be performed by the second multi-processor.

27. The system of any one of claims 24, 25 or 26, wherein the second multi-processor includes means for advising the first multi-processor whether the second multi-processor is performing the given task.

28. The system of claim 21, wherein the attribute specifies a memory size required to perform the given task.

29. The system of claim 21, wherein the application specifies the plurality of tasks by containing the plurality of tasks.

30. The system of claim 21, wherein the application specifies the plurality of tasks via pointer information indicating where the plurality of tasks are located.

31. The system of claim 21, further comprising:
a second multi-processor connected to the network, the second multi-processor being one of the one or more additional multi-processors;
means for receiving the broadcast application at the second multi-processor;
means for unbundling the plurality of tasks in the application; and
in the second multi-processor, means for examining the attribute that specifies requirements to perform the given task to determine whether the given task should be performed by the second multi-processor.

32. The system of claim 31, wherein the second multi-processor also includes means for examining the distance of the application from at least one of (a) the previous multi-processor broadcasting the application and (b) the multi-processor originally broadcasting the application, and the deadline for completion of each of the plurality of tasks to determine whether the plurality of tasks should be performed by the second multi-processor.

33. The system of claim 32, wherein the second multi-processor includes means for advising the first multi-processor whether the second multi-processor is performing the given task.

34. The system of claim 32, further comprising:
means for receiving the broadcast application at a plurality of other multi-processors, the plurality of other multi-processors being of the plurality of multi-processors;
means for unbundling the plurality of tasks in the application at each of the plurality of other multi-processors; and
at each of the plurality of other multi-processors, means for examining the attribute that specifies the requirements to perform the given task to determine whether the given task should be performed.

35. The system of claim 34, wherein each of the plurality of other multi-processors includes means for examining the distance of the application from at least one of (a) the previous multi-processor broadcasting the application and (b) the multi-processor originally broadcasting the application, and the deadline for completion of each of the plurality of tasks to determine whether the plurality of tasks should be performed.

36. The system of claim 34, each of the plurality of other multi-processors including means for advising the first multi-processor whether the given task is being performed.

37. The system of claim 31, wherein the second multi-processor includes means for advising the first multi-processor whether the second multi-processor is performing the given task.

38. An apparatus for migrating tasks, comprising:
a first multi-processor connectable to a network and programmed to determine whether a given task should be performed by the first multi-processor or migrated to one or more additional multi-processors connected to the network;
wherein the first multi-processor is operable to direct a broadcast of an application from the first multi-processor over the network when the first multi-processor determines that the given task should be migrated to the one or more additional multi-processors, wherein the application specifies a plurality of tasks to be migrated, including the given task, and an attribute indicating a distance of the application from at least one of (a) a previous multi-processor broadcasting the application and (b) a multi-processor originally broadcasting the application, and a deadline for completion of each of the plurality of tasks.

* * * * *

UNITED STATES PATENT AND TRADEMARK OFFICE
CERTIFICATE OF CORRECTION

| | | |
|---|---|---|
| PATENT NO. | : 8,028,292 B2 | Page 1 of 1 |
| APPLICATION NO. | : 11/346668 | |
| DATED | : September 27, 2011 | |
| INVENTOR(S) | : Keisuke Inoue and Masahiro Yasue | |

It is certified that error appears in the above-identified patent and that said Letters Patent is hereby corrected as shown below:

Col. 27, Claim 19, Line 26, "compressing the software cell." should read
-- compressing the software cell to minimize a size of the software cell. --.

Col. 27, Claim 20, Line 29, "encrypting the software cell." should read
-- encrypting the software cell to minimize a size of the software cell. --.

Signed and Sealed this
Fourth Day of December, 2012

David J. Kappos
*Director of the United States Patent and Trademark Office*